United States Patent
Chapman et al.

(10) Patent No.: US 7,639,617 B2
(45) Date of Patent: *Dec. 29, 2009

(54) UPSTREAM PHYSICAL INTERFACE FOR MODULAR CABLE MODEM TERMINATION SYSTEM

(75) Inventors: John T. Chapman, Saratoga, CA (US); Daniel W. Crocker, San Jose, CA (US); Eric Youngman, San Jose, CA (US); Alon S. Bernstein, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 781 days.

This patent is subject to a terminal disclaimer.

(21) Appl. No.: 11/131,766

(22) Filed: May 17, 2005

(65) Prior Publication Data

US 2005/0265397 A1   Dec. 1, 2005
US 2007/0195824 A9   Aug. 23, 2007

Related U.S. Application Data

(63) Continuation-in-part of application No. 09/894,958, filed on Jun. 27, 2001, now Pat. No. 7,209,442.

(60) Provisional application No. 60/635,995, filed on Dec. 13, 2004, provisional application No. 60/624,490, filed on Nov. 1, 2004, provisional application No. 60/622,312, filed on Oct. 25, 2004, provisional application No. 60/590,509, filed on Jul. 23, 2004, provisional application No. 60/588,635, filed on Jul. 16, 2004, provisional application No. 60/582,732, filed on Jun. 22, 2004, provisional application No. 60/574,876, filed on May 26, 2004, provisional application No. 60/574,506, filed on May 25, 2004.

(51) Int. Cl.
H04J 1/16 (2006.01)
H04L 12/26 (2006.01)

(52) U.S. Cl. .................................... 370/235

(58) Field of Classification Search .................... None
See application file for complete search history.

(56) References Cited

U.S. PATENT DOCUMENTS 4,977,593 A   12/1990   Balance
(Continued)

FOREIGN PATENT DOCUMENTS

WO   00/72509   11/2000
(Continued)

OTHER PUBLICATIONS

Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
(Continued)

*Primary Examiner*—William Trost, IV
*Assistant Examiner*—Raj Jain
(74) *Attorney, Agent, or Firm*—Stolowitz Ford Cowger LLP

(57) ABSTRACT

A modular Cable Modem Termination System (CMTS) includes a packet shelf operating a Data Over Cable Service Interface Specifications (DOCSIS) Media Access Control (MAC) framer. One or more downstream Physical Interface (PHY) shelves receive DOCSIS data from the packet shelf over a packet switched network and modulate the DOCSIS data for sending on a downstream path of a cable plant. One or more upstream PHY shelves send DOCSIS data received from an upstream path of the cable plant over the packet switched network to the packet shelf. By separating the PHY components from the MAC and from the system software, the PHY components for a Hybrid Fiber Coax (HFC) plant may be replaced with different PHY components for other access technologies such as wireless, Digital Subscriber Lines (DSL), Ethernet-to-the-Home, Fiber-to-the-Home, or fiber Passive Optical Networks (PONs).

29 Claims, 37 Drawing Sheets

U.S. PATENT DOCUMENTS

| | | | |
|---|---|---|---|
| 5,153,763 | A | 10/1992 | Pidgeon |
| 5,604,735 | A | 2/1997 | Levinson et al. |
| 5,724,510 | A | 3/1998 | Arndt et al. |
| 5,784,597 | A | 7/1998 | Chiu et al. |
| 5,805,602 | A | 9/1998 | Cloutier et al. |
| 5,918,019 | A | 6/1999 | Valencia |
| 5,931,954 | A | 8/1999 | Hoshina et al. |
| 5,933,420 | A | 8/1999 | Jaszewski et al. |
| 5,963,557 | A | 10/1999 | Eng |
| 6,023,769 | A | 2/2000 | Gonzalez |
| 6,078,595 | A | 6/2000 | Jones et al. |
| 6,101,180 | A | 8/2000 | Donahue et al. |
| 6,137,793 | A | 10/2000 | Gorman et al. |
| 6,233,235 | B1 | 5/2001 | Burke et al. |
| 6,233,246 | B1 | 5/2001 | Hareski et al. |
| 6,275,990 | B1 | 8/2001 | Dapper et al. |
| 6,381,214 | B1 | 4/2002 | Prasad |
| 6,418,324 | B1 | 7/2002 | Doviak et al. |
| 6,434,141 | B1 | 8/2002 | Oz et al. |
| 6,438,123 | B1 | 8/2002 | Chapman |
| 6,490,727 | B1 | 12/2002 | Nazarathy et al. |
| 6,510,162 | B1 | 1/2003 | Fijolek et al. |
| 6,516,345 | B1 | 2/2003 | Kracht |
| 6,546,017 | B1 * | 4/2003 | Khaunte .................... 370/412 |
| 6,556,591 | B2 | 4/2003 | Bernath et al. |
| 6,640,248 | B1 | 10/2003 | Jorgensen |
| 6,693,878 | B1 | 2/2004 | Daruwalla et al. |
| 6,697,970 | B1 | 2/2004 | Chisolm |
| 6,698,022 | B1 | 2/2004 | Wu |
| 6,763,019 | B2 | 7/2004 | Mehta et al. |
| 6,763,032 | B1 | 7/2004 | Rabenko et al. |
| 6,771,606 | B1 | 8/2004 | Kuan |
| 6,804,251 | B1 | 10/2004 | Limb et al. |
| 6,819,682 | B1 | 11/2004 | Rabenko et al. |
| 6,847,635 | B1 | 1/2005 | Beser |
| 6,853,680 | B1 | 2/2005 | Nikolich |
| 6,857,132 | B1 | 2/2005 | Rakib et al. |
| 6,901,079 | B1 | 5/2005 | Phadnis et al. |
| 6,950,399 | B1 | 9/2005 | Bushmitch et al. |
| 6,959,042 | B1 | 10/2005 | Liu et al. |
| 6,993,016 | B1 | 1/2006 | Liva et al. |
| 6,993,353 | B2 | 1/2006 | Desai et al. |
| 6,996,129 | B2 | 2/2006 | Krause et al. |
| 7,006,500 | B1 | 2/2006 | Pedersen et al. |
| 7,007,296 | B2 | 2/2006 | Rakib et al. |
| 7,023,882 | B2 | 4/2006 | Woodward, Jr. et al. |
| 7,039,049 | B1 | 5/2006 | Akgun et al. |
| 7,065,779 | B1 | 6/2006 | Crocker et al. |
| 7,067,734 | B2 | 6/2006 | Abe et al. |
| 7,110,398 | B2 | 9/2006 | Grand et al. |
| 7,113,484 | B1 | 9/2006 | Chapman et al. |
| 7,116,643 | B2 | 10/2006 | Huang et al. |
| 7,117,526 | B1 | 10/2006 | Short |
| 7,139,923 | B1 | 11/2006 | Chapman et al. |
| 7,145,887 | B1 | 12/2006 | Akgun |
| 7,149,223 | B2 * | 12/2006 | Liva et al. .................... 370/401 |
| 7,164,690 | B2 | 1/2007 | Limb et al. |
| 7,197,052 | B1 | 3/2007 | Crocker |
| 7,206,321 | B1 | 4/2007 | Bansal et al. |
| 7,209,442 | B1 | 4/2007 | Chapman |
| 7,269,159 | B1 | 9/2007 | Lai |
| 7,290,046 | B1 | 10/2007 | Kumar |
| 7,359,332 | B2 | 4/2008 | Kolze et al. |
| 7,363,629 | B2 | 4/2008 | Springer et al. |
| 7,548,558 | B2 | 6/2009 | Rakib et al. |
| 2001/0010096 | A1 | 7/2001 | Horton et al. |
| 2001/0055319 | A1 | 12/2001 | Quigley et al. |
| 2001/0055469 | A1 | 12/2001 | Shida et al. |
| 2002/0009974 | A1 | 1/2002 | Kuwahara et al. |
| 2002/0010750 | A1 | 1/2002 | Baretzki |
| 2002/0023174 | A1 | 2/2002 | Garret et al. |
| 2002/0052927 | A1 | 5/2002 | Park |
| 2002/0067721 | A1 | 6/2002 | Kye |
| 2002/0073432 | A1 | 6/2002 | Kolze |
| 2002/0073433 | A1 | 6/2002 | Furuta et al. |
| 2002/0088003 | A1 | 7/2002 | Salee |
| 2002/0093935 | A1 | 7/2002 | Denney et al. |
| 2002/0093955 | A1 | 7/2002 | Grand et al. |
| 2002/0131403 | A1 * | 9/2002 | Desai et al. .................... 370/352 |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |
| 2002/0144284 | A1 | 10/2002 | Burroughs et al. |
| 2002/0146010 | A1 | 10/2002 | Shenoi et al. |
| 2002/0147978 | A1 * | 10/2002 | Dolgonos et al. ............. 725/62 |
| 2002/0154655 | A1 | 10/2002 | Gummalla et al. |
| 2002/0161924 | A1 | 10/2002 | Perrin et al. |
| 2002/0198967 | A1 | 12/2002 | Iwanojko et al. |
| 2003/0014762 | A1 | 1/2003 | Conover et al. |
| 2003/0058794 | A1 | 3/2003 | Pantelias et al. |
| 2003/0061415 | A1 | 3/2003 | Horton et al. |
| 2003/0066087 | A1 | 4/2003 | Sawyer et al. |
| 2003/0067944 | A1 | 4/2003 | Sala et al. |
| 2003/0101463 | A1 | 5/2003 | Greene et al. |
| 2003/0140131 | A1 | 7/2003 | Chandrashekhar et al. |
| 2003/0163341 | A1 | 8/2003 | Banerjee et al. |
| 2003/0214943 | A1 | 11/2003 | Engstrom et al. |
| 2003/0214982 | A1 | 11/2003 | Lorek et al. |
| 2004/0039466 | A1 | 2/2004 | Lilly et al. |
| 2004/0045037 | A1 | 3/2004 | Cummings et al. |
| 2004/0073902 | A1 | 4/2004 | Kao et al. |
| 2004/0101077 | A1 | 5/2004 | Miller et al. |
| 2004/0105403 | A1 | 6/2004 | Lin et al. |
| 2004/0105406 | A1 | 6/2004 | Kayama et al. |
| 2004/0143593 | A1 | 7/2004 | Le Maut et al. |
| 2004/0160945 | A1 | 8/2004 | Dong et al. |
| 2004/0163129 | A1 | 8/2004 | Chapman et al. |
| 2004/0181800 | A1 | 9/2004 | Rakib et al. |
| 2004/0244043 | A1 | 12/2004 | Lind et al. |
| 2005/0018697 | A1 | 1/2005 | Enns et al. |
| 2005/0122976 | A1 | 6/2005 | Poli et al. |
| 2005/0138669 | A1 | 6/2005 | Baran |
| 2005/0198684 | A1 | 9/2005 | Stone et al. |
| 2005/0201399 | A1 | 9/2005 | Woodward, Jr. et al. |
| 2005/0220126 | A1 | 10/2005 | Gervais et al. |
| 2005/0226257 | A1 | 10/2005 | Mirzabegian et al. |
| 2005/0232294 | A1 | 10/2005 | Quigley et al. |
| 2005/0259645 | A1 | 11/2005 | Chen et al. |
| 2005/0265261 | A1 | 12/2005 | Droms et al. |
| 2005/0265309 | A1 | 12/2005 | Parandekar |
| 2005/0265338 | A1 | 12/2005 | Chapman et al. |
| 2005/0265376 | A1 | 12/2005 | Chapman et al. |
| 2005/0265392 | A1 | 12/2005 | Chapman et al. |
| 2005/0265394 | A1 | 12/2005 | Chapman et al. |
| 2005/0265397 | A1 | 12/2005 | Chapman et al. |
| 2005/0265398 | A1 | 12/2005 | Chapman et al. |
| 2005/0289623 | A1 | 12/2005 | Midani et al. |
| 2006/0002294 | A1 | 1/2006 | Chapman et al. |
| 2006/0098669 | A1 | 5/2006 | Enns et al. |
| 2006/0126660 | A1 | 6/2006 | Denney et al. |
| 2006/0159100 | A1 | 7/2006 | Droms et al. |
| 2006/0168612 | A1 | 7/2006 | Chapman et al. |
| 2007/0274345 | A1 | 11/2007 | Taylor et al. |
| 2008/0037545 | A1 | 2/2008 | Lansing et al. |

FOREIGN PATENT DOCUMENTS

| | | |
|---|---|---|
| WO | 0072509 | 11/2000 |
| WO | 2005117310 | 12/2005 |
| WO | 2005117358 | 12/2005 |

OTHER PUBLICATIONS

Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interfaces Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Data Over Cable Service Interface Specification, Aug 4, 1997.
Ethereal: Display Filter Reference: DOCSIS Upstream Channel Descriptor, Webarchivedate Apr. 27, 2004.
DOCSIS Set Top Gateway (DSG) interface specification, Feb 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.

U.S. Appl. No. 11/292,725, Bernstein et al., "Advanced Multicast Support for Cable", filed Dec. 1, 2005.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
U.S. Appl. No. 11/131,766, issued May 17, 2005, Chapman et al.
U.S. Appl. No. 11/135,777, issued May 23, 2005, Chapman et al.
U.S. Appl. No. 11/137,606, issued May 24, 2005, Chapman et al.
Ramakrishnan, Sangeeta, "Next Generation Edge —Realizing the vision of shared resources and bandwidth", Jan. 2005, 16 pgs.
Cisco Systems, Inc., "Downstream External PHY Interface Specification", SP-DEPI-W2-041101A.DOC, EDCS-408926, Oct. 29, 2004.
Chapman, John T., "Remote PHY Technical White Paper Addendum," Downstream External PHY Interface Specification, Cisco Systems, Inc., EDCS-377253, Oct. 1, 2004.
Desai, et al., FastChannel: A Higher-Speed Cable Data Service, AT&T Labs-Research, pp. 1-13, Jan. 2002.
Fellows et al., "DOCSIS Cable Modem Technology", IEEE Communication Magazine, vol. 39, Issue 3, Mar. 2001, pp. 202-209.

* cited by examiner

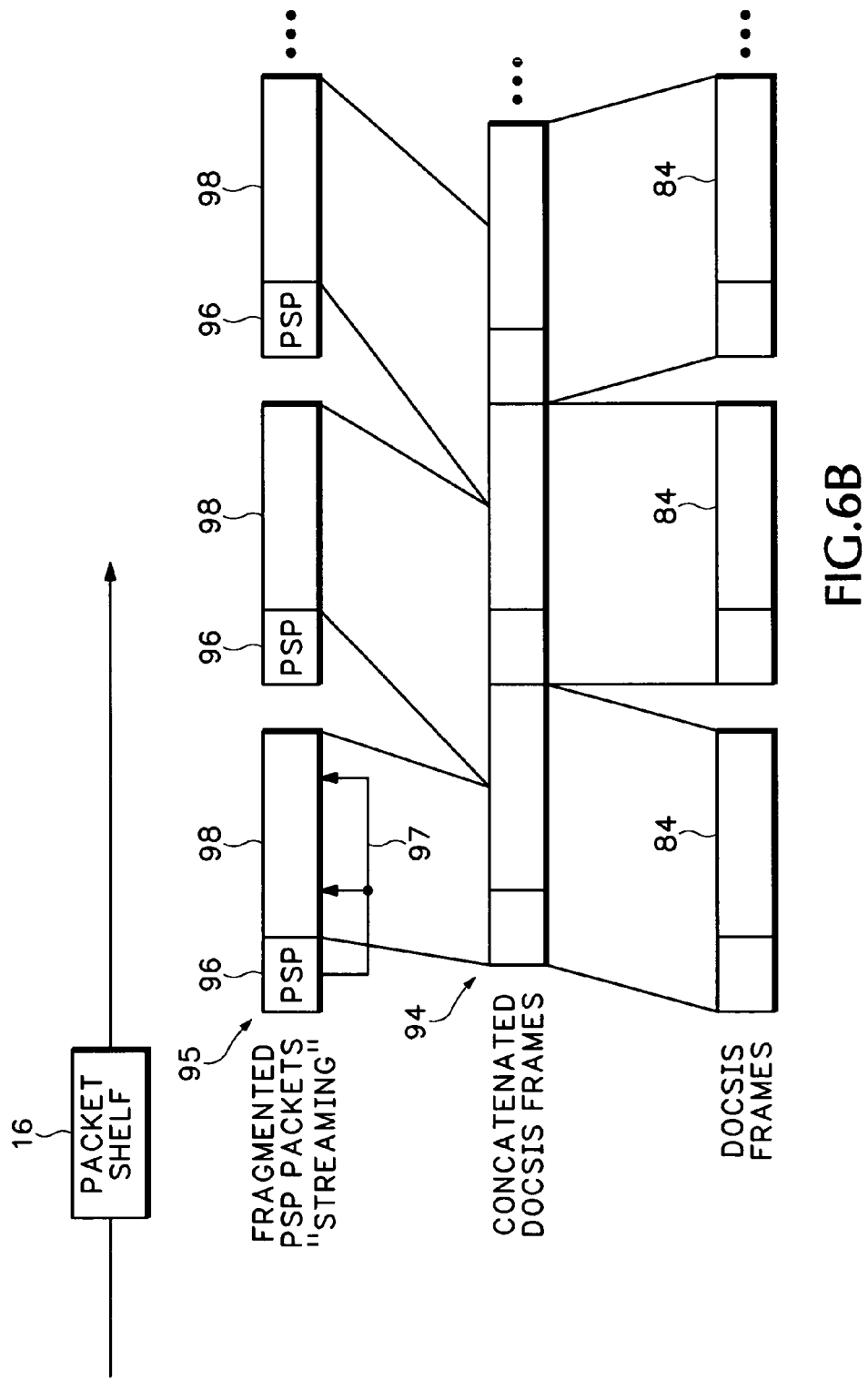

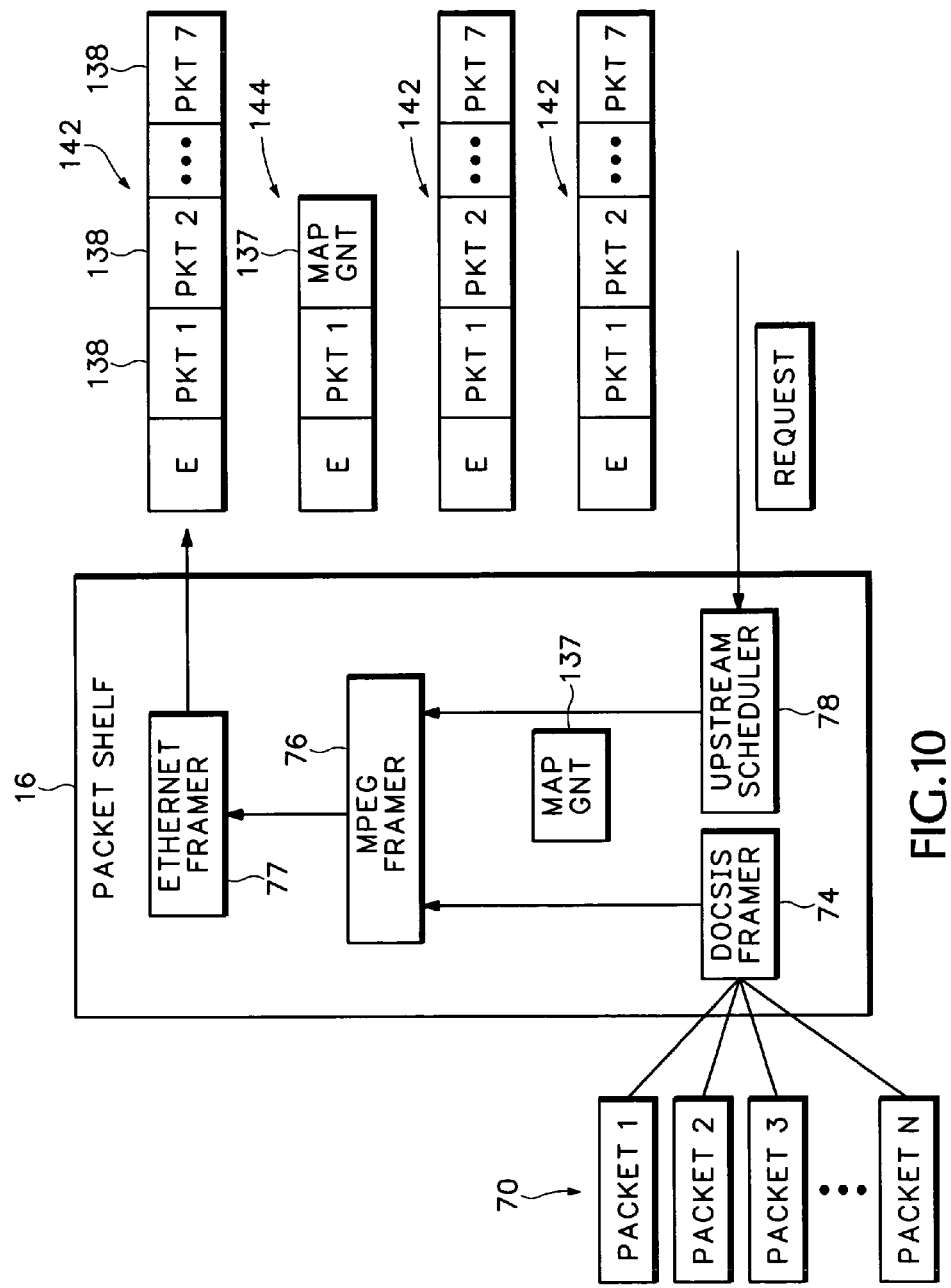

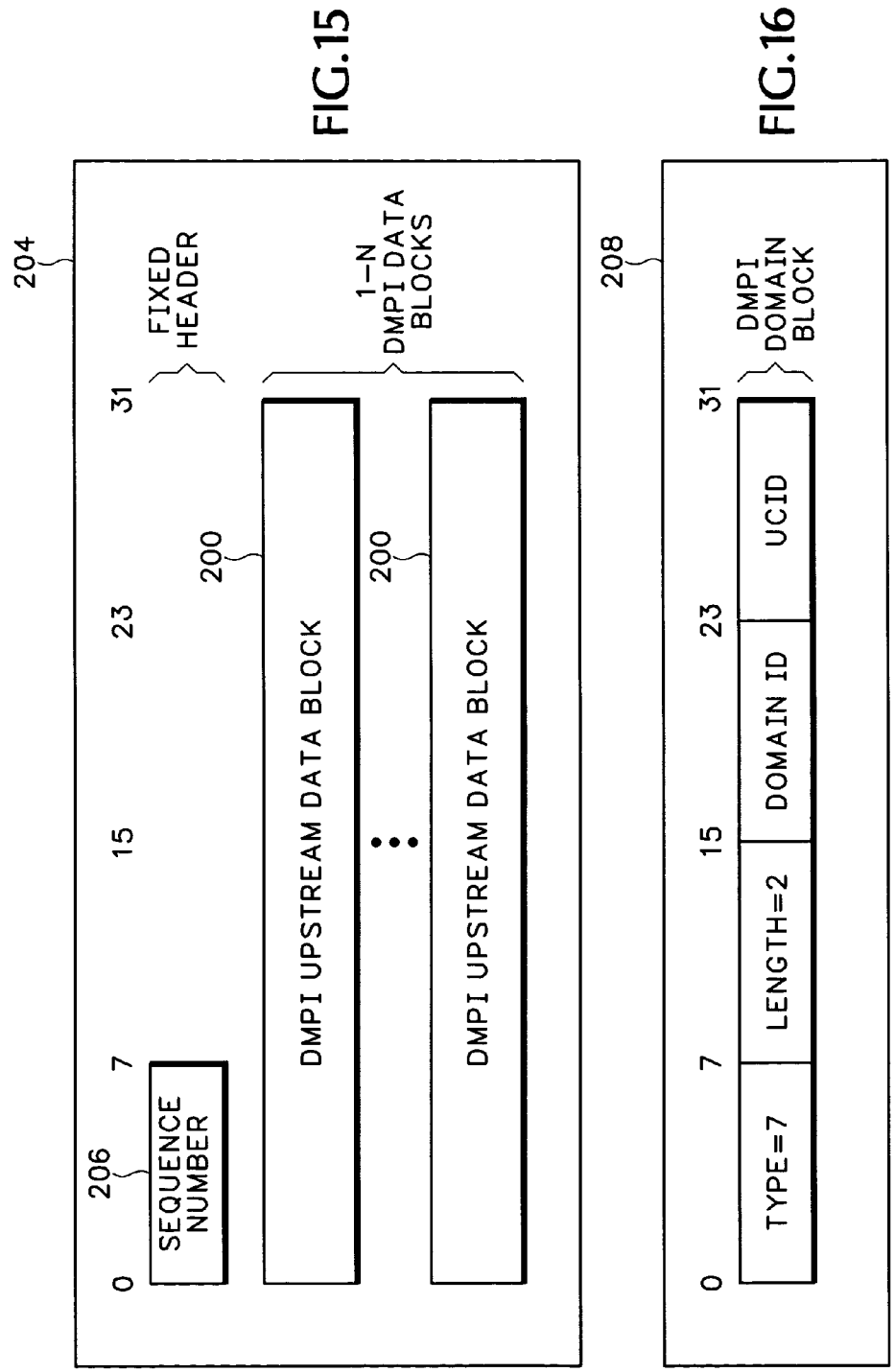

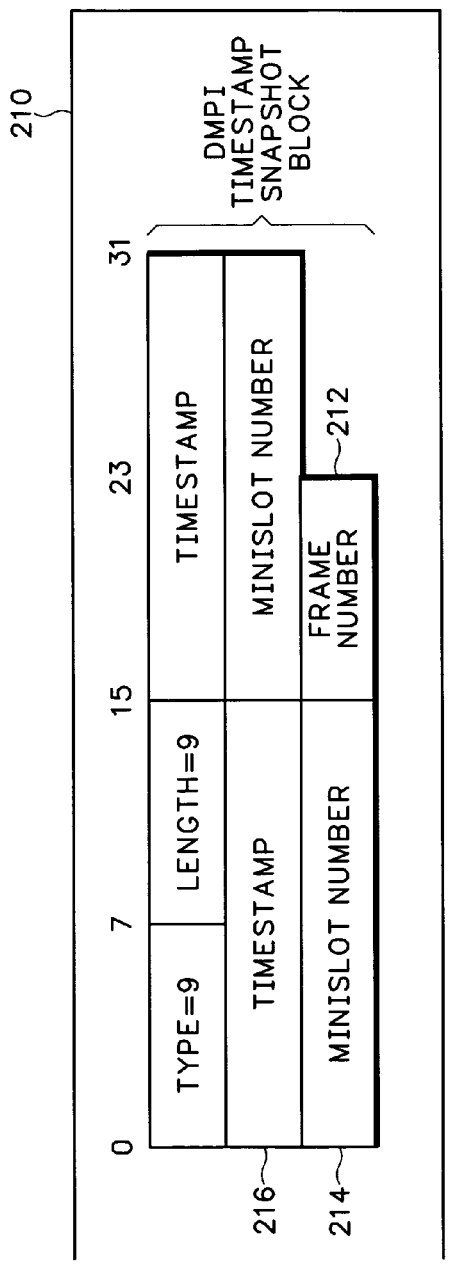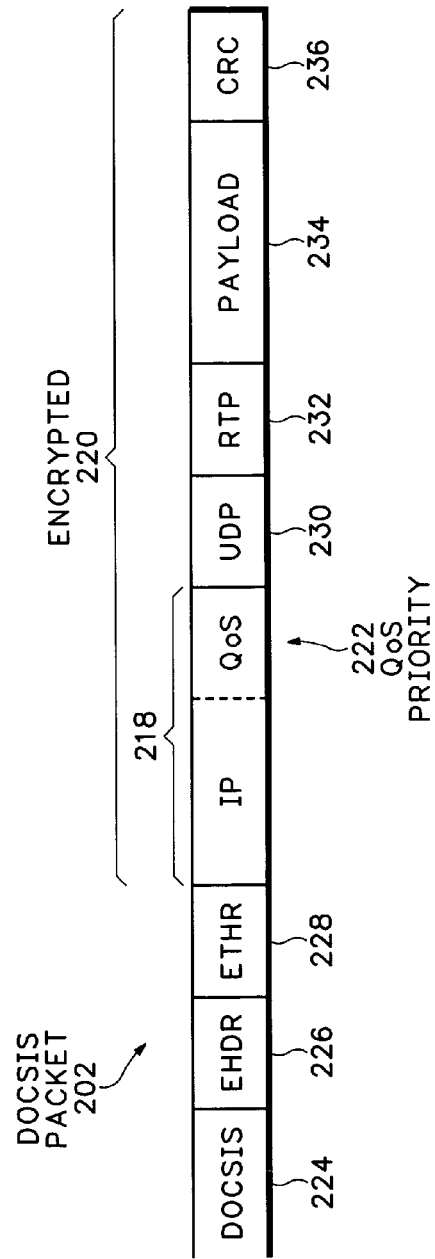

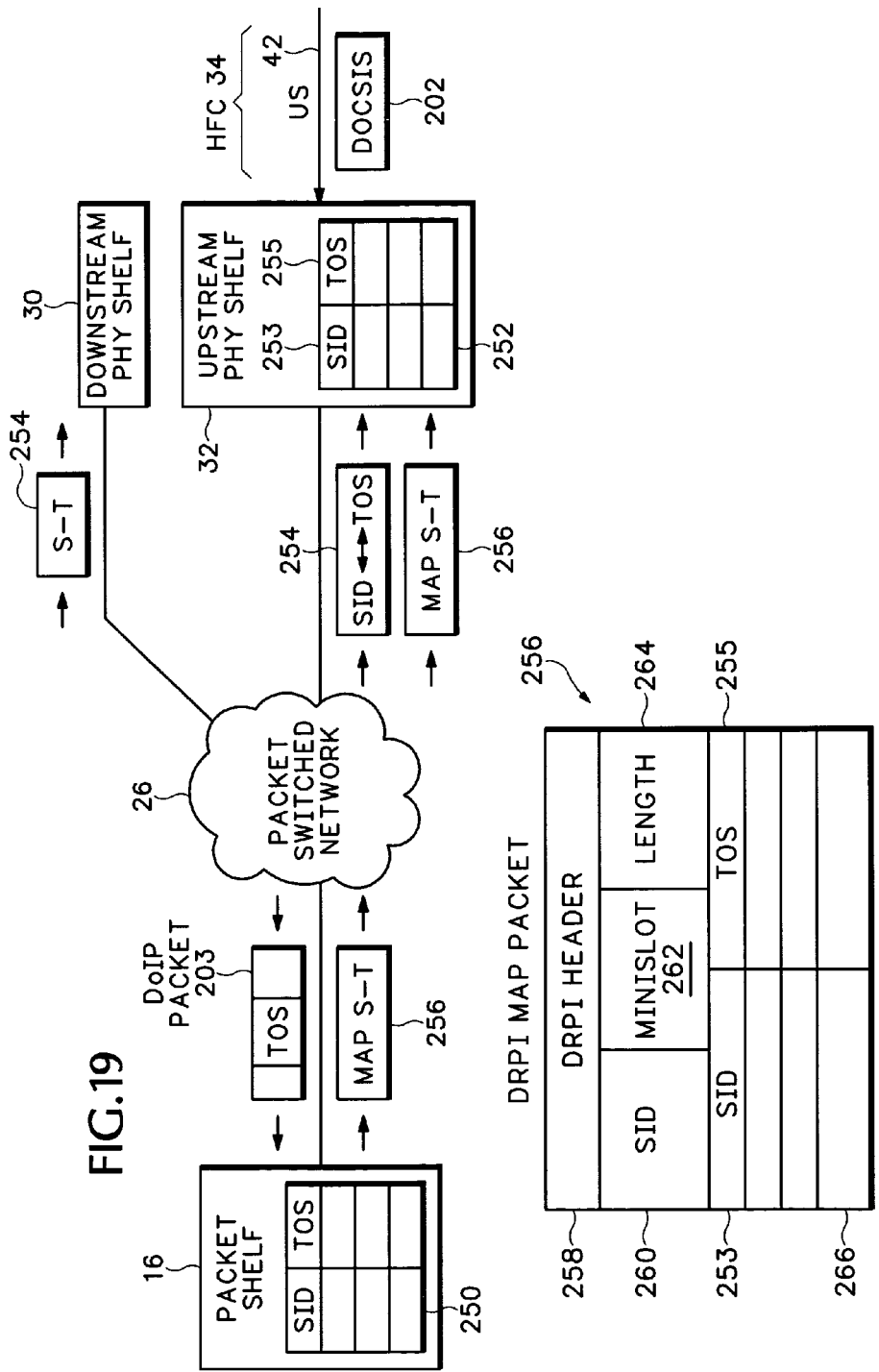

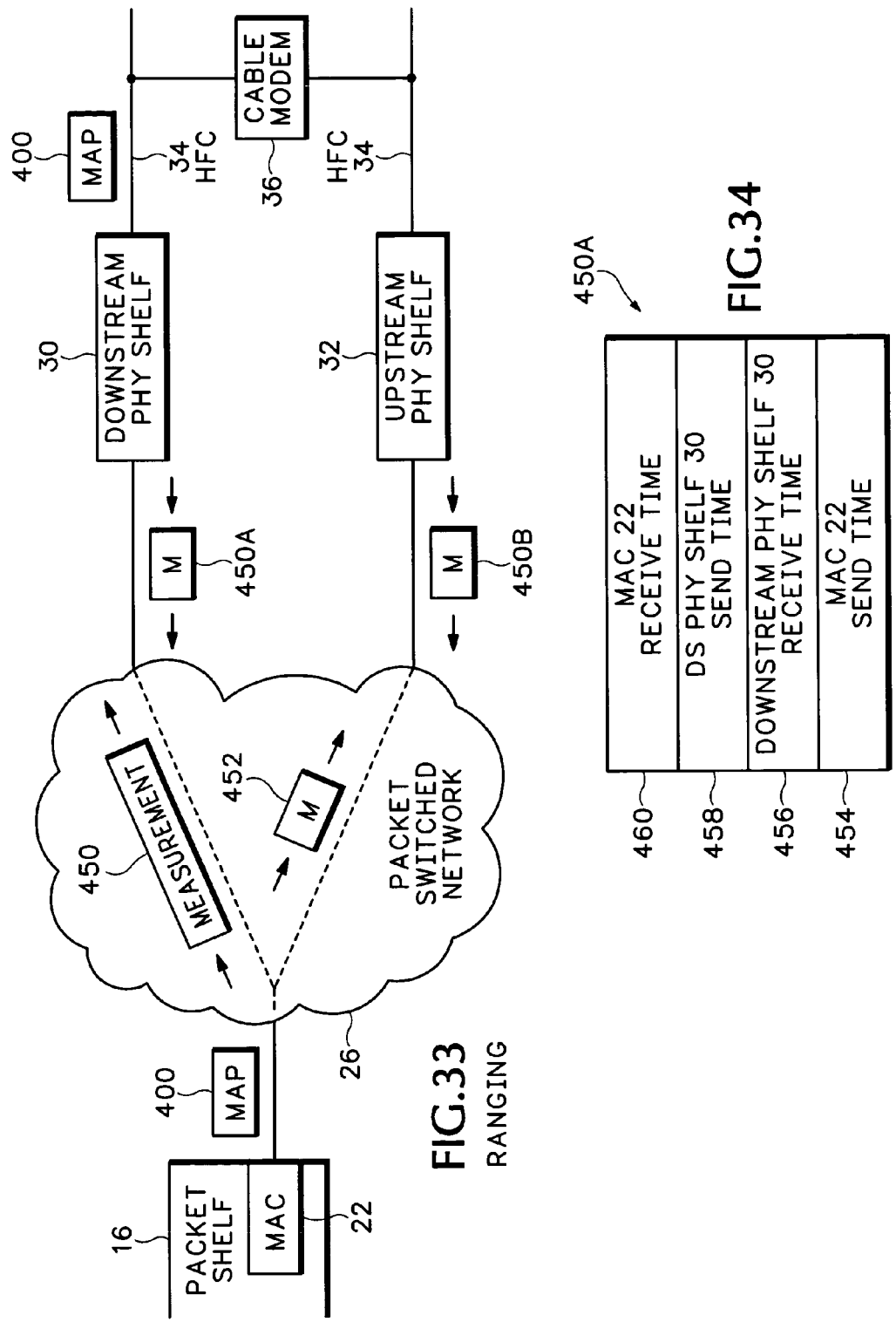

DE-JITTER

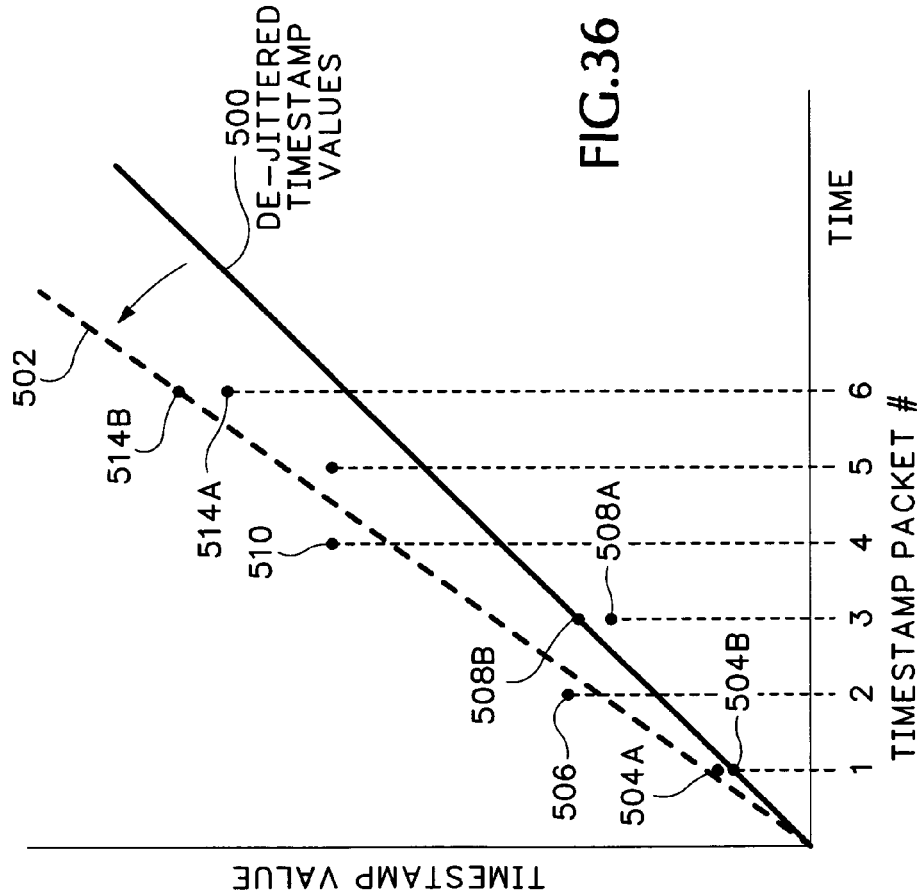

UPSTREAM PHYSICAL INTERFACE FOR MODULAR CABLE MODEM TERMINATION SYSTEM

CROSS REFERENCE TO RELATED APPLICATIONS

This application is a continuation-in-part of co-pending U.S. patent application No. 09/894,958, filed Jun. 27, 2001. The present application also claims priority of U.S. provisional patent application No. 60/574,506, filed May 25, 2004, and U.S. provisional patent application No. 60/574,876, filed May 26, 2004, and U.S. provisional patent application No. 60/622,312, filed Oct. 25, 2004, and U.S. provisional patent application No. 60/624,490, filed Nov. 1, 2004, and U.S. provisional patent application No. 60/635,995, filed Dec. 13, 2004, and U.S. provisional patent application No. 60/588,635, filed Jul. 16, 2004, U.S. provisional patent application No. 60/582,732, filed Jun. 22, 2004, and U.S. provisional patent application No. 60/590,509, filed Jul. 23, 2004.

BACKGROUND

Cable operators have widely deployed high-speed data services on cable television systems. These data services include a cable modem that allows a computer to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

Increasing demand for cable data services requires additional CMTS processing capacity. This can be prohibitively expensive since each CMTS provides routing, DOCSIS Media Access Control (MAC) processing, downstream signal modulation and upstream signal demodulation. The conventional CMTS architecture does not scale well since any one of the separate components in the CMTS can limit processing capacity and only a limited number of DOCSIS packet processing devices and physical interfaces can be located in the same CMTS chassis.

Different cable networks may also have different processing requirements. For example, one cable network may require substantially more upstream data services than other cable networks. However, it is difficult to customize CMTS architectures for these different data services requirements. It is also expensive to provide redundancy in current CMTS architectures since each backup CMTS includes DOCSIS MAC processors, downstream cable modulators and upstream signal demodulators.

The present invention addresses this and other problems associated with the prior art.

SUMMARY OF THE INVENTION

A modular Cable Modem Termination System (CMTS) includes a packet shelf operating a Data Over Cable Service Interface Specifications (DOCSIS) Media Access Control (MAC) framer. One or more downstream Physical Interface (PHY) shelves receive DOCSIS data from the packet shelf over a packet switched network and modulate the DOCSIS data for sending on a downstream path of a cable plant. One or more upstream PHY shelves send DOCSIS data received from an upstream path of the cable plant over the packet switched network to the packet shelf. By separating the PHY components from the MAC and from the system software, the PHY components for a Hybrid Fiber Coax (HFC) plant may be replaced with different PHY components for other access technologies such as wireless, Digital Subscriber Lines (DSL), Ethernet-to-the-Home, Fiber-to-the-Home, or fiber Passive Optical Networks (PONs).

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 6A and 6B show how the modular CMTS generates a tunnel.

FIG. 10 shows how the modular CMTS performs an early map release.

FIG. 15 is a diagram of upstream data block.

FIG. 16 is a diagram of a domain header sent along with the upstream data blocks.

FIG. 17 is a diagram of a timestamp snapshot block.

FIG. 18 is a diagram of a DOCSIS packet.

FIG. 19 shows how Quality of Service (QoS) values are associated with Service Identifiers (SIDs).

FIG. 20 shows a MAP packet used for assigning QoS values to Service Identifiers.

FIG. 33 shows how DOCSIS ranging is implemented in the modular CMTS.

FIG. 34 shows a measurement packet used during DOCSIS ranging.

FIGS. 35 and 36 show how timestamps are de-jittered in the modular CMTS.

DETAILED DESCRIPTION

Figure 1A:
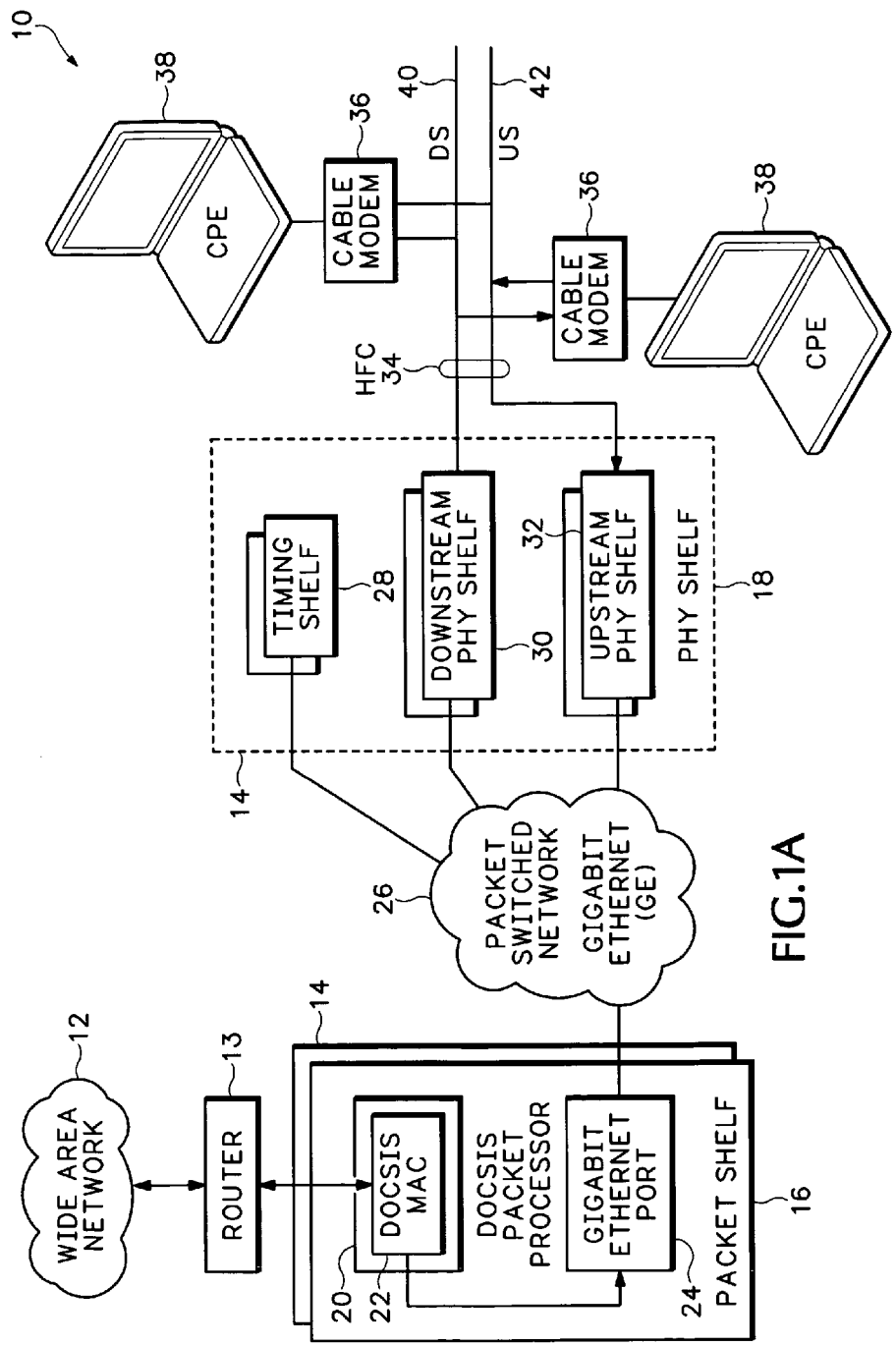
FIG. 1A is a diagram of a modular Cable Modem Termination System (CMTS).

Abbreviations and Acronyms
Term Definition
CM Cable Modem
CMTS Cable Modem Termination System
CRC Cyclic Redundancy Check
DOCSIS Data Over Cable Service Interface Specifications
DS Downstream
IP Internet Protocol
MAC Media Access Control. Used to refer to the layer 2 element of the system which would include DOCSIS framing and signaling.
MPEG Motion Picture Experts Group
MPEG-TS Motion Picture Experts Group Transport Stream
PHY Physical Layer. Used to refer to the downstream QAM transmitters and the upstream burst demodulators.
PHY SHELF In general, a line card with DOCSIS PHYs and located in a switch or router.
QAM Quadrature Amplitude Modulation or Quadrature Amplitude Modulator
UDP User Datagram Protocol Term Definition
US Upstream FIG. 1A shows a cable network 10 that includes a modular Cable Modem Termination System (CMTS) 14. The modular CMTS 14 includes a packet shelf 16 that communicates with a remote cable Physical Interface (PHY) shelf 18 over a packet switched network 26. In one embodiment, the packet switched network 26 is a Gigabit Ethernet (GE) network. However, the GE network 26 is only one example and any type of packet switched network can alternatively be used to connect the packet shelf 16 to the remote PHY shelf 18. In one embodiment, the packet shelf 16 and PHY shelf 18 can be implemented using packet processing routers or switches. Of course, other network processing devices can also be used.

The packet shelf 16 includes a Data Over Cable Service Interface Specifications (DOCSIS) packet processor 20 that operates a DOCSIS Media Access Controller (MAC) 22. In this example, a GE interface port 24 is used by the DOCSIS MAC 22 to communicate with the PHY shelf 18 over network 26. A router or routing processor 13 is located either internally or externally with the packet shelf 16. The router 13 transfers packets between the packet shelf 16 and a Wide Area Network (WAN) 12.

The remote PHY 18 includes one or more separate downstream PHY shelves 30, one or more separate upstream PHY shelves 32, and possibly one or more timing shelves 28. It is also possible to locate the timing shelf 28 with the packet shelf 16 or include the timing shelf with the upstream PHY shelf 30 or downstream PHY shelf 32. Any combination of chassis can be used to house the different shelves 28, 30 and 32. In one example, each chassis contains at least one downstream PHY shelf 30 and one upstream PHY shelf 32. In an alternative embodiment, different chassis may contain one or more downstream PHY shelves 30 or one or more upstream PHY shelves 32, but not both. In another embodiment, the remote PHY shelf 18 may contain one or more downstream PHY shelves, while the upstream PHY 32 is combined with the rest of the CMTS in a conventional CMTS chassis.

The PHY shelf 18 is connected to one or more Hybrid Fiber/Coax (HFC) plants 34 that each include a downstream path 40 and an upstream path 42. The HFC 34 is a broadband bidirectional shared-media transmission system that uses fiber trunks between the PHY shelf 18 and fiber nodes (not shown). Coaxial distribution is provided from the fiber nodes to customer locations 38.

The endpoints 38 of the cable network 10 are alternatively referred to as Customer Premise Equipment (CPE) and can include any wired or wireless device that needs to communicate over WAN 12. For example, CPE 38 may include any type of computer server, laptop, Personal Computer (PC), etc that communicates over the HFC 34 through a Cable Modem (CM) 36. The Cable Modem 36 may be located in the CPE 38, may be located in a separate chassis, or may be integrated into a Set Top Box (STB) (not shown). The cable modem 36 operates a DOCSIS MAC that conducts DOCSIS messaging and transfers DOCSIS frames with the DOCSIS MAC 22 in packet shelf 16. Operation of the cable modem 36 is known to those skilled in the art and is therefore not described in further detail.

The modular CMTS 14 decouples the backplane communications that were previously required between a CMTS DOCSIS MAC and the CMTS PHY interface that are used for communicating over cable plant 34. This allows the DOCSIS MAC 22 in packet shelf 16 to communicate to the PHY shelf 18 remotely over packet switched network 26 and allows the downstream PHY shelf 30 to operate independently from the upstream PHY shelf 32. As a result, the modular CMTS components can be more effectively matched with different cable network requirements. For example, if more cable modems 36 are connected to the HFC 34, more downstream PHY shelves 30 and/or upstream PHY shelves 32 can be added to the modular CMTS 14 to support the increased DOCSIS bandwidth demand.

Figure 1B:
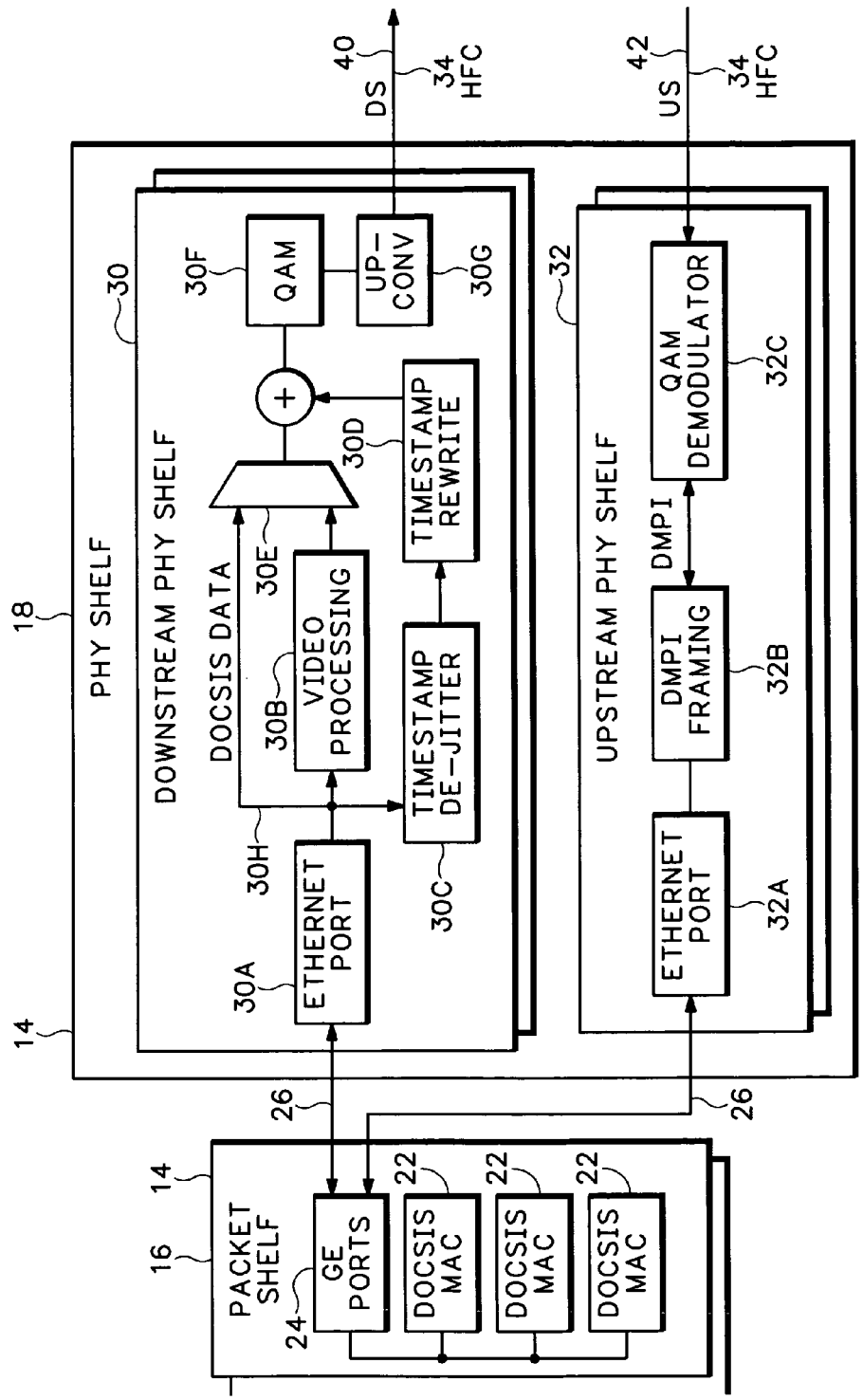
FIG. 1B is a more detailed diagram of the modular CMTS shown in FIG. 1A.

FIG. 1B shows the modular CMTS 14 in more detail. There can be more than one packet shelf 16 that communicates to the same PHY shelf 18. Each packet shelf 16 can include multiple DOCSIS MAC cards 22 that each communicate over the packet network 26 through GE ports 24. The downstream PHY shelf 30 includes an Ethernet port 30A that sends DOCSIS data 30H to a QAM modulator 30F. Native elementary stream video encapsulated in UDP or RTP and received on Ethernet port 30A is processed by a video processor 30B before being sent to the QAM 30F. Timestamp information is sent to a timestamp de-jitter element 30C and then rewritten in a timestamp rewrite element 30D before being sent to the QAM 30F. The modulated output signal from the QAM 30F is passed through an up-converter 30G before being sent on the downstream path 40 of the HFC 34.

The upstream PHY shelf 32 includes an Ethernet port 32A that both receives DOCSIS messages from the packet shelf 16 and sends DOCSIS messages and data to packet shelf 16. A QAM demodulator 32C demodulates signals received on the upstream path 42 of the HFC 34. A DOCSIS Remote PHY Interface (DRPI) framer 32B frames the data received over upstream path 42 for transport over the packet switched network 26.

Figure 2:
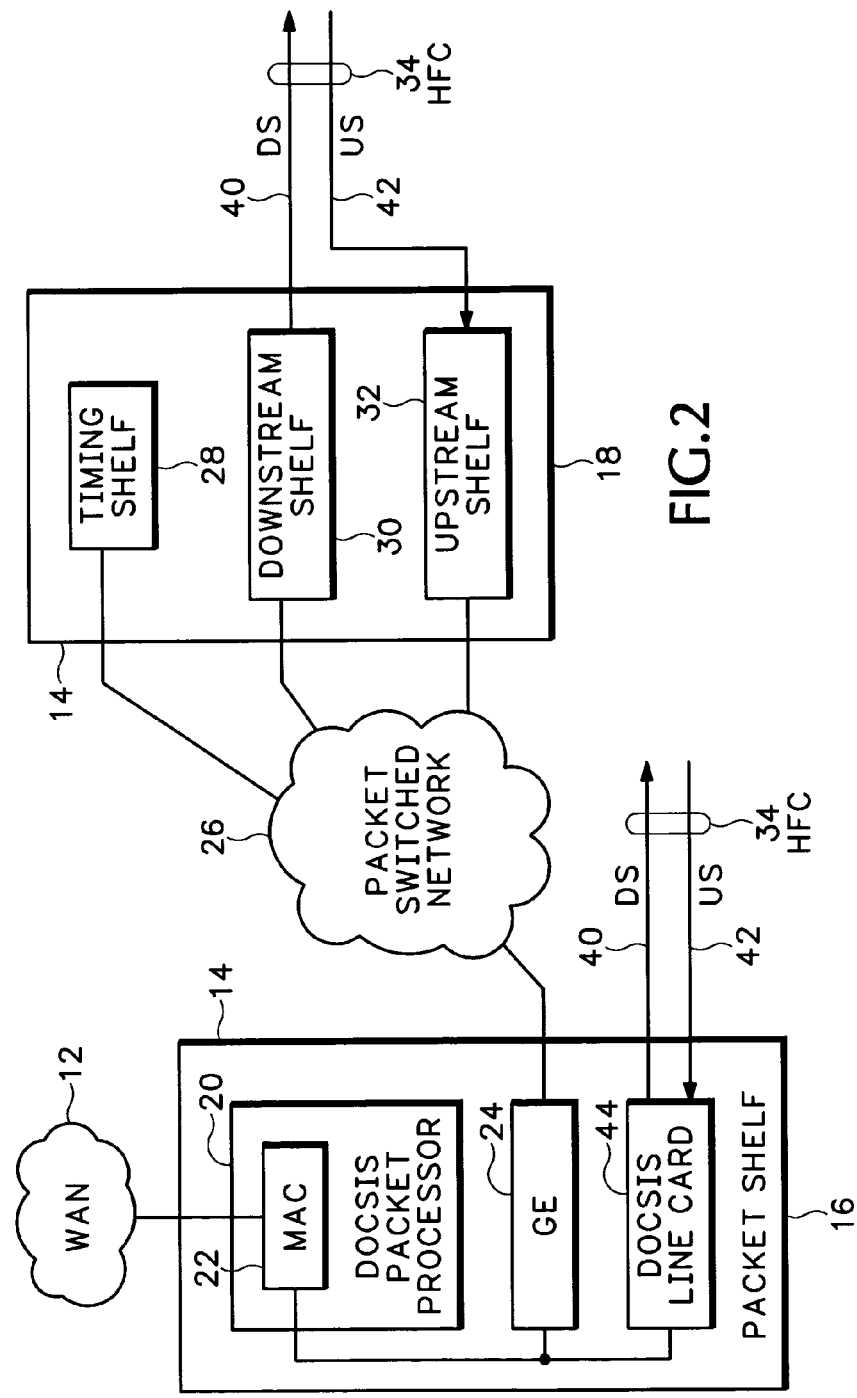
FIG. 2 shows an alternative embodiment of the modular CMTS.

FIG. 2 shows an alternative embodiment of the modular CMTS 14 where the packet shelf 16 also includes a DOCSIS line card 44 that connects to the HFC 34. This is in addition to the remote PHY 18 that is also connected to HFC 34 and still connected via packet switched network 26 to the packet shelf 16. In one embodiment, the PHY shelf 18 still includes the timing shelf 28, downstream shelf 30 and upstream shelf 32. Alternatively, the DOCSIS line card 44 in the packet shelf 16 may handle all upstream DOCSIS traffic and the remote PHY 18 may only include downstream PHY shelf 30 for handling downstream DOCSIS traffic. In another embodiment, the remote PHY 18 may still include upstream PHY shelves 32, but fewer than the remote PHY shelf 18 shown in FIG. 1.

Figure 3:
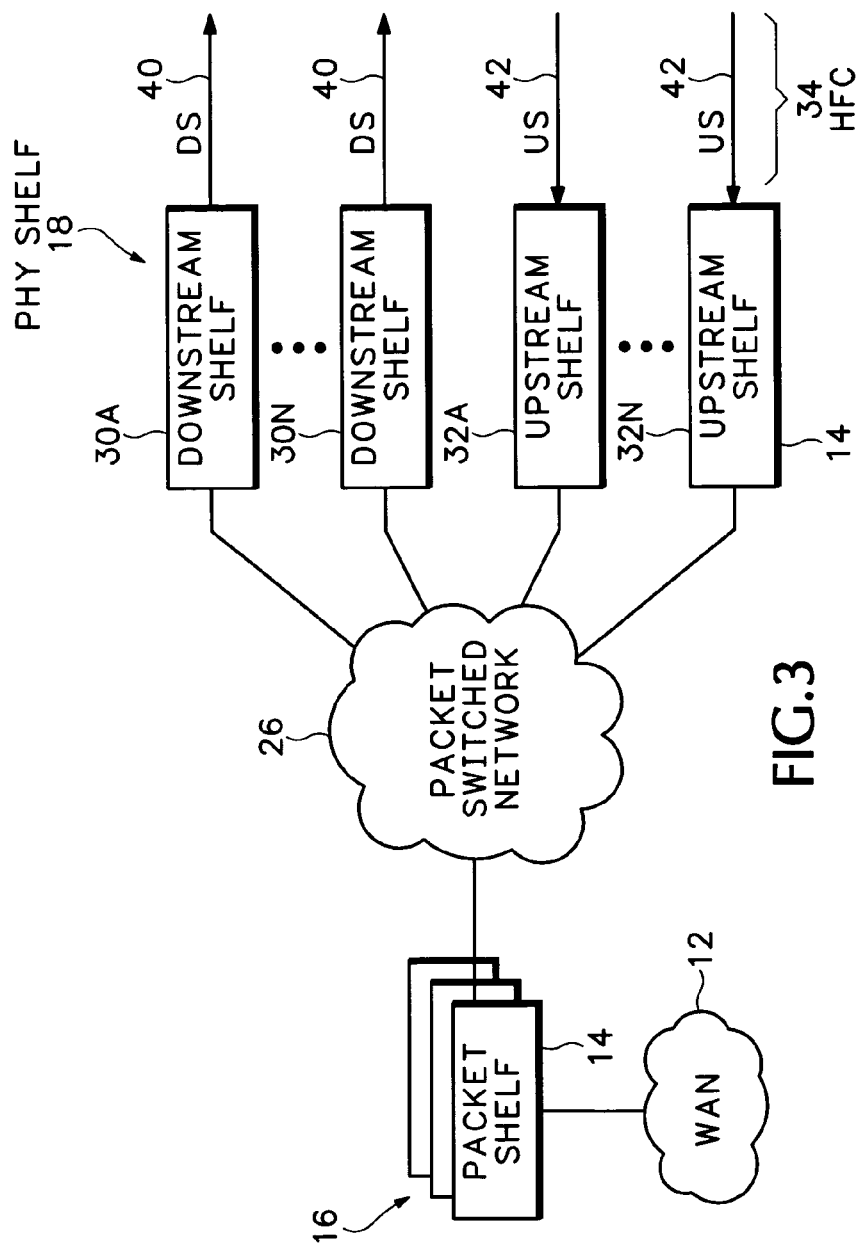
FIG. 3 shows another alternative embodiment of the modular CMTS.

FIG. 3 shows another alternative embodiment of the modular CMTS 14 where multiple packet shelves 16 connect to multiple downstream PHY shelves 30A-30N and also connects to multiple upstream PHY shelves 32A-32N. Each downstream PHY shelf 30 connects to the downstream path 40 of the same or different HFC 34 and each upstream PHY shelf 32 connects to the upstream path 42 of the same or different HFC 34. Any combination of upstream PHY shelves 30 and downstream PHY shelves 32 can be contained in the same chassis.

Figure 4:
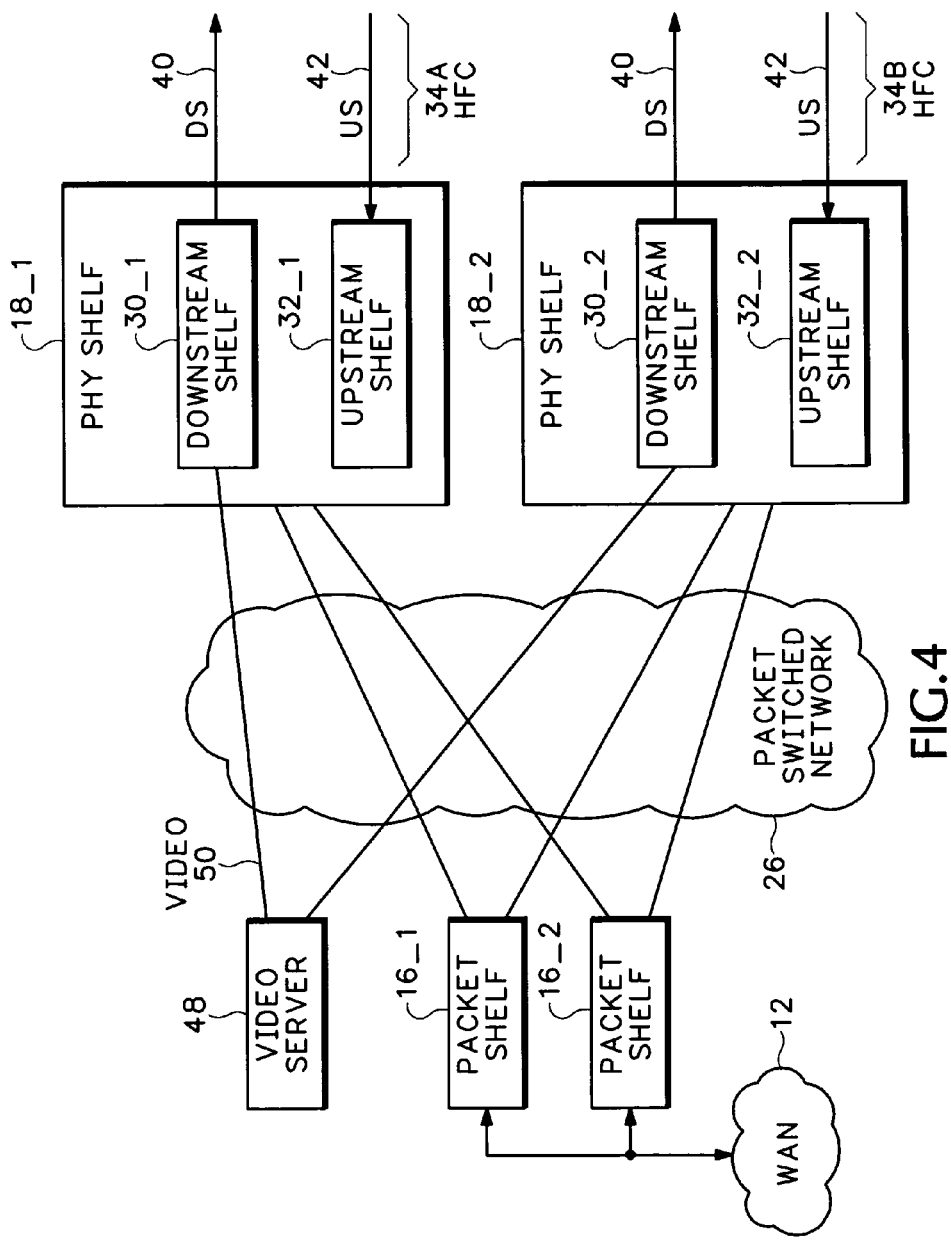
FIG. 4 shows yet another alternative embodiment of the modular CMTS.

FIG. 4 shows another embodiment where two different packet shelves 16_1 and 16_2 are each connected to the same PHY shelves 18_1 and 18_2. In this embodiment, packet shelf 16_1 and packet shelf 16_2 may each connect to the same downstream PHY shelves 30_1 and 30_2 and the same upstream PHY shelves 32_1 and 32_2. The configuration in FIG. 4 allows for additional DOCSIS MAC capacity by having the two packet shelves 16_1 and 16_2 communicate with either or both PHY shelf 18_1 or 18_2. Alternatively, one of the packet shelves 16_1 or 16_2 can operate as a backup DOCSIS MAC, if the primary packet shelf is disabled or fails.

In yet another embodiment, the PHY shelves 18_1 and 18_2 also receive video data 50 from one or more video servers 48 over packet switched network 26. In this embodiment, the video server 48 sends video data 50 to the downstream PHY shelves 30_1 and 30_2 for modulation over the downstream path 40 of the different HFCs 34.

Figure 5:
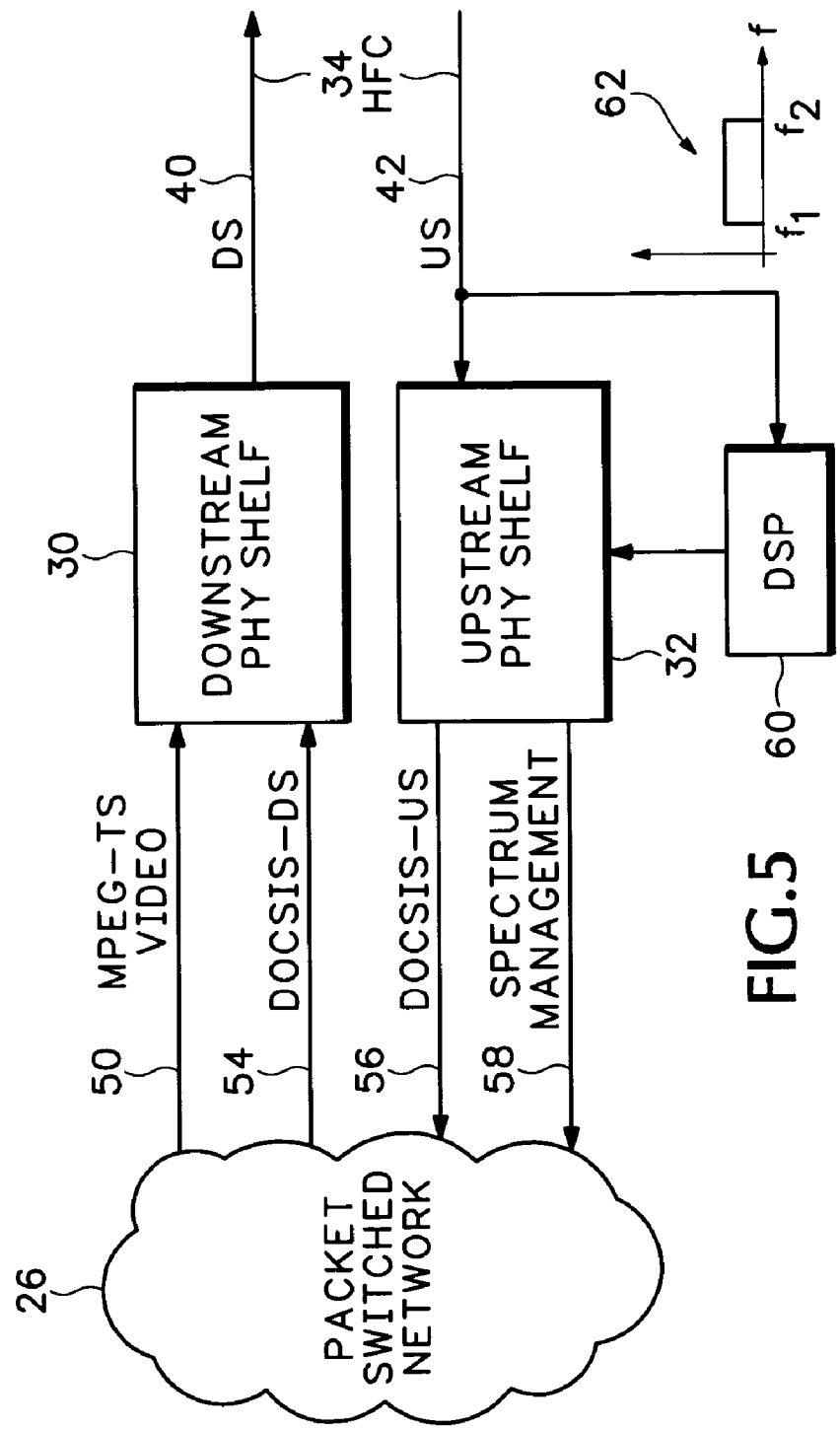
FIG. 5 shows the different data streams sent and received by a remote Physical Interface (PHY) in the modular CMTS.

This is shown in more detail in FIG. 5 where downstream PHY shelf 30 receives both Moving Picture Experts Group Transport Stream (MPEG-TS) video data 50 from the video server 48 shown in FIG. 4 and also receive the DOCSIS downstream data 54 from the packet shelf 16 (FIG. 4). The upstream shelf 32 sends DOCSIS upstream data 56 back to the packet shelf 16 and also generates spectrum management data 58 that may be used by the packet shelf 16, or some other management server, to monitor signaling on the HFC 34. For example, a Digital Signal Processor (DSP) 60 in the upstream shelf 32 may generate analysis data from the frequency spectrum 62 of the upstream path 42. The upstream shelf 32 then converts the analysis data into packets that are then sent over the packet switched network 26 to the packet shelf 16 or other management server.

Remote PHY Downstream Protocol

A remote PHY downstream protocol determines how DOCSIS messages and data is transferred between the MAC 22 in the packet shelf 16 and the downstream PHY shelf 30 and how messaging is sent from the MAC 22 to the upstream PHY shelf 32. In one embodiment, the remote PHY downstream protocol is unidirectional and no acknowledgement messages are required in an upstream direction. In an alternative embodiment, data messages are not acknowledged but control messages are acknowledged.

Figure 6A:
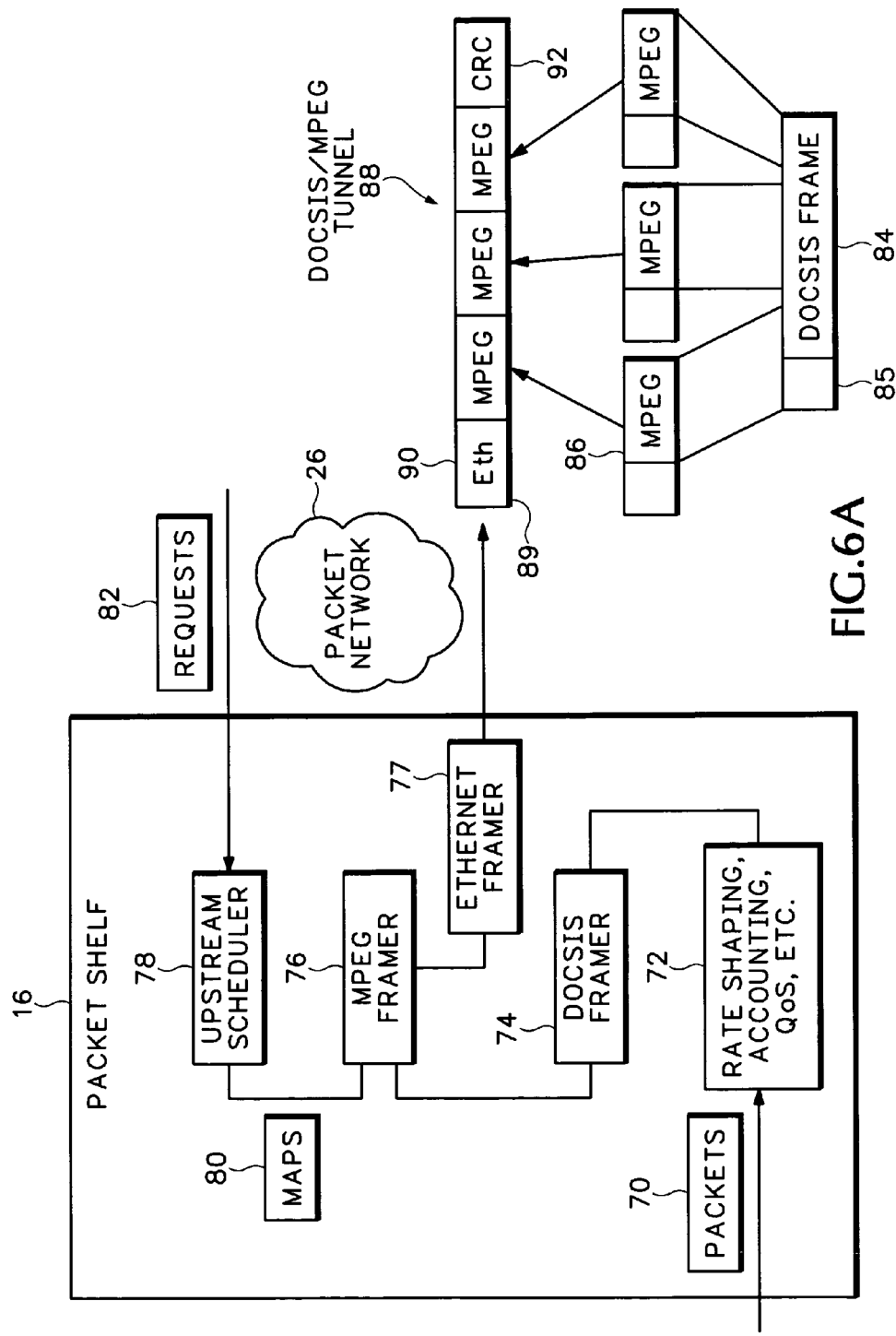

FIG. 6A shows the functional elements in packet shelf 16 in more detail. Packets 70 are received from a routing device that is either internal or external to the packet shelf 16. Some operations 72, such as a rate shaping, accounting, Quality of Service (QoS), etc. are performed on the incoming packets 70. After operations 72, the packets 70 are converted into DOCSIS frames 84 by a DOCSIS framer 74 and then converted into MPEG frames 86 by an MPEG framer 76 that are alternatively referred to as MPEG packets. The DOCSIS framer 84 generates DOCSIS frames 84 from packets 70 received over WAN 12 (FIG. 1) or generates DOCSIS frames 84 for DOCSIS messages, such as for MAP 80.

An upstream scheduler 78 generates DOCSIS MAPs 80, for example, in response to DOCSIS transmit requests 82 received from cable modems 36 (FIG. 1A). In one example, the MAPs 80 identify timeslots allocated to the requesting cable modem 36 for transmitting data in the upstream path 42 of HFC plant 34 (FIG. 1A). The MAPs 80 are sent to the MPEG framer 76 and formatted into MPEG frames 86 that are sent to the Ethernet framer 77 along with the MEPG frames 86 containing packet data 70.

It should be understood that the MEPG framer 86 is used in one embodiment of the modular HFC 14. In an alternative embodiment shown in FIG. 6B, a Packet Streaming Protocol (PSP) is used for transporting DOCSIS frames from the packet shelf 16 to the PHY shelf 18. In the PSP embodiment, DOCSIS frames 84 are concatenated together into a continuous data stream 94. The concatenated data stream 94 is then broken up into separate packet fragments 98 that each include a PSP header 96. The PSP headers 96 may include pointers 97 that identify where different DOCSIS frames 84 are located. The concatenation 94 can lower the Packet Per Second (PPS) throughput in switching engines used in the modular CMTS system. The concatenated data stream 94 is then fragmented to meet the Maximum Transfer Unit (MTU) of the packet switched network media 26 (FIG. 1A).

In yet another embodiment, the DOCSIS frames 84 generated by the DOCSIS framer 74 are not formatted into MPEG frames 86 and alternatively sent directly to the Ethernet framer 77. In the embodiment, the conversion of DOCSIS frames to MPEG frames is performed in the PHY shelf 18.

Tunneling

In one embodiment, the packet shelf 16 creates a tunnel 88 over the packet switched network 26 for transporting the DOCSIS frames to the downstream PHY shelf 30. In one embodiment, an MPEG tunnel 88 is used. In an alternative embodiment, a DOCSIS tunnel is used. If a DOCSIS tunnel is used, a new field 85 may be used in the DOCSIS header for packet fragmentation or concatenation. This allows DOCSIS frames to be fragmented over multiple Ethernet packets. The fragmentation or concatenation field 85 contains numbers identifying the sequence for the fragmented DOCSIS frames 84.

For the MPEG tunnel, the Ethernet framer 77 encapsulates one or more MPEG frames 86 into the payload of the same Ethernet frame 89 that includes an Ethernet header 90 and a Cyclic Redundancy Check (CRC) 92.

Figure 7:
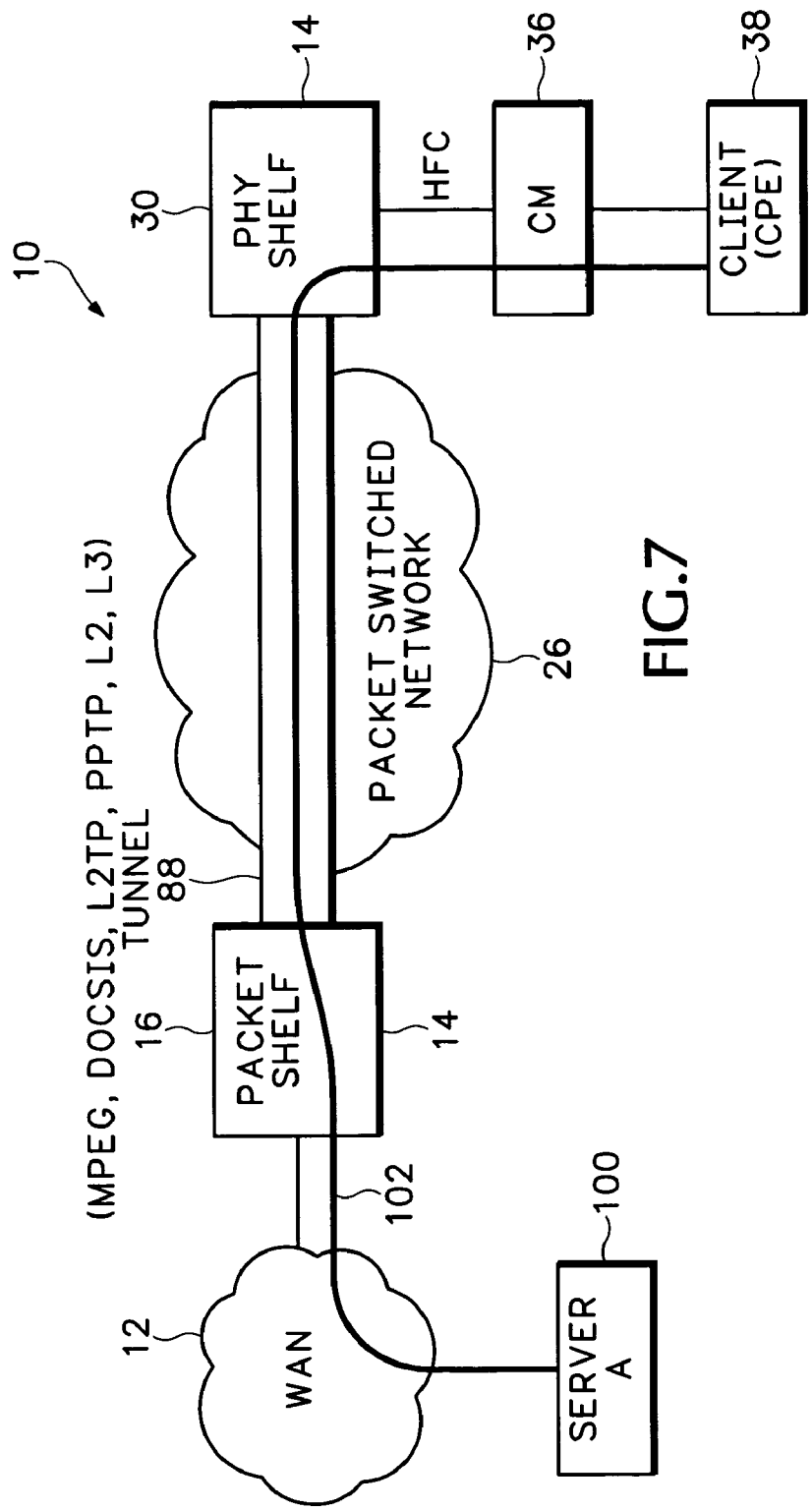
FIG. 7 shows how two devices conduct an Internet Protocol (IP) session through the modular CMTS.

FIG. 7 shows a logical representation of the tunnel 88 formed in the packet switched network 26 between the packet shelf 16 and the PHY shelf 18. Examples of MPEG and DOCSIS tunnels 88 are referred to below in FIGS. 8A-8D.

However, it should be understood that any type of tunneling protocol or Virtual Private Network (VPN) connection can be used over the packet switched network 26. For example, a Layer-two Tunneling Protocol (L2TP), Layer-Two Tunneling Protocol Version 3 (L2TPV3), Point-to-Point Tunneling Protocol (PPTP) can alternatively be used to create tunnel 88 over packet switched network 26 between the packet shelf 16 and the PHY shelf 18. The L2TP protocol is described in U.S. Pat. No. 5,918,019, issued Jun. 29, 1999 and in RFC 2661 and RFC 3931 and is herein incorporated by reference. Layer-3 tunnels can alternatively be used. The tunnel 88 can alternatively be established over a non-Ethernet interface using for example, Resilient Packet Ring (RPR).

An IP connection 102 is established between a device 100 on the WAN 12 and a client or CPE 38 in the cable network 10 through tunnel 88. The tunnel 88 allows the packet shelf 16 to perform the DOCSIS MAC operations and then transport the DOCSIS frames over the packet switched network 26 to the PHY shelf 18. The downstream PHY shelf 30 is therefore not required to perform DOCSIS MAC operations 22 (FIG. 1A).

UDP Transport Packet Format

Figure 8A:
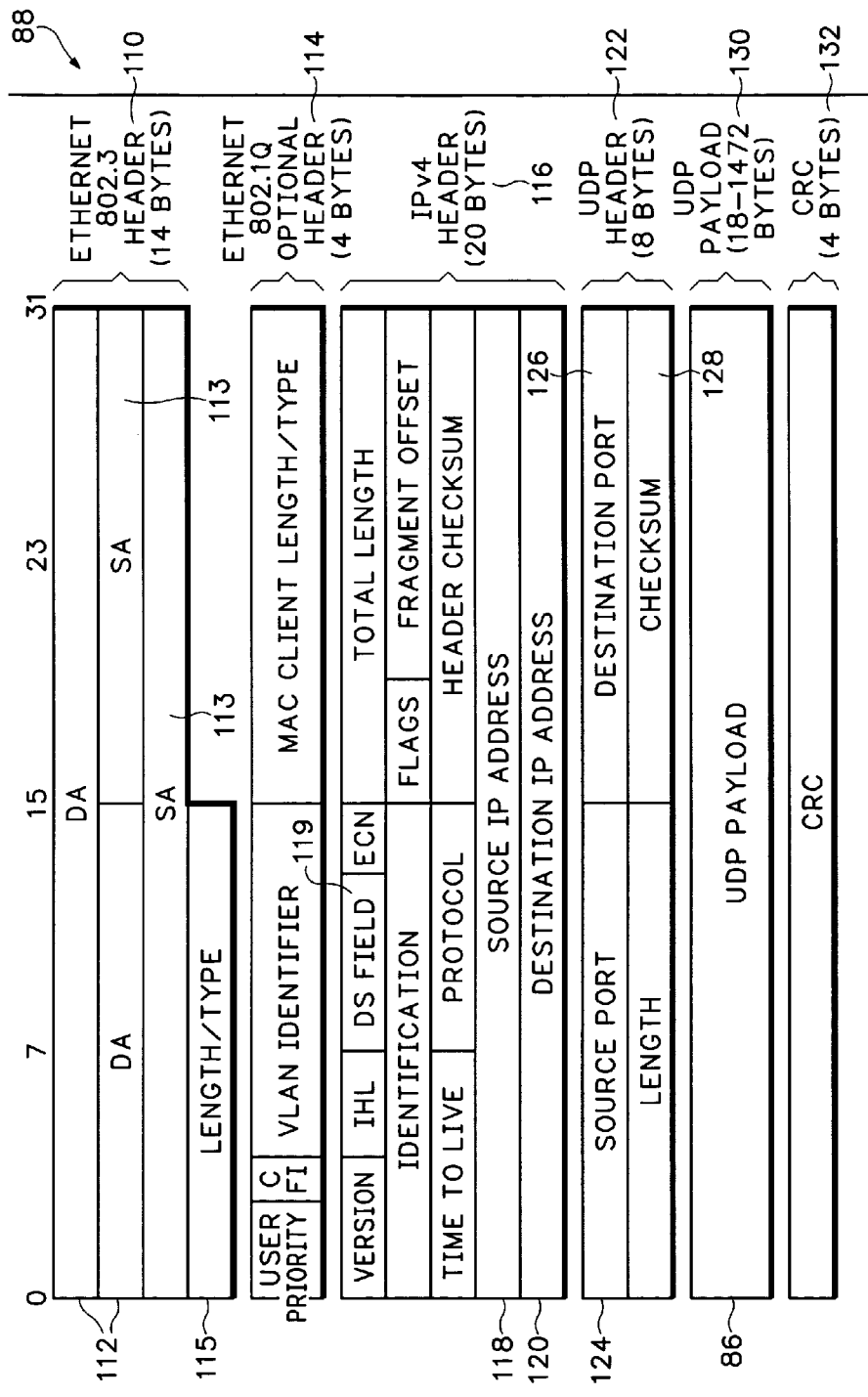
FIGS. 8A-8C show packet formats used by the modular CMTS.

FIG. 8A shows one example of a UDP transport packet format used for encapsulating and transporting the DOCSIS frames 84 over the packet switched network 26 to the PHY shelf 18. Within the UDP payload, there are two types of payload. The first is a MPEG Transport Stream (MPT) based format and the second is a Packet Streaming Protocol (PSP) based format. The choice of which format to use is based upon the type of traffic being carried.

In the following protocol usage description, the term "source shelf" refers to the packet shelf 16 and the term "destination shelf" refers to the downstream PHY shelf 30. An Ethernet header 110 is defined by IEEE-802.3. Upon transmission of Ethernet packet 89 by the source shelf, the Ethernet destination address 112 will be the Ethernet address of the destination shelf or of the next hop router in packet switch network 26.

Upon reception of frame 89 by the destination shelf, the Ethernet source address 113 will be the Ethernet address of the output port of the source shelf or of the previous hop router in network 26.

An Ethernet 802.1Q header 114 is defined by IEEE-802.1Q. Header 114 is optional and provides frame prioritization and Virtual Local Area Network (VLAN) support at layer 2 of the Open System Interconnect (OSI) model. In one implementation when header 114 is used, the Length/Type field 115 of the 802.3 header 110 is set to an appropriate 802.1QTagType value. The packet shelf 16 and the upstream PHY shelf 32 optionally may or may not support header 114.

An IP header 116 is defined by RFC-791. An IP source address 118 in header 116 is the IP address of the source shelf. An IP destination address 120 is the IP address of the destination shelf. The IP destination address 120 may be an IP unicast or IP multicast address. In one example, the IP header 116 uses IPv4 or IPv6. Of course any version of the IP protocol can be used. In one embodiment, the Quality of Service (QoS) information associated with the tunnel 88 is contained in a DiffServ (DS) field 119 of the IP header 116.

A UDP header 122 is defined by RFC-768 and the CRC 132 is defined by IEEE-802.3. Alternatively, a Generic Routing Encapsulation (GRE) header can be used instead of UDP header 122. In one embodiment, the UDP source port 124 is unused and is set by the source shelf to all zeros. The destination shelf may ignore the UDP source port 124. The UDP destination port 126 is a common agreed upon value between the source shelf and the destination shelf. In one implementation, the source shelf might set the UDP checksum 128 to zero and the destination shelf may have the ability to ignore this UDP checksum field.

MPT Mode

Figure 8B:
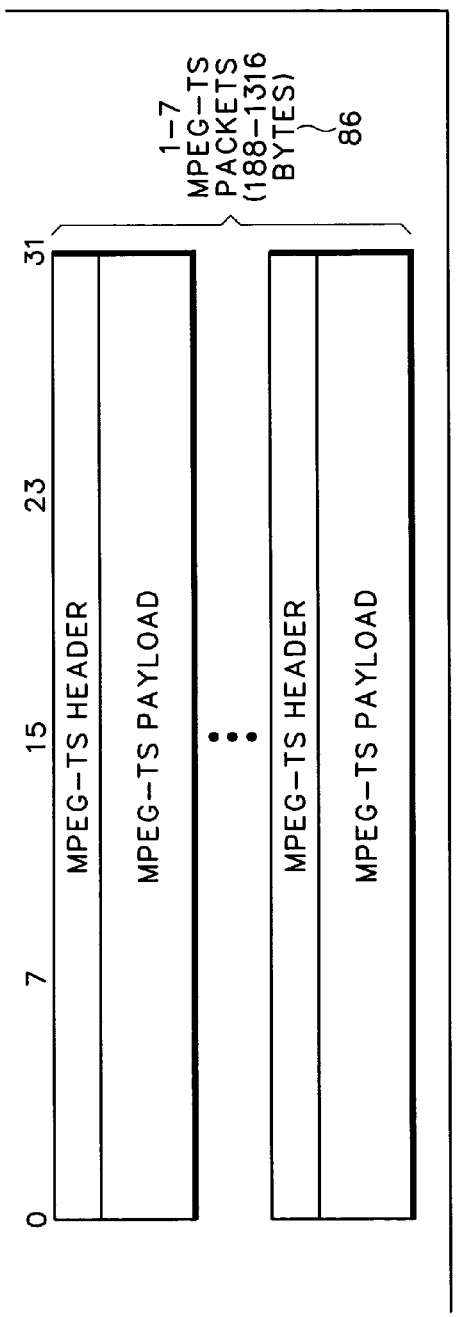

The payload of UDP packet 89 for the MPT mode is shown in FIG. 8B. The downstream PHY shelf 30 accepts one to seven (or more for systems with an MTU larger than 1500 bytes) MPEG-TS packets 86 within the UDP payload 130 (FIG. 8A) of the UDP packet 89. The packet shelf 16 in one embodiment does not put stuffing bytes between the UDP header 122 and the first MPEG-TS header or between consecutive MPEG-TS packets 86.

In one embodiment, the maximum length of 7 MPEG-TS packets 86 are allowed within the UDP/IPv4 packet within a 802.3 Ethernet frame with 802.1 Q tagging. Of course other Ethernet frame lengths can also be used and the maximum number of packets allowed can be varied. The downstream PHY shelf 30 may generate NULL MPEG-TS frames when there are no MPEG-TS packets 86 to be transmitted.

PSP Mode

Figure 8C:
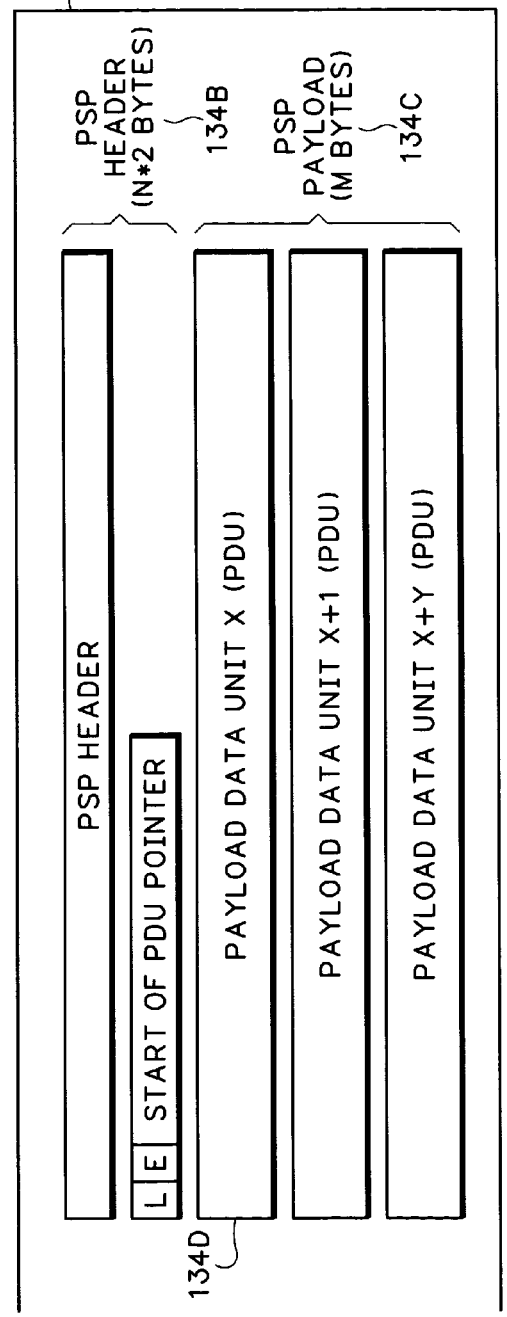

The payload 130 of a UDP packet 89 for PSP mode is shown in FIG. 8C. The PSP Payload Data Unit (PDU) 134C consists of one or more DOCSIS frames. The DOCSIS frame includes a fully formatted DOCSIS header, any extended headers, the DOCSIS payload, and the CRC. The Packet Streaming Protocol (PSP) can take a series of layer 3 packets, layer 2 frames, or any fixed or variable sized pieces of data, assemble them as a stream of back to back Payload Data Units (PDUs) 134D, and then break that stream up into segments and encapsulate each segment with a PSP header 134B. In doing so, the first and last PDU 134D of a PSP packet 89 may be fragmented.

The PSP has two basic modes for recovering individual PDU frames 134 out of a series of PSP packets 134. The two modes are interpretive and non-interpretive. The mode to be used, and the PDU type (for example, DOCSIS, IP, Ethernet), are negotiated as part of the assignment of the payload type.

Interpretive Mode

In the interpretive operation of PSP mode, the PSP packet 134 has one PDU pointer. The PDU pointer points to the first PDU 134D that has its first byte in the PSP packet 134. If the PDU pointer is non-zero, the bytes prior to the location pointed to by the first pointer are considered a fragmented PDU 134D, and are combined with the last PDU of the previous PSP packet 134. The receiver then starts to interpret the contents of the PDU based upon the protocol type associated with the payload type. When it reaches the end of the DOCSIS frame, but it has not reached the end of the PSP packet 134, it assumes another PDU 134D is appended, and begins to interpret that PDU. By doing so, all PDUs 134D are broken apart and reassembled.

Non-Interpretive Mode

In the non-interpretive operation of PSP, the PSP packet 134 has one PDU pointer for each start of a PDU 134D. The same PDU fragment rule applies if the first SOP is non-zero. Since each PDU 134D is explicitly called out, the receiver that manages the reassembly of the PDUs 134D does not have to be aware of the protocol within the PDU. If the last PDU pointer does not have the End bit E set, then the PDU 134D is considered a fragment and is held until the next PSP packet 134 is parsed.

Remote PHY Protocol Operation

Figure 8D:
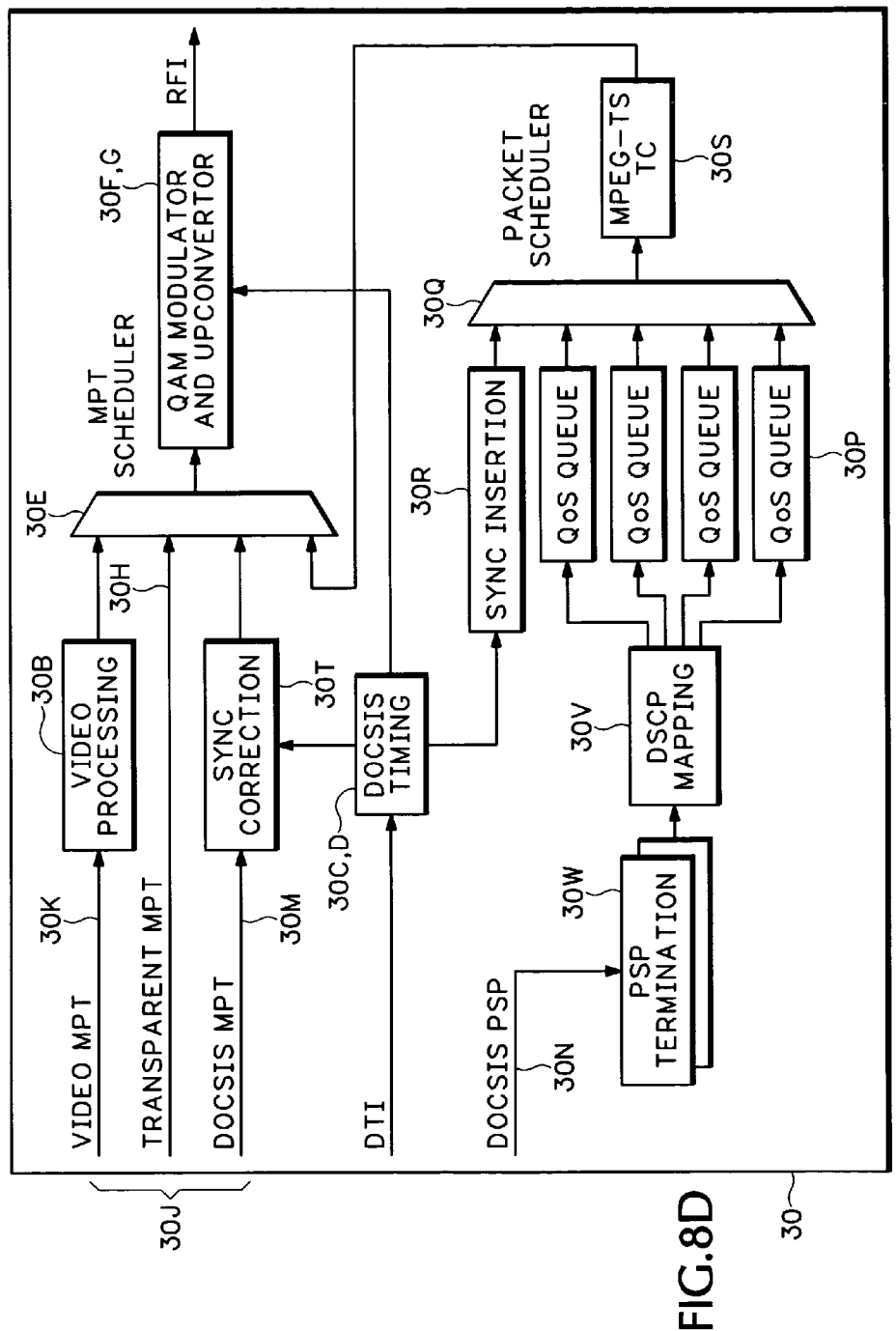
FIG. 8D shows a more detailed diagram of the downstream remote PHY used in the modular CMTS.

FIG. 8D shows a simplified block diagram of the internal data paths of the downstream PHY shelf 30 previously shown in FIG. 1B.

MPT Data Path

The Downstream PHY shelf 30 may receive MPEG elementary streams which have been encapsulated in MPT packets 86 (FIG. 8B) and placed in a UDP datagram. This is referred to as the video MPT flow 30K. A transparent MPT flow 30H is received and transmitted to the QAM interface 30F without any interpretation of the contents of those MPT packets. There may be more than one transparent MPT flow 30H where each flow has a different Differentiated Services Code Point (DSCP) and different addressing, but is destined for the same QAM channel.

All DOCSIS frames, including packet based frames and MAC management based frames, are included within the MPT flow 30J. The downstream PHY shelf 30 searches the MPT payload for any DOCSIS SYNC messages and performs SYNC corrections 30T. It then forwards the MPT packet to the QAM interface 30F. In the MPT mode, MPT frames can be received by the downstream PHY shelf 30 and forwarded directly to the modulation interface 30F without having to terminate and regenerate the MPT framing. Except for manipulation of the payload of the MPT frames for DOCSIS in the SYNC correction 30T.

PSP Data Path

The Packet Streaming Protocol (PSP) is a layer 3 convergence layer protocol which allows packets to be consecutively streamed together and fragmented at arbitrary boundaries. The intent of the PSP mode is to facilitate Quality of Service (QoS). This mode is used for transporting traditional DOCSIS data and signaling messages which use one or more DSCP values. For example, in order to reduce REQ-GNT latency, MAP MAC management messages may be sent using a different DSCP on a different PSP flow 30N than the rest of the DOCSIS channel.

Each PSP flow 30N is received, terminated, and the DOCSIS frames within the flow are extracted by PSP termination 30W. The DOCSIS frames from all the combined PSP flows 30N are sorted into output queues 30P by DSCP Mapping 30V based upon the DSCP value contained within the IP packet in the DOCSIS payload. The outputs of the QoS queues 30P go to a packet scheduler 30Q which decides which queue 30P is to be serviced. The packet scheduler 30Q is also responsible for inserting DOCSIS SYNC messages 30R within the time interval specified by DOCSIS timing 30C. The output of the packet scheduler 30Q goes to a MPT Transmission Convergence (TC) engine 30S that places the DOCSIS frames into MPT frames. The output of MPT engine 30S is sent to the MPT scheduler 30E.

MPT Scheduler

The video MPT flow 30K, the transparent MPT flow 30L, the DOCSIS MPT flow 30M, and the PSP flow 30N provide four MPT flows into the MPT scheduler 30E. The MPT scheduler 30E arbitrates between the four streams and makes the decision which MPT packet will be transmitted at what time. The MPT scheduler 30E receives its scheduling policies from an Edge Resource Management Interface (ERMI) (not shown) and takes into account the DSCP values used within and across the various types of flows.

Addressing

The destination IP address 120 (FIG. 8A) of the packets 89 is used to choose a downstream PHY shelf 30. The IP address selects a PHY chassis and a PHY chassis may have one or more IP addresses. The destination UDP port 126 is used by the packet shelf 16 and the downstream PHY shelf 30 to select a downstream QAM 30F. More than one destination UDP port 126 may point to the same downstream QAM 30F. Packets destined to different QAMs 30F are addressed to different UDP destination ports 126 if they are on the same IP subnet.

DiffServ Code Point Usage

The DOCSIS frames contain IP packets which have a Differentiated Services Code Point (DSCP). The Type of Service (TOS) bits are a subset of the DSCP bits. The DSCP is a value located in the DiffServ field 119 of the IP header 116 (FIG. 8A) and is used by routers to determine the correct Per Hop Behaviour (PHB). The DSCP 119 may be used at the egress of the packet shelf 16, within the network 26 from the packet shelf 16 to the downstream PHY shelf 30, and at the ingress of the downstream PHY shelf 30. Examples of traffic that may require flows with different DSCP are signaling, such as DOCSIS MAPs, SYNCs, UCDs; DOCSIS MAC management messages; packet cable signaling messages; data; VoIP; and video.

At the Packet Shelf

For the DOCSIS MPT flow 30M, all signaling and data may have the same DSCP 119. That DSCP 119 may be different than the DSCP used for other network traffic. For transparent MPT flows 30H, each unique flow may have a different DSCP 119. For DOCSIS PSP flows 30N, the PDU DSCP may be defined as the DSCP of the IP Packet contained with the DOCSIS frame contained within the PDU 134D. Different PDU DSCPs may be mapped into different PSP flows 30N where each PSP flow 30N would have a different DSCP 119. More than one PDU DSCP may map to the same PSP flow 30N. Each unique PSP stream 30N is assigned a unique destination UDP port 126.

Network MTU

The packet switched network 26 between the packet shelf 16 and the downstream PHY shelf 30 may have a certain Maximum Transfer Unit (MTU). For example, the MTU for an Ethernet network might be 1522 bytes. One technique for determining this value is to have both endpoints run MTU path discovery. If a maximum size DOCSIS frame were to be tunneled from the packet shelf 16 to the downstream PHY shelf 30, the MTU of the resulting packet would be greater than 1522 bytes. Both the MPT and PSP modes avoid this issue by offering streaming which concatenates and fragments packets

Early MAP Release

Figure 9A:
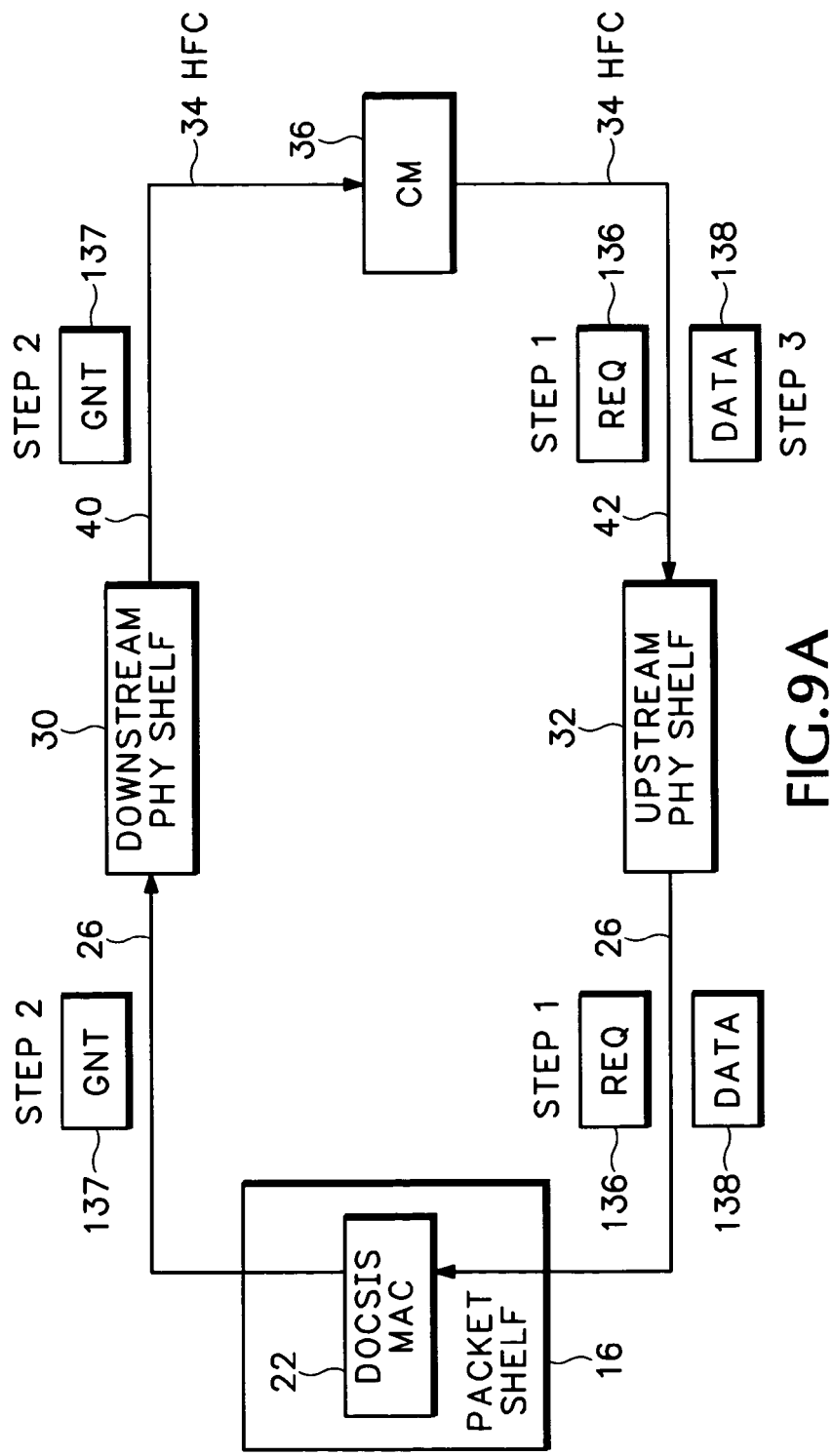
FIG. 9A shows a DOCSIS request-grant protocol.

FIG. 9A shows one example of the DOCSIS protocol used for transferring data from the cable modem 36 to the packet shelf 16. Data is sent by the cable modem 36 in timeslots that are allocated by the DOCSIS MAC 22. A MAC management message (MAP) is sent from the packet shelf 16 that allocates the timeslot transmission opportunities to the cable modem 36 in response to a request message 136.

For example, the cable modem 36 sends the data transmit request message 136 through the upstream path 42 of the HFC 34 to the upstream PHY shelf 32. The upstream PHY shelf 32 forwards the request 136 over packet switched network 26 to the DOCSIS MAC 22 in packet shelf 16. The MAC 22 responds with a grant MAP 137 that travels back over the packet switched network 26 to the downstream PHY shelf 30. The downstream PHY shelf 30 forwards the grant MAP 137 over the downstream path 40 of HFC 34 to the cable modem 36. The grant MAP 137 identifies a timeslot in the future allocated to cable modem 36 for transmitting data. The cable modem 36 transmits data 138 over upstream path 42 of HFC 34 during the timeslot allocated in grant MAP 137. The upstream PHY shelf 32 forwards the data 138 to the packet shelf 16 over network 26.

The time required to conduct this 'request-grant-transmit data' exchange creates a delay when sending data from the cable modem 36 to another device in the WAN 12 (FIG. 1A). This delay can be further aggravated by the additional delay that may happen transporting the messages 136 and 137 and the data 138 over the packet switched network 26. The delay problem can be even further aggravated by the tunneling scheme described above in FIGS. 6-8.

Figure 9B:
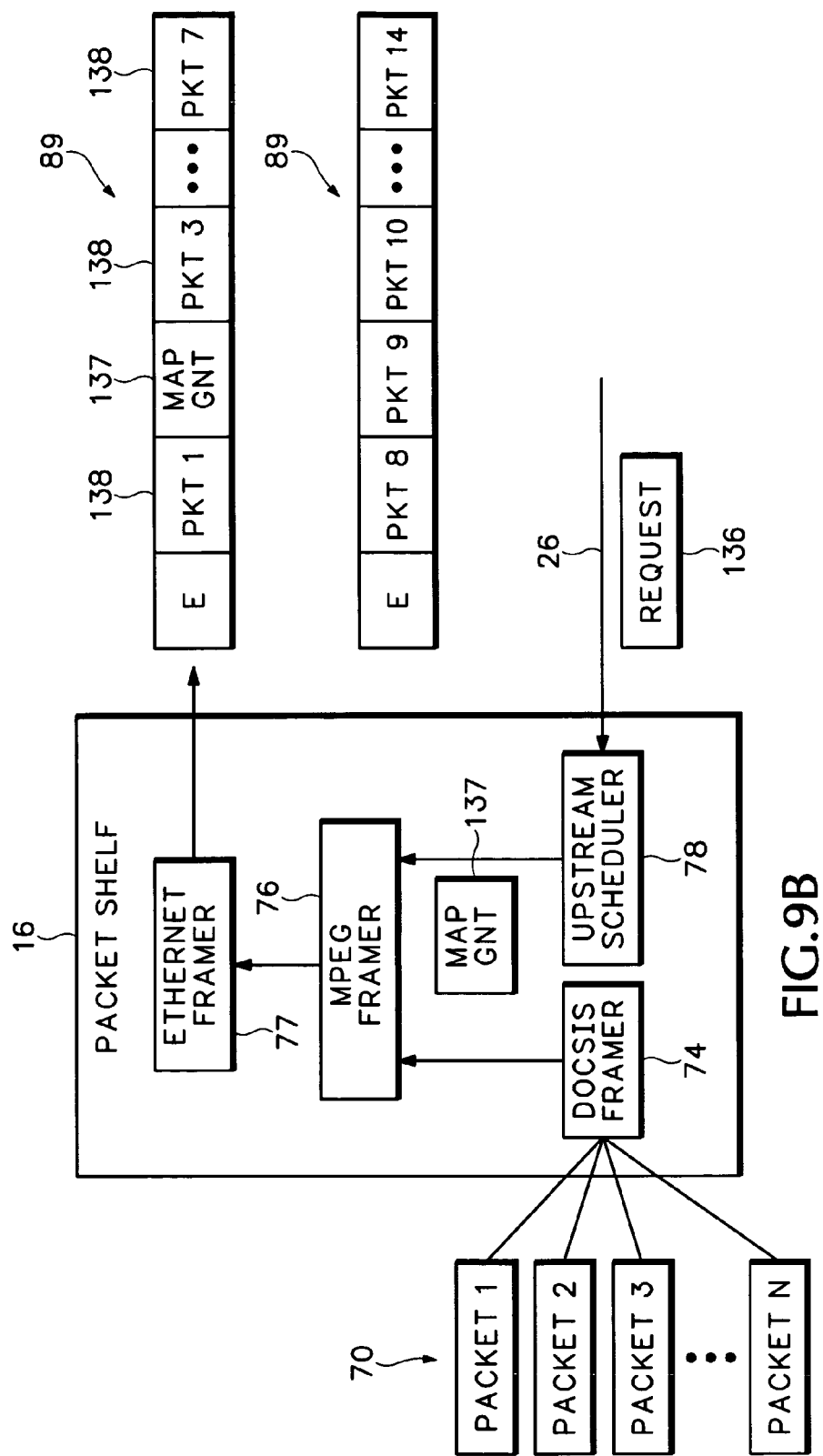
FIG. 9B shows how DOCSIS maps are transported over a packet switched network in one embodiment of the modular CMTS.

Referring to FIG. 9B, the request message 136 is received by the upstream scheduler 78 over the packet switched network 26. The upstream scheduler 78 generates the grant MAP 137 as described above in FIG. 9A.

The MAP 137 is formatted into a DOCSIS frame which is then formatted into an MPEG packet by MPEG framer 76.

The Ethernet framer 77 then combines the MPEG packets containing the MAP 137 with other MPEG packets that may contain other DOCSIS messages, DOCSIS data, or video data into the same payload 130 (FIG. 8A) of Ethernet packet 89. As described in the example above, Ethernet framer 77 may encapsulate up to seven MPEG packets 138 into the same Ethernet packet 89. In one instance, the Ethernet packets 89 are also rate shaped for transmission at a predetermined rate. This combining of MPEG packets and rate shaping further delays the transmission of MAP 137 to the cable modem 36.

FIG. 10 shows an early MAP release scheme used for reducing delays in sending MAP 137 to the cable modem 36 (FIG. 9A). Once MAP 137 has been formatted into an MPEG-TS packet 138 by MPEG framer 76 and encapsulated into the UDP payload 130 (FIG. 8A), the packet shelf 16 stops accumulating more MPEG-TS packets 138 into the UDP payload 130, and transmits (releases) the Ethernet packet 144. Other Ethernet packets 142 that do not contain MAP messages or other time sensitive DOCSIS messages accumulate the normal number of MPEG packets 138.

To further minimize the delay, Ethernet packets 144 containing DOCSIS frames 84 (FIG. 6) may be given higher priority than Ethernet packets 142 that do not contain DOCSIS frames.

For example, the Ethernet packets 142 may only contain MPEG-TS packets 138 with video data and may accordingly be given lower priority than Ethernet packet 144 that contains DOCSIS MAP message 137.

The packet shelf 16 can contain a high QoS queue 150 and a low QoS queue 152 as described below in FIG. 11. The MPEG-TS packets 138 containing DOCSIS frames may be loaded into a high QoS queue 150 and the MPEG-TS packets 138 that do not contain DOCSIS frames may be loaded into the low QoS queue 152. The Ethernet packets are output from the high QoS queue 150 with higher priority than the Ethernet packets output from low QoS queue 152.

Quality of Service

Figure 11:
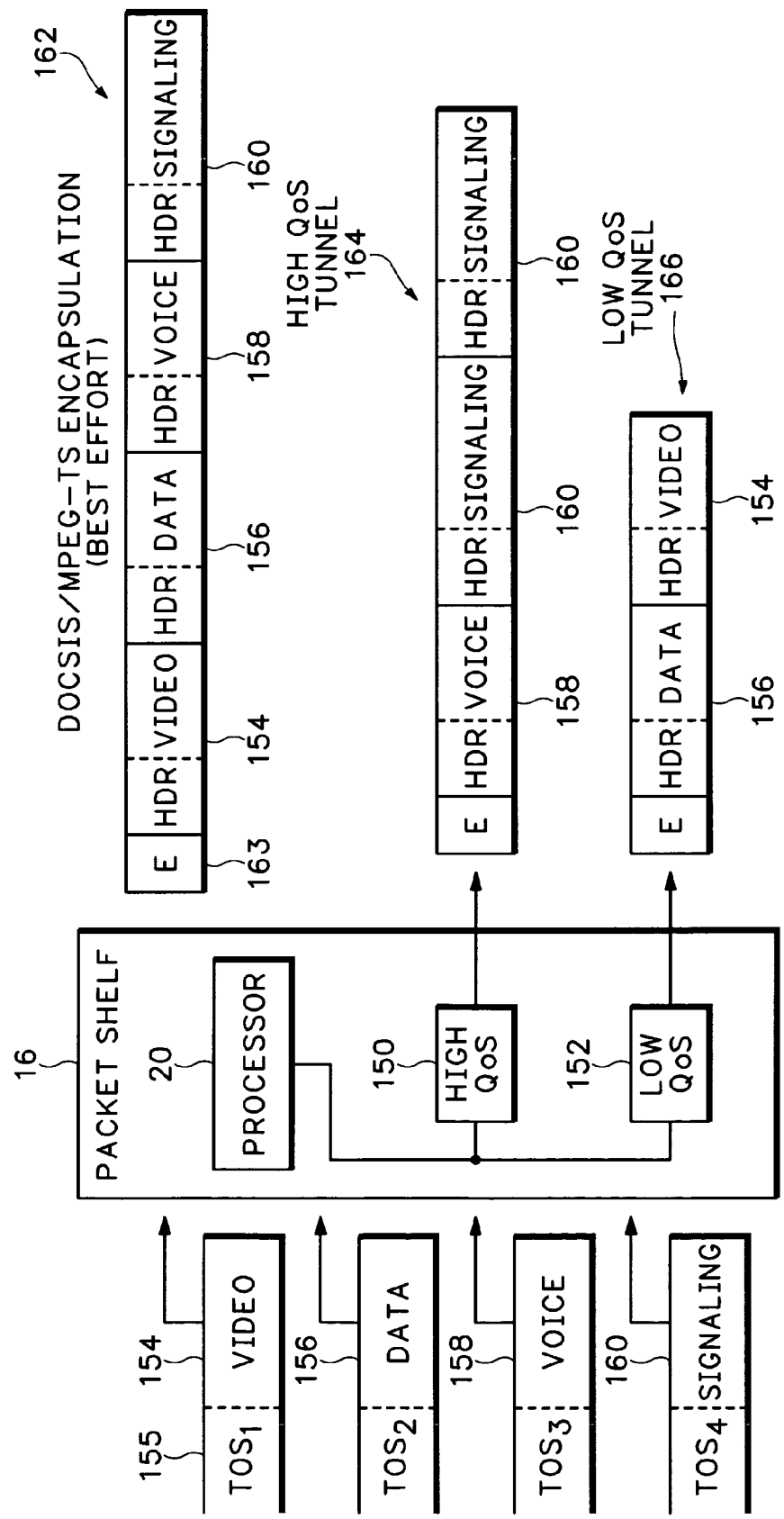
FIG. 11 shows how the modular CMTS establishes DOCSIS tunnels for different Quality of Service (QoS) levels.

Referring to FIG. 11, packets 154-160 with different Quality of Service (QoS) requirements may be received by the packet shelf 16. For example, video packets 154, data packets 156, voice packets 158 and signaling packets 160 each may have different associated QoS requirements. In one example, the different packets 154-160 each have associated Type Of Service (TOS) values 155 in their IP headers that correspond with the required QoS. The TOS values 155 are alternatively referred to above as Differentiated Services Code Point (DSCP) values.

The MPEG encapsulation described above in FIGS. 6-10 may combine multiple MPEG or DOCSIS packets into the same tunnel. In one implementation, a best effort tunnel 162 is used for transporting the different packets 154-160 over the packet switched network 26. In the best effort implementation, the multiple packets 154-160 are encapsulated into the same Ethernet packet 163 with no consideration of the associated TOS values 155 or other QoS values. Therefore, packets with different TOS values 155 are encapsulated and sent by the packet shelf 16 over the packet switched network 26 in the same tunnel 162.

In a QoS tunnel implementation, the packet shelf 16 includes a processor 20 and multiple packet queues 150 and 0.152 that are used for storing packets 154-160 according to their corresponding QoS values. In this example, the QoS corresponds to the packet TOS values 155. The queue 150 is associated with high QoS packets and the queue 152 is associated with lower QoS packets. The DOCSIS packet processor 20 receives and loads the different packets 154-160 into either high QoS queue 150 or low QoS queue 152 according to their corresponding TOS values 155.

For example, packets with a TOS value 155 above a predetermined threshold value are loaded into high QoS queue 150 and any packets with a TOS value 155 below the predetermined threshold value are loaded into low QoS queue 152. In this example, the voice packet 154 and several signaling packets 160 have TOS values 155 above the predetermined threshold and are accordingly loaded into high QoS queue 150. The data packets 156 and the video packets 154 have TOS values below the predetermined QoS threshold and are accordingly loaded into low QoS queue 152.

The processor 20 then generates separate high and low QoS tunnels 164 and 166 corresponding to the packets in queues 150 and 152. For example, the voice packet 158 and the signaling packets 160 are encapsulated and transported through the packet switched network 26 over high QoS tunnel 164. The data packets 156 and the video packets 154 in low QoS queue 152 are encapsulated and transported through the network 26 over low QoS tunnel 166.

In another implementation, the number of MPEG or DOCSIS frames that are combined in the different tunnels 164 and 166 may vary according to priority. For example, the high QoS tunnel 164 may encapsulate fewer MPEG or DOCSIS frames together than the lower QoS tunnel 166.

Thus, the packet shelf 16 provides different QoS tunnels to the remote PHYs 18. Any number of different QoS tunnels can be provided according to system requirements. For example, separate tunnels may be established for each different type of packet data 154-160. The processor 20 can also establish the different tunnels according to parameters other than, or in combination with, the TOS value 155. For example, the tunnels 164 and 166 can also be established according to different Packet Identifier (PID) values used for identifying different MPEG streams.

In another embodiment, the different tunnels 164 and 166 may be established according to different User Datagram Protocol (UDP) port values identified in the UDP header 122 (FIG. 8A). The tunnels may also be established according to any combination of the TOS, PID, and UDP port values. Thus, the tunnels can be established according to any combination of UDP, IP or MPEG parameters or according to the different types of data associated with the packets 154-160.

Latency Management

Figure 12:
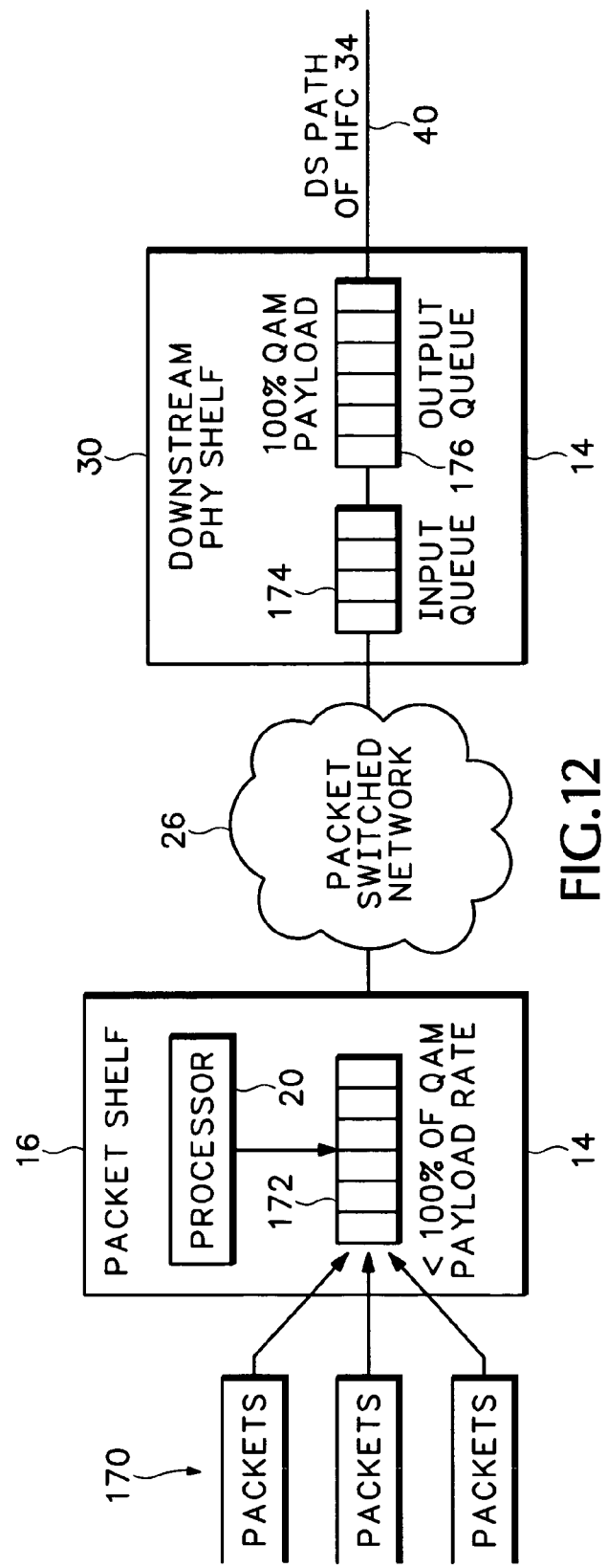
FIG. 12 shows how one embodiment of the modular CMTS handles packet latency conditions.

FIG. 12 shows how the modular CMTS 14 addresses latency conditions. During latency conditions, packets may be delayed while being transmitted over the network 26. During these latency conditions, the QAMs 30F (FIG. 1B) in the downstream PHY shelves 30 may insert MPEG nulls into the downstream path 40 of the HFC 34. When the packets do finally arrive at the QAMs, the late arriving packets can build up in the output queue 176.

To prevent packet buildup in queue 176, the packet shelf 16 rate shapes packet traffic to the downstream PHY shelf 30. Packet shelf 16 includes a packet queue 172 that receives packets 170. The downstream PHY shelf 30 includes an input packet queue 174 and the output packet queue 176. The output packet queue 176 has a payload rate of 100% of the QAM bandwidth.

To prevent packets from building up in output queue 176 due to latency, the payload rate of the packet queue 172 in the packet shelf 16 is set to some value less than the 100% of the payload rate for packet queue 176. The packet shelf 16 will then deliver packets at a Variable Bit Rate (VBR) or Constant Bit Rate (CBR) that is less than the maximum payload rate for the output queue 176. This allows the downstream PHY shelf 30 to empty output queue 176 even after a latency period where MPEG nulls have been inserted.

The processor 20 may selectively vary the payload rate capacity of buffer 172 according to an amount of jitter detected in packet switched network 26. For example, a high jitter condition may be detected in packet switched network 26 by the processor 20 using existing DOCSIS ranging operations. The processor 20 then accordingly may reduce the payload rate capacity of packet queue 172. This further reduces the chance of packets backing up in the output queue 176.

Figure 13:
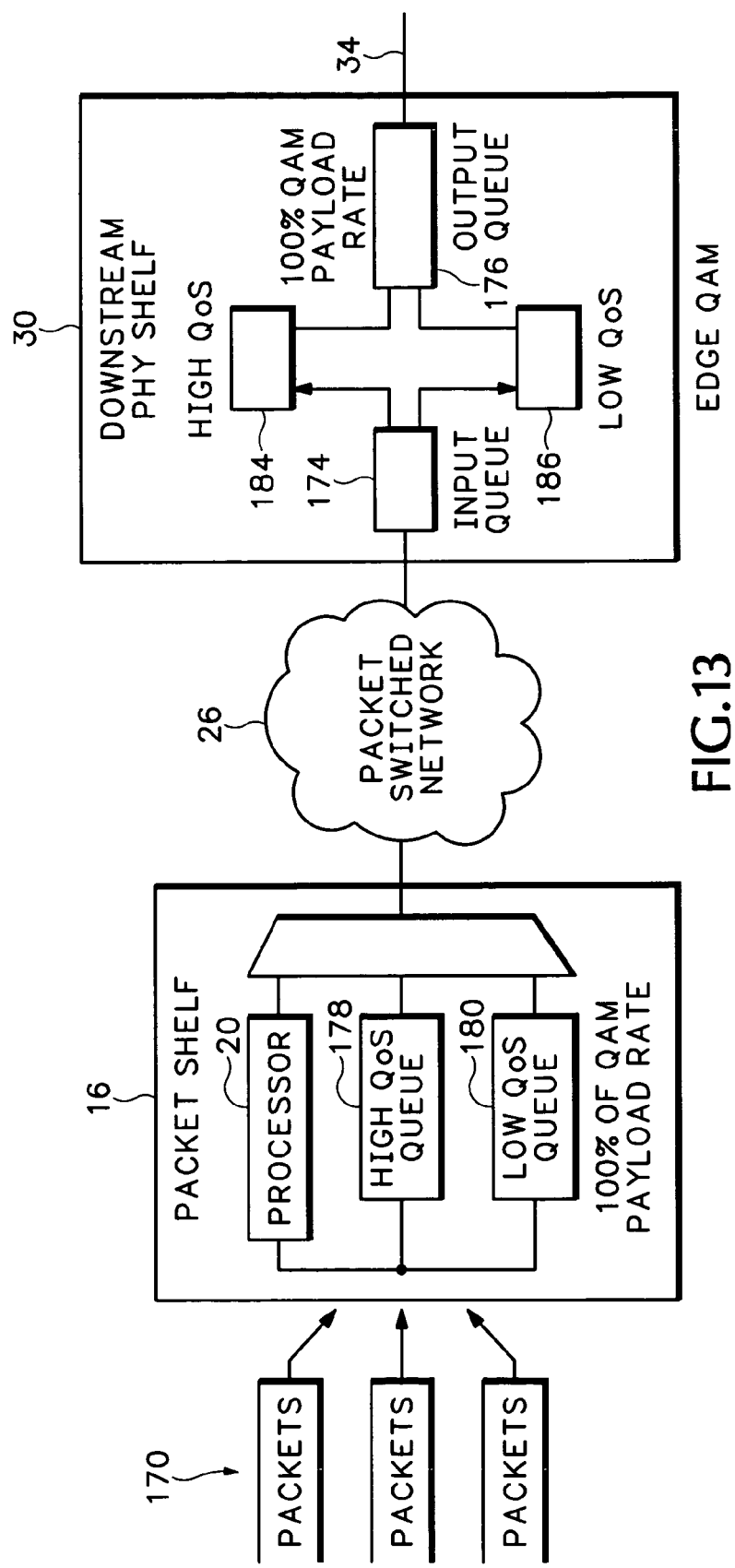
FIG. 13 shows how another embodiment of the modular CMTS handles packet latency conditions.

FIG. 13 shows an alternative embodiment of a latency management system where the packet shelf 16 includes a high QoS queue 178 and a low QoS queue 180. The downstream PHY shelf 30 has a corresponding high QoS queue 184 and a low QoS queue 186 that are coupled between the input queue 174 and the output queue 176.

In this example, the packets in queues 178 and 180 can in combination have 100% of the payload rate of the output queue 172. Packets sent from high QoS queue 178 are output by the packet shelf 16 with a higher priority than the packets in the low QoS queue 186. The packets from high QoS queue 178 received by the downstream PHY shelf 30 are stored in high QoS queue 184 and the packets from low QoS queue 180 received by the downstream PHY shelf 30 are stored in low QoS queue 186. The packets in low QoS queue 186 can be delayed or even dropped when packets backup in output queue 176 due to latency conditions.

Upstream Cable Physical Interface Shelf

Figure 14:
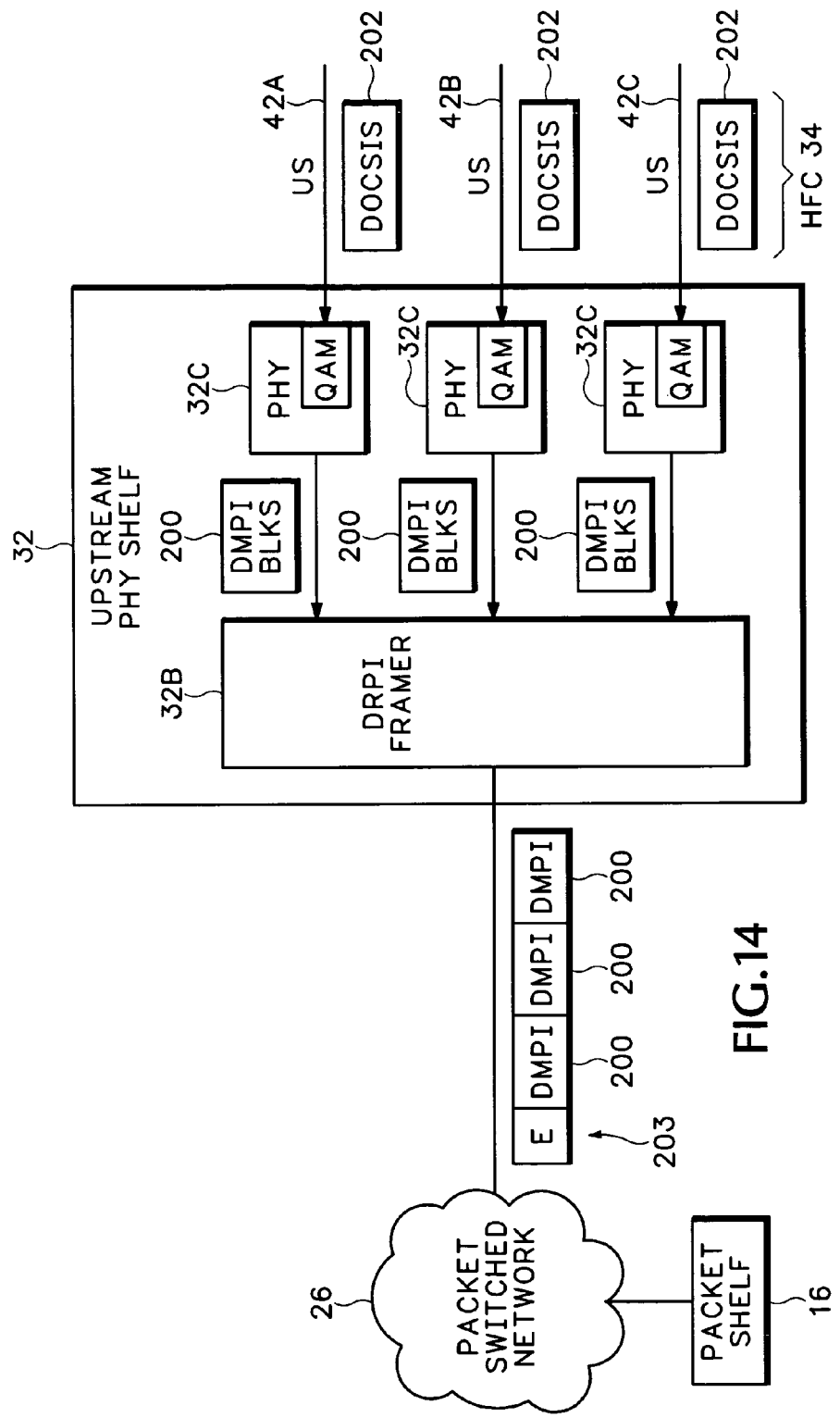
FIG. 14 is a more detailed block diagram of an upstream PHY shelf.

FIG. 14 shows one embodiment of the upstream PHY shelf 32 in more detail that includes multiple cable Physical Interface (PHY) elements each containing QAMs 32C that demodulate signals received over the upstream path 32 of a HFC plant 34. The PHY interface that contains QAMs 32C is referred to generally as PHY 32C. In one embodiment, the upstream PHY shelf 32 uses a similar packet format to that previously shown in FIG. 8A to transport DOCSIS MAC PHY Interface (DMPI) blocks 200 in packets 203 over the packet switched network 26 to the packet shelf 16. DMPI is described in the DOCSIS 2.0 Radio Frequency Interface Specification which is herein incorporated by reference.

The packets 203 sent from the upstream PHY shelf 32 to the packet shelf 16 containing the DMPI blocks 200 are referred to generally as DMPI over IP (DoIP) packets 203. The upstream PHY protocol used for transporting the DoIP packets 203 includes both control plane and forwarding plane modes. In another embodiment, the upstream PHY shelf receives DMPI blocks from the PHY, assembles them into DOCSIS packets, and forwards those DOCSIS packets to the M-CMTS using the same packet format that is used in the downstream direction.

Forwarding Plane

In the forwarding plane, the upstream PHY shelf 32 takes content off the HFC plant 34 and sends it over the network 26 to the packet shelf 16. Cable modems 36 (FIG. 1A) send upstream DOCSIS packets 202 in the form of Forward Error Correction (FEC) blocks mapped to a QAM payload that are then demodulated by the QAM receivers in PHYs 32C and converted into DMPI blocks 200.

The DOCSIS REMOTE PHY Interface (DRPI) framer 32B encapsulates the DMPI blocks 200 into Ethernet frames as described above in FIG. 8A and then sends the DoIP packets 203 over the packet switched network 26 to packet shelf 16. As described above, in one embodiment, the packet switched network 26 is an Ethernet network. However, any IP based network may be used. The upstream PHY shelf 32 may encapsulate multiple DMPI blocks 200 received on the same upstream paths 42 into the same DoIP packets 203 or may alternatively encapsulate DMPI blocks 200 generated from different upstream paths 42A-42C into the same DoIP packets 203.

FIG. 15 shows the UDP payload 204 that is contained within the DoIP packet 203 shown in FIG. 14. The headers in the DoIP packet 203 are similar to those shown above in FIG. 8A. A header 206 of the payload 204 contains a packet sequence number in header 206 that increases by one for each transmitted packet 203. When a maximum number is reached, the sequence number in header 206 begins again from zero. The sequence number in header 206 allows the packet shelf 16 to reassemble the DMPI blocks 200 in a correct sequence after being transmitted over network 26.

A single DoIP packet 203 (FIG. 14) may contain DMPI blocks 200 from more than one upstream path 42 and more than one logical channel on the same upstream path 42. The UDP destination port 126 (FIG. 8A) represents a group of one or more physical upstream channels. The upstream PHY shelf 32 in one embodiment does not put stuffing bytes between the UDP header 112 (FIG. 8A) and the header in the first DMPI block 200 or between consecutive headers of the DMPI blocks 200.

DMPI Data Blocks

The format of the DMPI blocks 200 is defined in the DOCSIS 2.0 specification and is therefore not described in further detail. The supported block types are FIRST_DATA block, MIDDLE_DATA block, LAST_DATA block, PHY_STATUS block, and NO_BURST block. In one embodiment, the CHANNEL block is discarded and a DOMAIN block 208 is included as described below in FIG. 16.

Referring to FIG. 16, the DMPI domain block 208 is a new block definition and may not be supported by a conventional native DMPI interface on the upstream PHY chip. The conventional DMPI specification defined in DOCSIS 2.0 is per channel. The DMPI domain block 208 allows DMPI blocks 200 from multiple channels 42A-42C (FIG. 14) to be multiplexed together into one DoIP packet 203, and provides a way for the packet shelf 16 to sort incoming intermixed DMPI blocks 200 into correct upstream channel queues.

The DMPI domain block 208 is inserted once at the beginning of a Type-Length-Value (TLV) section of the UDP payload 204 (FIG. 15). The DMPI domain block 208 is inserted for example when a next DMPI data block 200 is from a different logical or physical upstream channel 42 than the previous DMPI block 200. The DMPI domain block 208 may contain a domain ID that identifies the particular PHY interface 32C and HFC 34 associated with the DMPI block 200 and an Upstream Channel ID (UCID) corresponds to the unique logical channel ID that the DOCSIS data 202 is received over. Thus, every unique logical upstream channel connected to every PHY 32C (FIG. 14) is uniquely identified.

FIG. 17 shows an Upstream Channel Descriptor (UCD) snapshot of an upstream frame counter 212, mini-slot counter 214, and timestamp 216 published by the packet shelf 16. This is referred to generally as the timestamp snapshot 210. The timestamp 216 is a counter that all cable network components use as a reference. The mini-slot number 214 is used for identifying when cable modems 36 (FIG. 1A) are allowed to transmit data over the upstream path 42 of HFC 34.

Even though the packet shelf 16 publishes the timestamp snapshot 210, it is created by the upstream PHY shelf 32 by the PHY 32C. The upstream PHY shelf 32 then periodically sends the snapshot 210 to the packet shelf 16.

Figure 25:
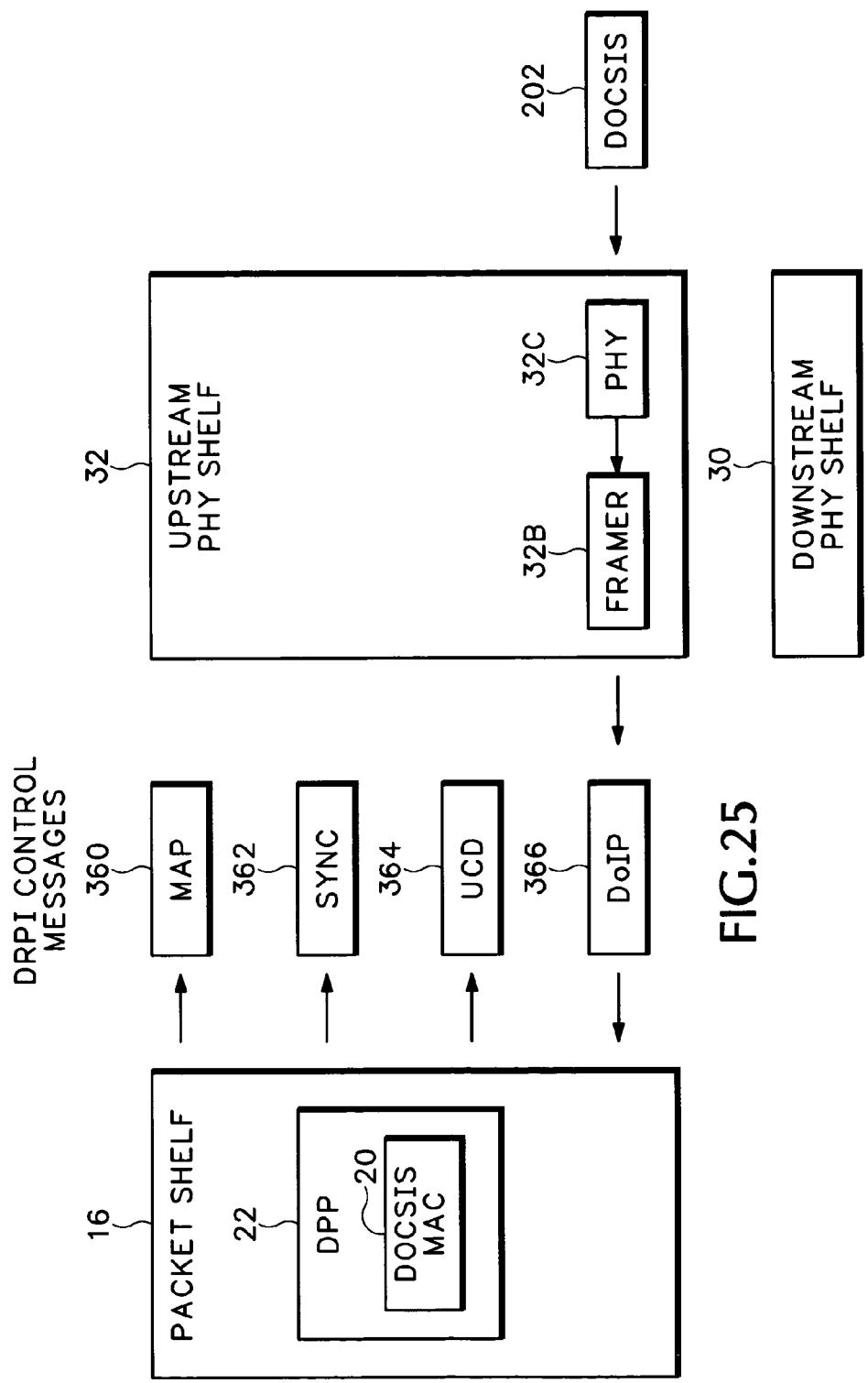
FIG. 25 shows the control messages sent from the packet shelf to the remote PHY shelves.

In the modular CMTS 14, the packet shelf 16 maintains a copy of the frame counter 212 and mini-slot counter 214 for each logical upstream channel which is time aligned with its copy of the timestamp counter 216. These three counters are used to create the timestamp snapshot 210 in an Upstream Channel Descriptor (UCD) message 364 (FIG. 25). The packet shelf can alternatively use the snapshot directly from the PHY shelf. The upstream PHY shelf 32 then either periodically sends a copy of its timestamp snapshot 210 to the packet shelf 16 or sends a copy during different conditions, such as during initialization of the upstream channel or when the UCD changes.

The packet shelf 16 time aligns the frame counter 212 and the mini-slot counter 214 from the upstream PHY self timestamp snapshot 210 to the packet shelf timestamp counter and stores those values as the current frame counter and mini-slot counter values.

Packet Drop and Misorder Recovery

An "open" DMPI data block 200 sequence is when a first block has been received but a last block has not been received (if PHY_STATUS is not expected) or if an expected PHY_S-TATUS has not been received. In the absence of dropped DoIP packets 203, an open sequence may be closed by reception of the LAST_DATA block and the optional PHY_STA-TUS block. For example, if the PHY_STATUS block is being used, a block sequence is not completely closed until the PHY_STATUS block is received by the packet shelf 16.

If the packet shelf 16 receives out-of-sequence DoIP packets 203, it waits a certain amount of time to determine if the packet or packets have been misordered (i.e. the missing packets are received eventually) or lost (they are not received within the timeout period). If the packet shelf 16 determines that one or more DoIP packets 203 have been lost, the DMPI blocks 200 from all open block sequences are dropped until these open sequences can be terminated. Termination occurs by the reception of new FIRST_DATA block from the same PHYs 32C and logical channels as the block sequences affected by the dropped packets 203.

Control Plane

Quality of Service

Referring to FIGS. 14 and 18, DOCSIS packets 202 are received by the upstream PHY shelf 32. The DOCSIS packets 202 include a DOCSIS header 224, an extended header field 226, Ethernet header 228, IP header 218, an application dependant UDP header 230, a tunnel header such as RTP or L2TPv3 232, payload 234, and CRC 236. The DOCSIS packets 202 can have different QoS priorities. For example, different QoS values 222 may be contained within the IP header 218 received by the upstream PHY shelf 32.

However, a portion 220 of the DOCSIS packet 202 may be encrypted by the cable modem 36. Alternatively, some of the header information that includes the QoS priority information 222 may be suppressed in the DOCSIS packet 202. In either situation, the upstream PHY shelf 32 may not be able to identify the QoS priority information 222. The challenge then is how to maintain priority for the DOCSIS packets 202 when they are sent over the packet switched network 26 to the packet shelf 16.

FIG. 19 shows two techniques that can be used for maintaining or providing QoS for DoIP packets 203 sent from the upstream PHY shelf 32 to the packet shelf 16. The upstream PHY shelf 32 maintains a table 252 that associates Service Identifiers (SIDs) 253 with different Type of Service (TOS) or DSCP values 255. The SIDs 253 are normally assigned by the packet shelf 16 to active or admitted upstream service flows 42 on the HFC 34. During the same SID assignment, the packet shelf 16 can also identify TOS values 255 associated with the SID values 253. The upstream packet shelf 32 inserts the SID-TOS values into table 252 and uses table 252 to then prioritize the DOCSIS data 202. The DOCSIS priority can be used as an index to a DSCP/ToS code point. Alternatively, the QoS values can be assigned by the packet shelf 16 according to different IP addresses, types of data, UDP port assignments, etc. associated with the cable modems 36.

During a provisioned QoS to SID assignment, software in the packet shelf 16 sends the SID-TOS mappings 254 to the upstream PHY shelf 32 for all the different SID values 253 that may be used by PHY 32C (FIG. 14). For example, the SID-TOS mappings 254 may be sent during initialization, registration, or dynamic service setup, and stored in table 252. The upstream PHY shelf 32 then uses the table 252 to assign the DOCSIS packets 202 priorities as described below. In one ToS overwrite feature, the CMTS forces a ToS corresponds to a DOCSIS priority on the packets sent from the cable modem.

In an alternative dynamic QoS to SID assignment, the packet shelf 16 dynamically sends different SID-TOS values 255 to the upstream PHY shelf 32 in DRPI MAPs 256. FIG. 20 shows the DRPI MAP 256 in more detail. The MAP 256 is conventionally used for identifying mini-slots for cable modem upstream transmissions and includes a conventional DRPI header 258, SID value 260, mini-slot value 263, and mini-slot length value 264.

However, the MAP 256 now also includes new SID to TOS mapping 266 that dynamically associates a TOS value to the SID values 253 for DOCSIS packets received on the HFC 34. The PHY 32C in the upstream PHY shelf 32 uses the SID value 260 and mini-slot values 262 to demodulate data bursts from cable modems. The DRPI framer 32B then uses the SID-TOS mapping 266 associated with the demodulated DMPI blocks 200 (FIG. 14) to prioritize the DoIP packets 203 sent over network 26 (FIG. 19).

The SID-TOS MAPs 256 allows the DRPI framer 32B (FIG. 14) to only keep track of a relatively small number of SID-TOS values 266. Further, if a TOS value 255 for a particular SID 253 is dynamically changed during transmission of MAP 256, there are no synchronization problems that arise with other upstream PHY shelves 32. There may be no need to send a new mapping each time a modem is registered or a dynamic service is set up.

Figure 21:
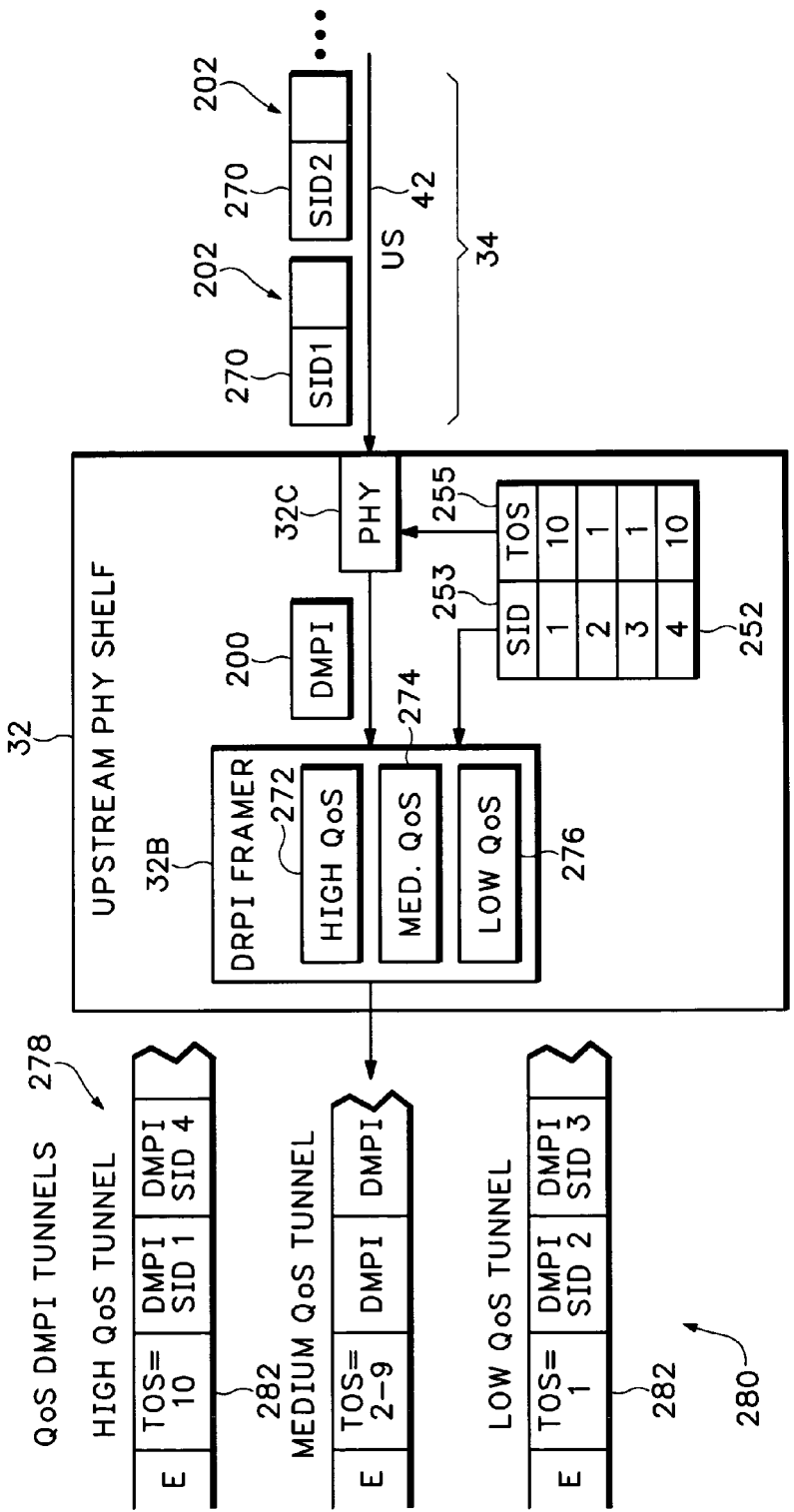
FIG. 21 is a block diagram showing how QoS values are assigned to DOCSIS packets.

FIG. 21 shows DOCSIS packets 202 received on the upstream path 42 of the HFC 34 by the PHY 32C. The DOCSIS packets 202 have associated SID values 270. The PHY 32C converts the received DOCSIS frames 202 into DMPI blocks 200. The DRPI framer 32B uses the SID values 270 associated with the DMPI blocks 200 to identify associated TOS values 255 in table 252 and loads the DMPI blocks 200 into the high, medium, or low QoS queues 272, 274 or 276, respectively, associated with the identified TOS values 255.

For example, the DMPI blocks 200 associated with SID values 1 and 4 have high TOS values and are accordingly loaded by the DRPI framer 32B into the high QoS queue 272. The DRPI framer 32B encapsulates the DMPI blocks 200 from high QoS queue 272 into a DoIP packet 278 assigned a high QoS value. For example, a high TOS or DSCP value. 282 is assigned to the DS field 119 in the IP header 116 (FIG. 8A) of DoIP packet 278.

The DMPI blocks 200 having SID values 270 associated with low TOS values 255 are loaded by PHY 32C into the low QoS queue 276. The DRPI framer 32B then encapsulates the DMPI blocks 200 in low QoS queue 276 into a low QoS DoIP packet 280 having a low TOS or DSCP value 282.

Figure 22:
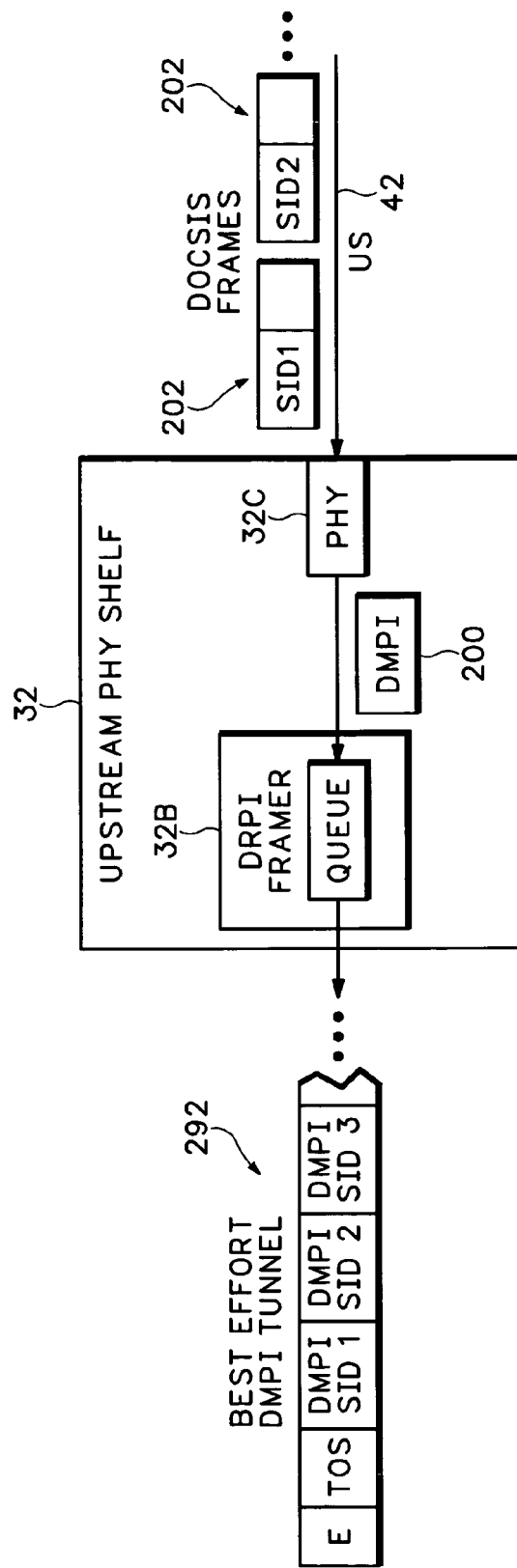
FIG. 22 is a block diagram showing how the upstream PHY shelf performs in a best effort mode.

In an alternative embodiment shown in FIG. 22, the upstream PHY shelf 32 uses a best effort mode where DMPI blocks 200 are encapsulated into DoIP packets 292 without any consideration for associated TOS values. However, request messages may still be sent in separate high priority DoIP packets as described below in FIG. 23.

Early Request Extraction

Figure 23:
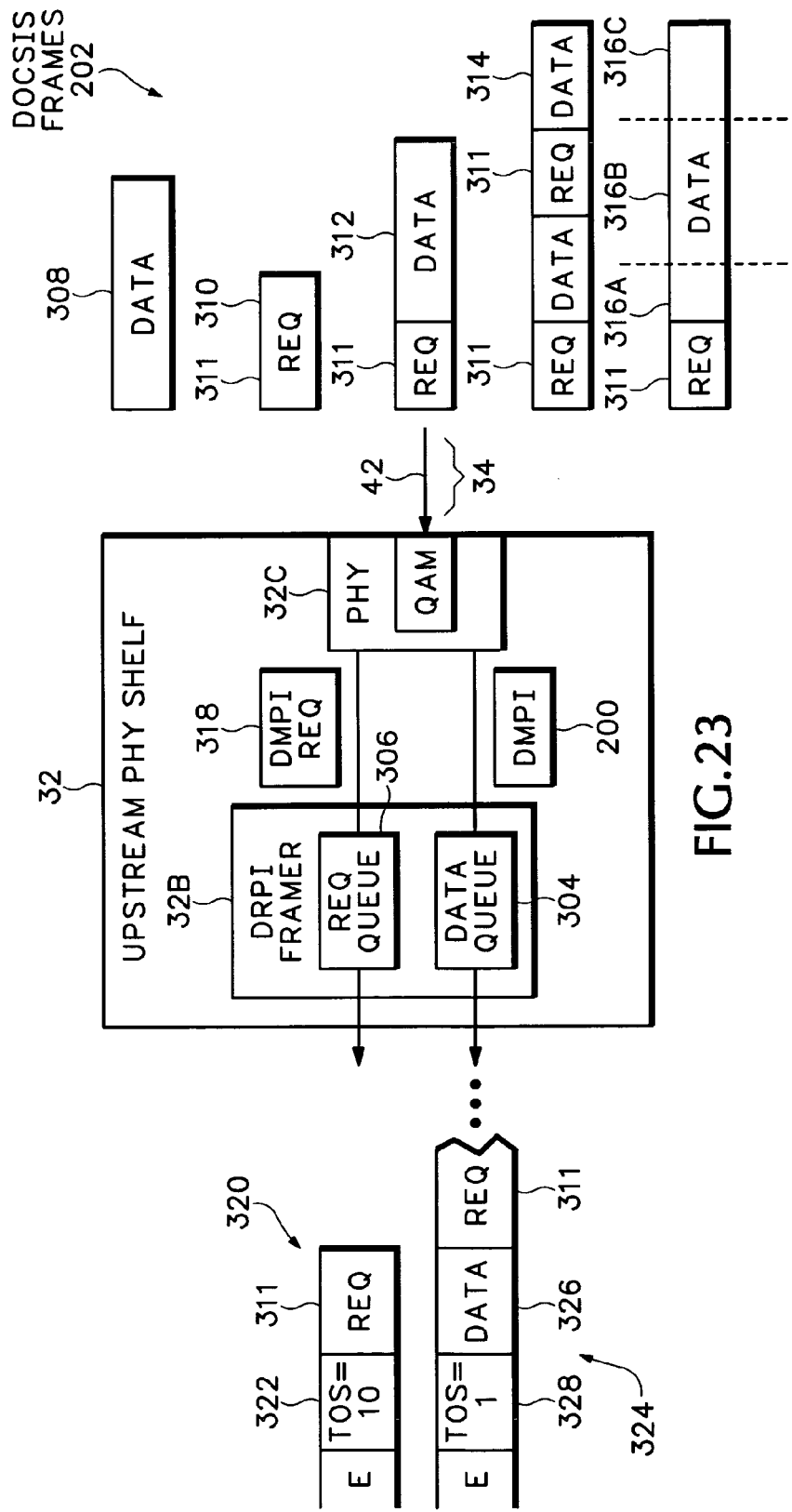
FIG. 23 is a block diagram showing how the upstream PHY shelf conducts early request extraction.

Referring to FIG. 23, DOCSIS frames 202 can be sent by the cable modems 36 (FIG. 1A) in many different formats and can contain different types of information. For example, the DOCSIS frames can contain data 308 or bandwidth request (REQ) messages 311. As described above in FIG. 9A, the cable modems 36 send REQ messages 311 to the packet shelf 16 to request data transmission in the upstream path 42 of the HFC 34.

This transmission REQ message 311 may be sent in a separate DOCSIS REQ frame 310 or may be piggybacked along with data in DOCSIS frame 312. In another embodiment, the REQ message 311 is sent along with multiple concatenated data packets in DOCSIS frame 314. It is also possible that the REQ message 311 may be embedded in one of the data concatenated data packets in DOCSIS frame 314. In yet another embodiment, the REQ message 311 is combined with fragmented DOCSIS frames 316A-316C.

The PHY 32C converts the DOCSIS frames 308-316 into DMPI blocks 200. As described above, the DRPI framer 32B then encapsulates multiple DMPI blocks 200 together into DoIP packets that are then transported over the network 26. As also previously described above in FIGS. 9A and 9B, it is desirable to reduce the delay from when a cable modem 36 sends a REQ message 311 to the time a grant MAP is received back from the packet shelf 16.

However, the encapsulation of multiple DMPI blocks 200 into DoIP packets or tunnels can delay this REQ-GNT-Transmit process. For example, a REQ message 311 may be the first DMPI block 200 encapsulated in a DoIP packet that contains multiple DMPI blocks 200. The REQ message 311 could be therefore be delayed until several other DOCSIS frames 202 are received, converted into DMPI blocks 200, and then encapsulated into the same DoIP packet.

To reduce the REQ-GNT-Transmit delay time, the upstream PHY shelf 32 conducts an early REQ extraction. In one embodiment, the PHY 32C monitors the bytes of the incoming DOCSIS frames 202 for REQ messages 311. Whenever a REQ message 311 is detected, the PHY 32C generates a separate DMPI REQ block 318 that is sent to a separate REQ message queue 306. As soon as the DMPI REQ block 318 is received in REQ queue 306, the DRPI framer 32B formats the REQ block 318 into a DoIP packet 320 and sends it over the network 26 to the packet shelf 16. This eliminates the possible delay that could be created encapsulating the DMPI REQ block 318 with other DMPI blocks 200.

To further reduce the REQ-GNT-Transmit delay, the DoIP REQ packet 320 is assigned a high priority QoS or DSCP value. For example, the DRPI framer 32B assigns a high TOS value 322 to DoIP REQ packet 320. This allows packet 320 to be processed with higher priority through the packet switched network 26 (FIG. 1A).

The REQ message 311 may be replicated in DMPI REQ block 318 and the original REQ message 311 processed in a normal manner. In other words, the REQ message 311 is also converted into DMPI blocks 200, loaded into a data queue 304 in the DRPI framer 32B along with other DOCSIS data, and then encapsulated with other DOCSIS data 326 into DoIP packet 324. The DoIP packet 324 may or may not be assigned a particular TOS value 328 based on the priority criteria discussed above in FIGS. 21 and 22. Thus, the same REQ message 311 may be sent in both the DoIP REQ packet 320 and the DoIP packet 324.

It is likely, but not guaranteed, that the DoIP REQ packet 320 will be received by the packet shelf 16 before DoIP packet 324. In either case, the packet shelf 16 may process whichever REQ message 311 is received first in packet 320 or 324.

It is possible that the PHY 32C may not be able to extract and separately transmit a DoIP REQ packet 320 for all received REQ messages 311. In this situation, the PHY 32C may send DRPI framer 32B an indication whenever a REQ message 311 is successfully detected. The DRPI framer may then insert an indicator in a designated field in either or both of the DoIP REQ packet 320 and DoIP packet 324 that notifies the packet shelf 16 that the same REQ message 311 has been sent in two different DoIP packets. The packet shelf 16 then ignores the second received REQ message 311.

Figure 24:
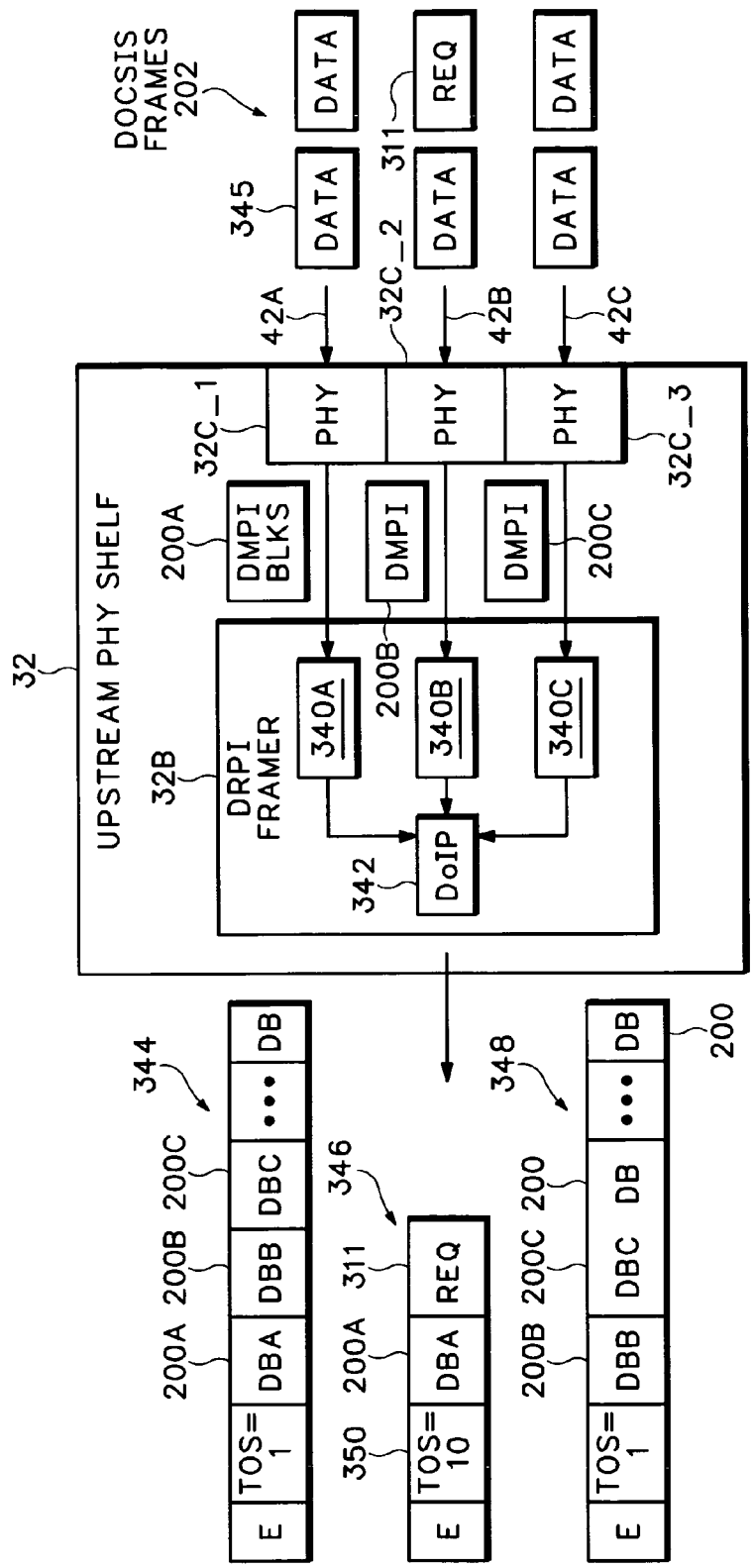
FIG. 24 shows another embodiment of early request extraction.

FIG. 24 shows another embodiment of a multi-channel upstream PHY shelf 32. In this embodiment, there are multiple upstream paths 42A-42C that are processed by the same upstream PHY shelf 32. The multiple PHYs receivers 32C_1-32C_3 convert the DOCSIS frames 202 received over the different upstream channels 42A-42C into DMPI blocks 200A-200C, respectively. The DRPI framer 32B receives the DMPI blocks 200A-200C into different queues 340A-340C and may combine the DMPI blocks 200A-200C associated with the different upstream paths 42A-42C, respectively, into the same DoIP packets 344. This reduces latency by not having to wait and use multiple DOCSIS frames from a same upstream path 42 for creating DoIP packet 344.

The upstream PHY shelf 32 can also use the configuration in FIG. 24 in combination with another embodiment of the early REQ release. In this embodiment, the REQ messages 311 are encapsulated along with other DMPI blocks 200A-200C by the DRPI framer 32B into the same DoIP packet 346. However, the DoIP packet 346 is released as soon as the DMPI block 200 containing the REQ message 311 is encapsulated. The next DoIP packet 348 then starts encapsulating DMPI blocks 200 where DoIP packet 346 left off.

The DoIP packet 346 containing the REQ message 311 may optionally be tagged with a high TOS value 350 by the DRPI framer 32B. If other REQ messages 311 are detected from other upstream paths 42A-42C, they may be combined with the REQ message 311 already loaded into DoIP packet 346.

FIG. 25 shows the signaling that is transmitted between the packet shelf 16, upstream PHY shelf 32, and downstream PHY shelf 30. The DOCSIS packets 202 are received by the upstream PHY receiver 32C and converted into DoIP packets 366 by the DRPI framer 32B and sent from the upstream PHY shelf 32 to the packet shelf 16.

The DOCSIS MAC 20 in the packet shelf 16 programs the downstream PHY shelf 30 and upstream PHY shelf 32 by sending MAP messages 360, SYNC messages 362 and Upstream Channel Descriptor (UCD) messages 364. The MAP messages 360 are used for allocating timeslots as described above. The SYNC messages 362 are used for timing and the UCD messages 364 contain programming parameters for the PHY shelves 30 and 32. The messages 360, 362 and 364 can be encapsulated into tunnels as described above. The specific contents of the MAP, SYNC, and UCD messages are described in the DOCSIS 2.0 specification and are therefore not described in further detail.

In another embodiment, the contents of the MAP, UCD, and SYNC messages can be sent with the control messages of a tunneling protocol. For example, the MAP, UCD, and SYNC messages could be represented in data fields in Attribute Value Pairs (AVPs) with the Layer 2 Tunneling Protocol version 3 (L2TPv3).

Timing

Referring back to FIG. 9A, with the separation of the PHY shelves 30 and 32 from the MAC 22, there is the potential penalty of increased delay from when a REQ 136 is issued by the cable modem 36, and when the cable modem 36 eventually receives the GNT message 137. In this example, the REQ message 136 can represent either a DOCSIS request Information Element (IE) that is successfiilly sent through a contention request slot, or a piggyback request. The GNT 137 is used for the explicit scheduling of an upstream packet and is typically sent in the DOCSIS MAP message as shown in FIG. 9B.

Figure 26:
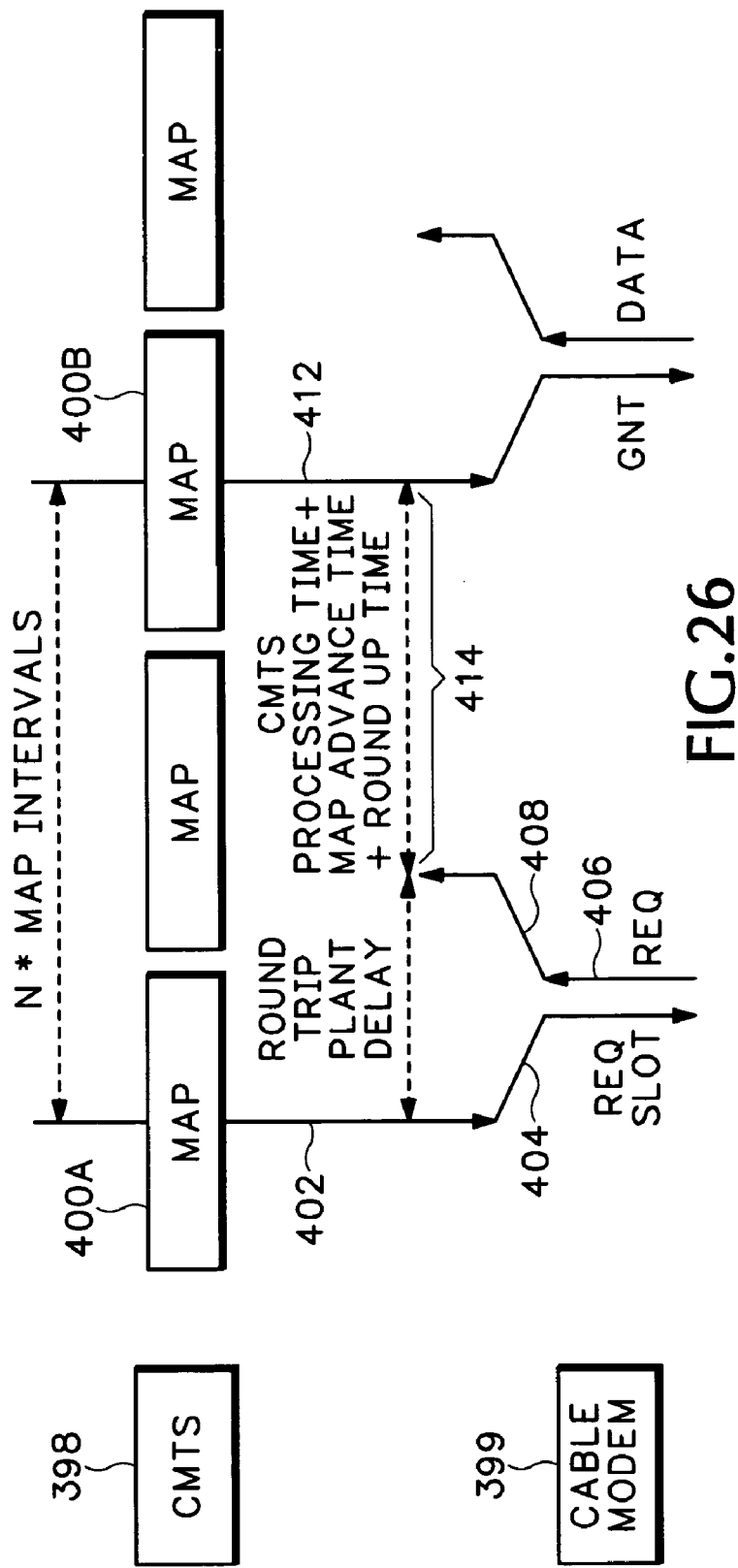
FIG. 26 shows how a MAP advance time is used in a cable network.

FIG. 26 shows a REQ-GNT flow for a conventional non-modular cable system. A CMTS 398 schedules a REQ opportunity 402 in a MAP 400A. This could be an explicit contention REQ IE, or it could be a data transmit IE on which the REQ 402 is piggybacked with other data. Starting with this as a reference point, the REQ opportunity 402 propagates down the HFC plant creating delay 404. A cable modem 399 sends back a REQ 406 which has delay 408 created by the both the HFC plant and the ranging delay in the cable modem 399. Ranging works by adding delay to cable modems so that they all appear to be at the worst case plant delay.

Once the REQ 406 with delay 408 is received by a non-modular CMTS 398, it goes through the physical interface (PHY), an input queuing process, and finally is processed by an upstream scheduler 78 shown in FIG. 6. The upstream scheduler 78 may decide to delay the packet for QoS reasons such as rate shaping or because it has decided that other REQs have higher priority at that moment.

Assuming that this delay either does not happen or is over, the upstream scheduler 78 creates a MAP 400 for placing a GNT 412. To do this, the upstream scheduler 78 creates a MAP message 400B that represents some time in the future. The time and associated MAP message 400B is chosen using a multi-step process. First, a parameter called the MAP advance time 414 is added to a current time reference (timestamp). Then, a further addition of time is added to get to the next MAP boundary 400B. Then the packet data Information Element (IE) is scheduled within that MAP boundary 400B. The cycle then continues.

The MAP advance time 414 is used by the CMTS 398 to allow for a variety of time delays in the round trip path both internal and external between the CMTS 398 and the cable modem 399. One of the values used in the MAP advance time 414 is derived either statically or dynamically and takes into account the delay required to send signals over the HFC plant 34 (FIG. 1A) and provides a design margin referred to as the "safety" factor.

In the conventional non-modular CMTS 398, the MAP advance time 414 takes into account the HFC plant round trip time, cable modem 399 minimum processing delay, CMTS 398 receive queue delay, CMTS 398 transmit queue delay, CMTS 398 transmit PHY delay (interleaver), and some margin.

However, the modified REQ-GNT data path for the remote PHY system 10 shown in FIGS. 1A and 9A has additional delays associated with the processing time of the downstream remote PHY 30, upstream remote PHY 32, MAC 22, and latency in the packet switched network 26. The timing and synchronization system described below provides DOCSIS timing and synchronization for the remote PHY architecture 10 and compensates for the additional delays created in the modular CMTS.

Timing Shelves

Figure 27:
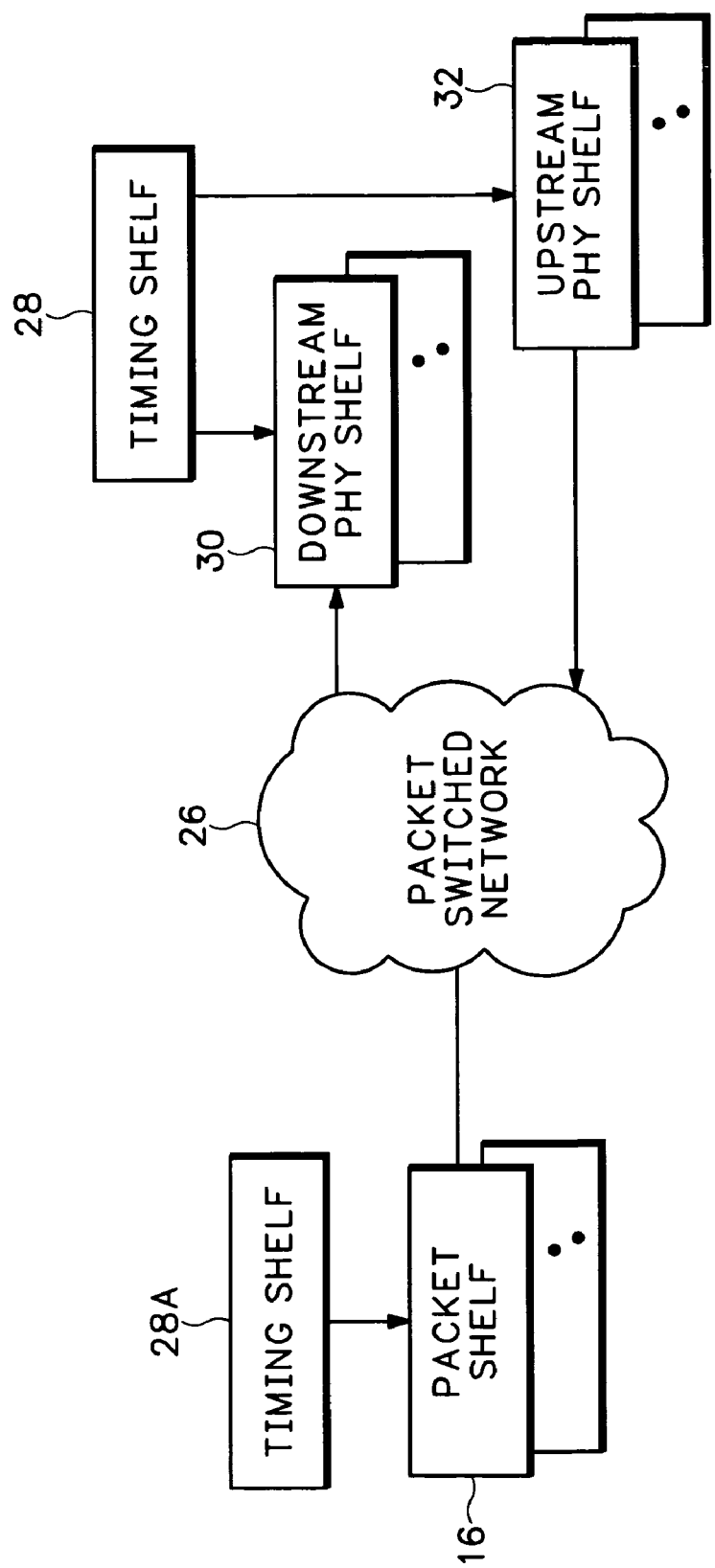
FIG. 27 shows one embodiment of how a timing system used in the modular CMTS.

FIG. 27 shows timing shelves 28 that are used for aligning/synchronizing the frequency (clock) and DOCSIS timestamp (TS) for the different remote PHY elements, including the packet shelf 16, downstream PHY shelf 30 and upstream PHY shelf 32. One technique described below uses a hard-wired timing system and a second technique sends a timestamp over the packet switched network 26.

Figure 28:
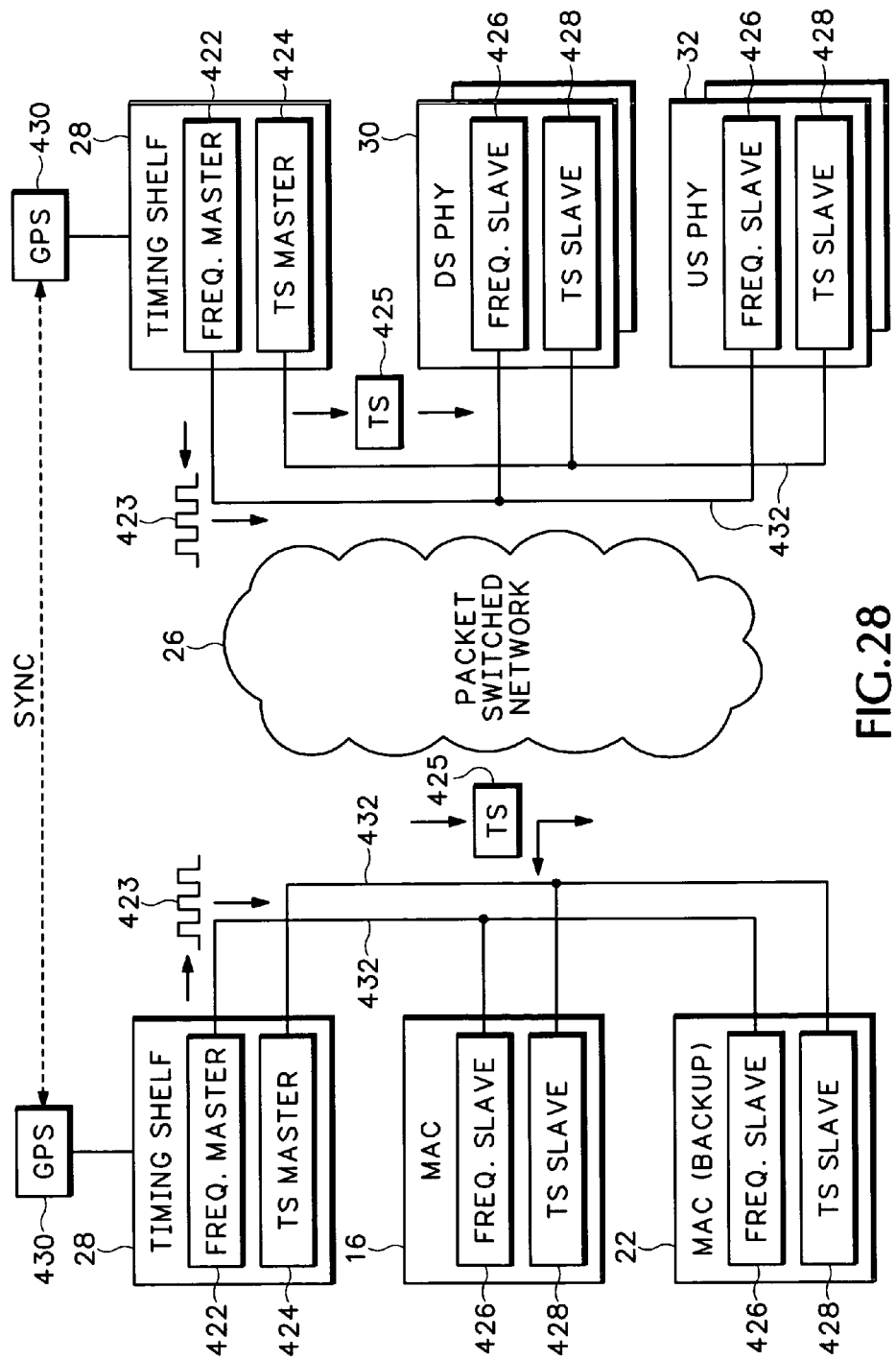
FIG. 28 is a diagram showing a hardwired timing system.

FIG. 28 shows a hardwired timing configuration. Separate timing shelves 28 are directly connected to the packet shelf 16 and to the PHY shelves 30 and 32. The timing shelves 28 include a frequency master module 422 that generates a clock signal 423 and a time stamp master module 424 that generates timestamp 425. The packet shelf 16, downstream PHY shelves 30, and the upstream PHY shelves 32 all operate a frequency slave 426 that runs off clock 423 and a timestamp slave 428 that runs off the timestamp 425. The timing shelves 28 generate the common clock signal 423 and timestamp reference 425 and distribute that information electrically over point to point connections 432 (twisted pair or coax transmission) to each shelf (or line card if need be) in the cable system.

If the packet shelf 16 and PHY shelves 30 and 32 happen to be in the same physical location, then the same timing shelf 28 might be used for all the different CMTS shelves. If any combination of the packet shelf 16, downstream PHY shelf 30, or upstream PHY shelf 32 are located remotely from each other, then separate timing shelves 28 may be used at each remote location. Global positioning system (GPS) receivers 430 are connected to each timing shelf 430 and provide a frequency reference and clock used for synchronizing the different autonomously operating timing shelves 28.

Figure 29:
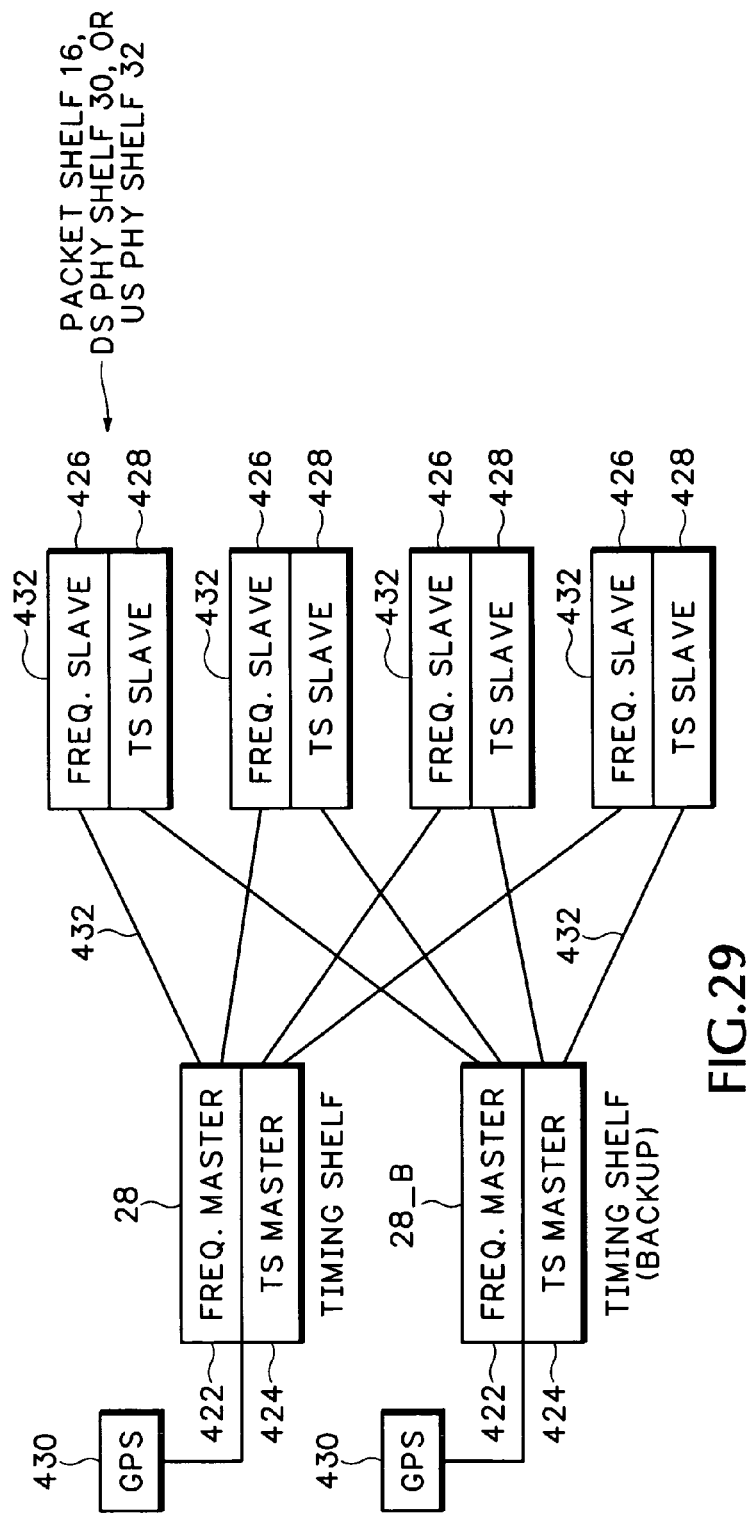
FIG. 29 is a diagram showing a star wired timing system.

FIG. 29 shows a star wired configuration used for connecting redundant timing shelves 28 and 28_B to different remote shelves. Each block 432 represents a packet shelf 16, downstream PHY shelf 30, or upstream PHY shelf 32. The frequency slave 426 and the timestamp slave 428 in each shelf 432 is connected to the frequency master 422 and the timestamp master 424 in the timing shelf 28. If the main timing shelf 28 fails, a backup timing shelf 28_B has an independently operating frequency master 422 and timestamp master 424 that can each be independently connected to the frequency slaves 426 and timestamp slaves 428, respectively, in each shelf 432.

Figure 30:
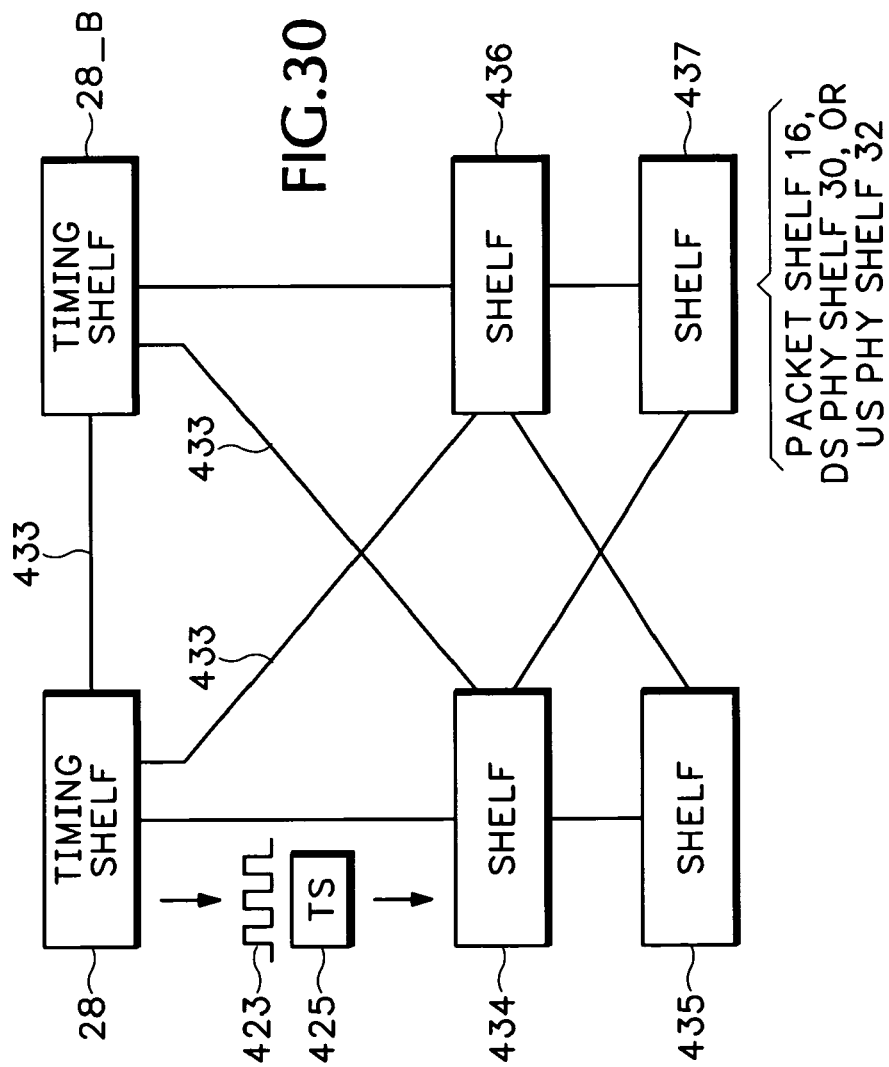
FIG. 30 is a diagram showing a daisy chained timing system.

FIG. 30 shows an alternative embodiment where the frequency and timestamp connections 433 are wired to the shelves 434, 435, 436, and 437 in a daisy chain configuration. The primary timing shelf 28 connects to the backup timing shelf 28_B and to two shelves 434 and 436. Similarly, the backup timing shelf 28_B connects to the two shelves 434 and 436. Shelves 434 and 436 then connect the clock signal 423 and timestamp 425 to shelves 435 and 437. In yet another embodiment, multiple different shelves 434-437 are all located in a same chassis. In this configuration, a common backplane or network is used for connecting the clock signal 423 and the timestamp signal 425 from the timing shelf 28 to shelves 434-437.

Sending a Software Timestamp over a Packet Switched Network

Sending a DOCSIS timestamp is one embodiment. Sending a timestamp value that is not in DOCSIS format is also possible. The main distinction is that the timestamp is sent in a software message over a network rather than over a dedicated timing interface.

Figure 31:
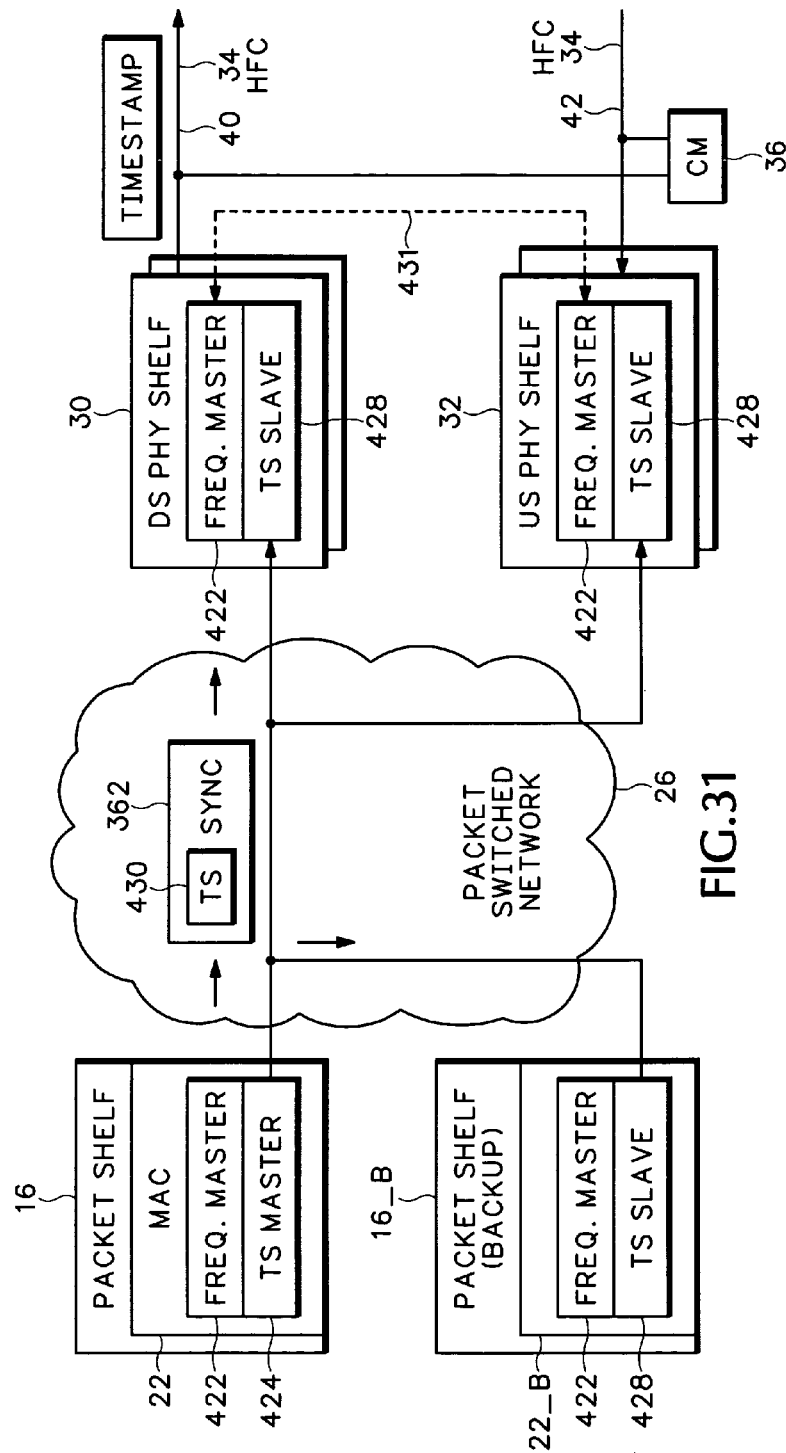
FIG. 31 shows a packet shelf in the modular CMTS operating as a timestamp master.

The timing system in FIG. 31 separates frequency and timestamp generation. It is assumed that the packet shelves 16, and PHY shelves 30 and 32, can run stand-alone. In this timing configuration, there may be hardwired point to point connections between different frequency circuits 422, but the timestamp circuits 424 and 428 typically communicate via the packet switched network 26.

In one embodiment, a DOCSIS timestamp is sent. In an alternative embodiment, a timestamp value is sent that is not in the DOCSIS format. The distinction is that the timestamp is sent in a software message over a network rather than over a dedicated timing interface.

For advanced time division multiple access (ATDMA/TDMA), each shelf 16, 30 and 0.32 may generate its own internal clock frequency using a frequency master 422. These internal frequency references each drive an internal timestamp counter. For synchronous code division multiple access (SCDMA) systems, a timing shelf 28 operating a frequency master module 422 may supply a hardwired clock signal 423 to frequency slaves 426 similar to that shown in FIG. 28. Alternatively, a frequency module in one of the shelves 16, 30 or 32 may operate as a frequency master 422 and then supply a hardwired clock signal 423 to the other packet shelves 16 or PHY shelves 30 and 32 in the same physical location.

The packet switched network 26 eliminates some of the physical limitations of conventional CMTS systems. In conventional CMTS systems timing and clock signals have to be either star-wired or daisy chained between multiple CMTS shelves in the same chassis. The star-wired connectively requires separate ports for each slave component and the daisy chained connectivity can cause the clock to degrade when passing through each CMTS component. However, the packet switched connectivity shown in FIG. 31 only requires a single network connection in the timestamp master 424 and timestamp slaves 428 for exchanging timestamp information.

The internal frequencies of each shelf 16, 30 and 32 may be slightly different and the timestamp values for each system component may drift from each other. To address this problem, one of the timestamp generators operates as the timestamp master 424. In this example, the timestamp generator in the packet shelf 16 is the timestamp master 424 and the other timestamp counters in the downstream PHY shelf 30 and the upstream PHY shelf 32 operate as timestamp slaves 428. The timestamp slaves 428 continuously receive timestamps 430 over the IP network 26 from the timestamp master 424, dejitter them, and then update their timestamp counters accordingly. In other embodiments, one of the downstream PHY shelves 30 or upstream PHY shelves 32 may operate as the timestamp master 424.

Since the data path between the MAC card 22 and the downstream PHY shelf 30 may contain jitter, the downstream PHY shelf 30 overwrites the timestamp value 430 in the DOCSIS stream with a corrected and de-jittered timestamp. This is referred to as DOCSIS timestamp correction and is described in more detail below in FIGS. 35 and 36.

In the example of FIG. 31, a primary MAC 22 operates as the timestamp master 424 and a backup MAC 22_B operates as a timestamp slave 428. If the primary operating MAC 22 fails, the backup MAC 22_B is brought on line without disrupting the timestamp value. For example, whenever the timestamp slave 428 in MAC 22_B does not receive the timestamp 430 after some period of time, it may automatically convert over to operating as the timestamp master 424. The backup timestamp master operation provided by MAC 22_B can alternatively be implemented in one of the PHY shelves 30 or 32.

In one embodiment, the timestamp 430 is sent by MAC 22 to the PHY shelves 30 and 32 in a DOCSIS SYNC message 362 (see FIG. 25). The SYNC message 362 can be embedded within the data stream 88 that runs between the MAC card 22 and the downstream and upstream PHY shelves 30 and 32 as shown in FIGS. 6-8. The data stream 88 may use the same packet format used in video on demand (VOD) systems for sending content to edge QAMs.

A UDP packet 89 shown in FIG. 8A may be used for carrying the timestamp 430 to the PHY shelves 30 and 32. As described in FIG. 6 above, the UDP packet 89 may contain multiple MPEG-TS frames 86. To minimize the jitter, the MAC 22 may place the SYNC message 362 in the same position each time within the data stream 88. To minimize delay between the MAC 22 and the downstream PHY shelf 30, the MAC 22 may place the SYNC message 362 in a last MPEG-TS frame 86 in the UDP packet 89 shown in FIG. 8A.

The SYNC message 362 may be sent over the packet switched network 26 in separate unicast packets having IP addresses associated with the different packet or PHY shelves 30 and 32. Alternatively, the MAC 22 may send a single SYNC message 362 in a multicast packet that is received by each of the packet and PHY shelves 30 and 32.

Relative Timestamp Drift

Still referring to FIG. 31, the timestamp slaves circuits 428 in the upstream PHY shelf 32 and in the backup MAC 16_B may be simpler than the timestamp slave circuitry 428 in the downstream PHY shelves 30. This is due to the downstream PHY shelf 30 having to meet the DOCSIS specification of less than 500 nanoseconds (ns) of timestamp jitter. Since the timestamp in the remote PHY shelves 30 and 32 are synchronized with the timestamp 430 in the MAC 22, which in turn is derived from a MAC clock, the downstream PHY timestamp will appear to drift with respect to its local downstream PHY clock.

Solutions include having the downstream PHY shelf 30 contain a more complex and tighter phase locked loop (PLL) that first derives the MAC clock from timestamps 430, locks its local PHY clock onto the derived MAC clock, generates a local timestamp, and then locks its local PHY timestamp onto the MAC timestamp. By eliminating the frequency error, the relative timestamp drift would be reduced or eliminated.

It should be noted that all timestamp slaves 428, including the timestamp slave 428 in the upstream PHY shelf 32 and the backup MAC 22_B, may experience the same relative timestamp drift. This should be acceptable for the upstream PHY shelf 30 as the value of the timestamp is less critical than the downstream PHY shelf 30 and is also not tested at the upstream PHY shelf 32. This should also be acceptable for the backup MAC 22_B since it is not typically in use.

If the downstream PHY shelf 30 uses the simpler timestamp synchronizing approach and does not lock its local clock to the MAC clock, the clocks for the upstream and downstream PHY shelves 30 and 32 can be connected to the external timing shelf 28 as shown in FIG. 28 to achieve clock coherency. If the downstream PHY shelf 30 uses the more complex timestamp synchronizing approach and locks its local clock to the MAC clock, the PHY shelves 30 and 32 might not connect to the external timing shelf 28.

Even if the upstream and downstream PHY shelves 30 and 32 are on the same clock, the timestamp in the downstream PHY shelf 30 may still be synchronized with the MAC clock in packet shelf 16. The result is that the timestamp in the downstream PHY shelf 30 will get aggressively corrected. For example, it might get corrected every 10 milliseconds (ms) which would be the SYNC interval. The cable modem 36 may also update its timestamp accordingly.

Timestamp Master in PHY Shelf

Figure 32:
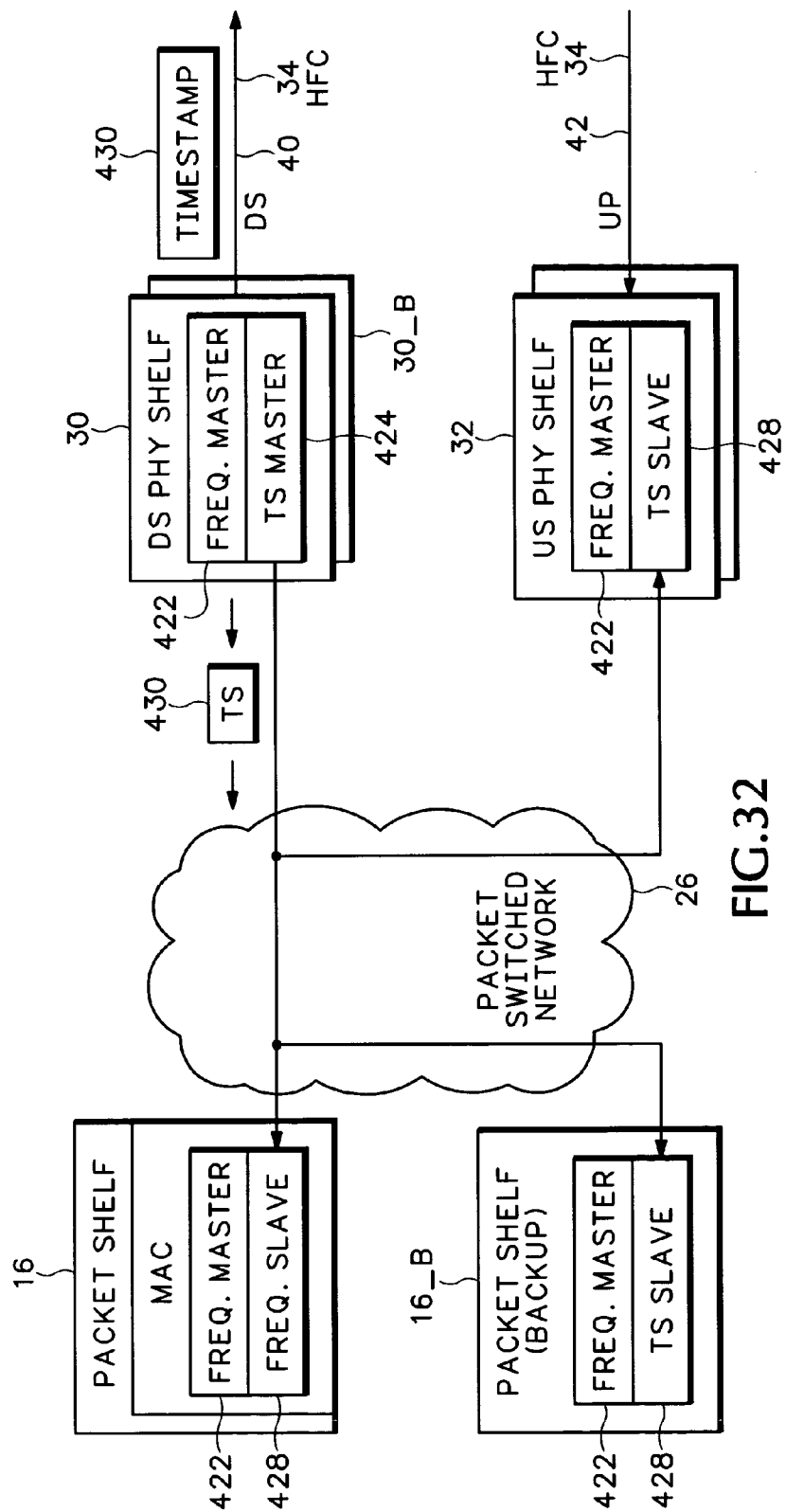
FIG. 32 shows a downstream PHY shelf in the modular CMTS operating as the timestamp master.

FIG. 32 shows another timing implementation where the downstream PHY shelf 30 operates as the timestamp master 424 and the MAC 22 in the packet shelf 16 operates as a timestamp slave 428. This embodiment may be a simpler and easier solution for the downstream PHY shelf 30 for meeting DOCSIS requirements.

Implementing the timestamp master 424 in the downstream PHY shelf 30, allows the downstream PHY shelf 30 to deliver the timestamp 430 to the HFC plant 34 without the relative timestamp drift that could be created in other implementations. It also may simplify clock and timestamp phase locked loop (PLL) circuitry normally needed for a timestamp slave 428, but not required for the timestamp master 424. The PLL circuitry may still be required since other downstream PHYs shelves 30 may want to slave off of the timestamp master 424.

For example, there may be multiple downstreams per MAC domain where those downstreams feed PHYs shelves in different chassis, and where it was required to load balance across those downstreams without re-ranging. The timestamp of the subsequent downstream PHY shelves 30 may have to be slaved off of the timestamp master 424 in a primary downstream PHY shelf 30.

There also may be multiple downstream and upstream PHYs shelves 30 and 32, respectively, per MAC domain, where PHY shelves are swapped either with a RF switch or through load balancing. In this situation, a backup downstream PHY shelf 30_B may have the same timestamp to prevent the cable modems from rebooting. In the case of the RF switch, the backup downstream PHY shelf 30_B may not be in use, so it does not have to meet specifications with respect to timestamp jitter as do other timestamp slaves 428. When the backup downstream PHY shelf 30_B becomes active, it then becomes the timestamp master 424.

In summary, the systems described in FIGS. 28-30 use a timing shelf 28 in a hardwired timing configuration that operate as frequency and timestamp masters. The system in FIG. 31 implements a timestamp master 424 in the MAC 22 and the system in FIG. 32 implements the timestamp master 424 in the downstream PHY shelf 30. In yet another embodiment, the upstream PHY shelf 32 can operate as the timestamp master 428.

The different timestamp master and slave embodiments shown above in FIGS. 28-32 can also be implemented in the cable network shown in FIG. 2. In this configuration, the upstream PHY connectivity may co-exist with the MAC 22 in the same packet shelf 16. In this embodiment, the timestamp and frequency signals may be hardwired between the MAC 22 and DOCSIS line card 44 while the timestamp may be sent or received to or from the downstream PHY shelf 30 over packet switched network 26.

In a retrofit situation, the clock card in a conventional non-modular CMTS may be reconfigured to operate as the frequency master 422, frequency slave 426, timestamp master 424, or timestamp slave 428 described above in FIGS. 28-32.

MAC-PHY Ranging

Referring to FIG. 33, ranging is used to compensate for the delays that exist between the different shelves 16, 30 and 32. Since conventional cable modem ranging is done with respect to measurements taken at the upstream PHY, the amount of correction that will be required should be the difference between the downstream offset from the MAC 22 to the downstream PHY shelf 30 and the upstream offset from the MAC 22 to the upstream PHY shelf 32. This MAC to PHY ranging is typically performed prior to the conventional cable modem ranging.

In one embodiment, the delay attributed to the modular CMTS architecture is determined by sending a measurement packet 450A from the MAC 22 to the downstream PHY shelf 30. One example of a measurement packet is shown in FIG. 34. The measurement packet 450A may contain a timestamp value 454 identifying when it is originally sent by MAC 22. The downstream PHY shelf 30 relays the measurement packet 450A back to the MAC 22.

The difference between an internal received time 460 referenced by the MAC 22 and the original transmit time 454A determines the roundtrip delay for packet switched network 26. The absolute delay between MAC 22 and downstream PHY shelf 30 may be determined as half of the roundtrip delay for measurement packet 450A.

Alternatively, the downstream PHY shelf 30 may add a timestamp value 456 into measurement packet 450A that indicates when the measurement packet 450A was initially received over packet switched network 26 and/or another timestamp value 458 indicating when the measurement packet 450A is output back over packet network 26 to MAC 22.

The difference between the timestamp value 456 inserted by downstream PHY shelf and the original timestamp value 454 indicating when the measurement packet 450A was originally sent by MAC 22 indicates the one-way delay over packet network 26 from MAC 22 to downstream PHY shelf 30. The difference between timestamp value 460 and 458 identifies the one-way delay from the downstream PHY shelf 30 to MAC 22.

This absolute delay time from the MAC shelf 22 to the downstream PHY shelf 30 is added to the conventional MAP advance time 414 in FIG. 26 that is normally calculated to account for non-modular CMTS delays related to sending data over the HFC plant 34. This ensures that MAPs 400 in FIG. 26 arrive at the cable modem 36 in time to be used.

Another measurement packet 450B may be sent to determine the transmission delay from the upstream PHY shelf 32 to the MAC 22. The MAC 22 may divide the round trip delay for measurement packet 450B by half to determine the one-way delay. Alternatively, the upstream PHY shelf 32 may add a timestamp value similar to timestamp value 458 indicating when the measurement packet 450B is sent back to the MAC 22. Timestamp value 458 is then subtracted from a local MAC receive time, similar to timestamp value 460 in FIG. 34, indicating when the measurement packet 452 is received by MAC 22. This difference identifies the one-way delay from upstream PHY shelf 32 to MAC 22.

The measurement packets 450A and 450B are periodically sent out to provide constant ranging. The MAC-PHY delay from packet shelf 16 to downstream PHY shelf 30 and the packet delay from upstream PHY shelf 32 to packet shelf 16 are then dynamically added to the conventional MAP advance time 414 calculated in FIG. 26. If the delay over packet network 26 varies, the MAP advance time is varied proportionally with the amount of measured network delay. This prevents having to select a worst case network delay.

The MAP advance value is selected to be at least larger than the MAC-PHY delay time and in one example is calculated as follows:

> Map Advance Time>[upstream PHY to MAC delay+ downstream MAC to PHY delay+conventional MAP advance time 414]

As shown above in FIG. 32, the timestamp master 424 may be located in one of the downstream PHY shelves 30. The downstream PHY shelf 30 in FIG. 32 may then determine the one-way delay in packet network 26 from the MAC 22 to the downstream PHY shelf 30 and the one-way delay from upstream PHY shelf 30 to MAC 22. Measurements similar to those described above would be performed by the upstream PHY shelf 32 when the upstream PHY shelf 32 operates as the timestamp master 424.

The MAC-PHY delays described above are applicable for the hardwired system described above in FIGS. 28-30 and for the packet switched timestamp systems described above in FIGS. 31 and 32. For example, the hardwired timing system shown in FIG. 28 may not be concerned about timestamp delays. However, referring back to FIG. 9A, the hardwired timing system still has message delays associated with the REQ 136 and GNT 137 messages transported over packet switched network 26. The MAP advance ranging described above in FIGS. 33 and 34 compensate for the delays in sending these DOCSIS messages.

The timestamp 430 described above in FIGS. 31 and 32 may also be compensated according to the ranging shown in FIGS. 33 and 34. For example, the timestamp value 430 sent in the SYNC message 362 in FIG. 31 may be reduced by the amount of measured delay between MAC 22 and downstream PHY shelf 30. This allows the timestamp slave 428 to use the same timestamp value originally sent by timestamp master 424 in MAC 22.

For example, the delay in packet switched network 26 may exceed DOCSIS requirements which may cause the usable radius of DOCSIS to be significantly decreased. It may then be necessary to take an additional operation that performs the ranging algorithm between the MAC shelf 22 and each of the PHY shelves 30 and 32. The result of this MAC-PHY ranging then provides PHY shelves 30 and 32 with the same timestamp counter value. The CM ranging then tunes out any inaccuracies left over from the MAC-PHY ranging. This implementation uses a two-way path between the MAC 22 and PHYs 30 and 32.

Timestamp Correction

Figure 35:
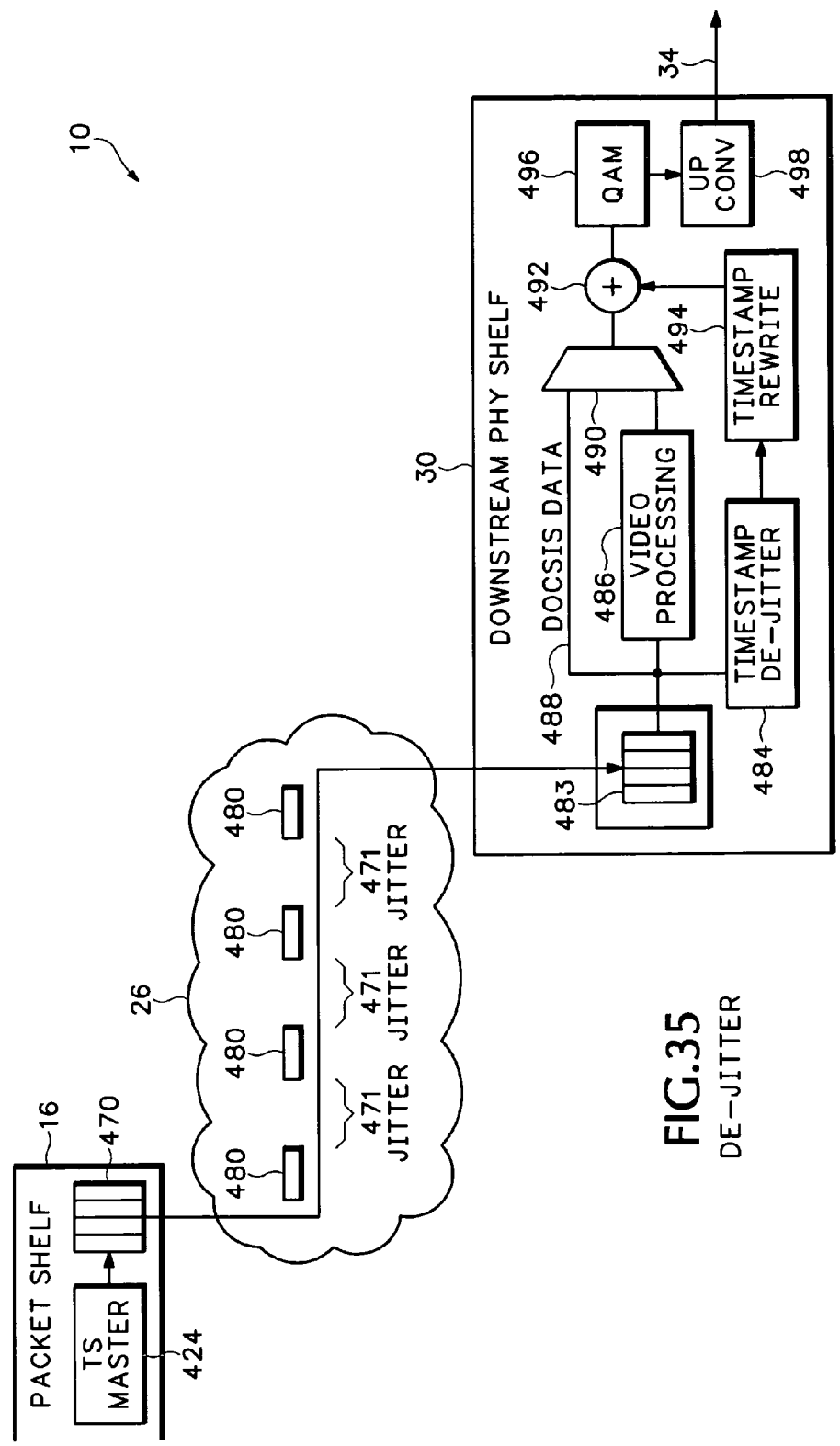

Referring to FIG. 35, timestamp jitter 471 refers to changes in the amount of time required for timestamps 480 to be transmitted over the packet switched network 26. For example, timestamp packets 480 may be generated by TS master 424 in packet shelf 16 at evenly spaced apart time intervals. However, the packets 480 may arrive at downstream PHY shelf 30 at varying time intervals.

These varying delays in transmitting and receiving packets 480 over network 26 can be caused by congestion in the output buffer 470 in packet shelf 16 or congestion in the input buffer 483 in the downstream PHY shelf 30. Jitter is also created by congestion conditions in the switches and routers operating in the packet switched network 26. This jitter can adversely affect the DOCSIS timing in the modular CMTS system 10. For example, the timestamp values sent down the HFC plant 34 and used by the cable modems may no longer correspond with the timestamp value originally generated by MAC 22 in packet shelf 16. This could disrupt the REQ-GNT messaging-described above.

The downstream PHY shelf 30 uses a timestamp de-jitter circuit 484 and a timestamp rewrite circuit 494 to compensate for the packet jitter 471. FIG. 36 explains the de-jitter circuit 484 in more detail. Timestamp packets 480 may initially have some predetermined constant amount of time delay which is accounted for in line 500. For example, with no packet jitter, the timestamp packets 1-6 would be received at times intersecting line 500. However, due to packet jitter, the packets 1-6 can arrive at times that do not intersect line 500.

For example, a first timestamp packet #1 may be received at time 504A and is longer than the expected receive time corresponding to time 504B on line 500. The timestamp de-jitter circuit 484 sends the expected timestamp value 504B to the timestamp rewrite circuit 494 that then replaces the received timestamp value 504A with timestamp value 504B. The timestamp de-jitter circuit 484 continues to identify the expected timestamp values for the received timestamp values. For example, timestamp #3 is received at time 508A before it was expected at time 508B. The de-jitter buffer 484 sends timestamp value 508B to the timestamp rewrite circuitry 494 that then replaces the timestamp value 508A with timestamp value 508B.

The de-jitter circuit 484 continuously tracks the actual received timestamp values. Over time, the received timestamp values may consistently be above or below the dejittered timestamp line 500. The de-jitter circuit 484 may then move line 500 upward or downward according to the actually received timestamp value times. For example, over time timestamps may arrive at times 506, 510, etc. that are constantly above the current dejittered timestamp line 500. The de-jitter circuit 484 accordingly adjusts line 500 upward to line 502. Timestamp line 502 is then used for replacing the received timestamp values with dejittered values. For example, after readjusting to line 502, a next timestamp #6 may be received at time 514A. The de-jitter circuit 484 accordingly replaces the timestamp value 514A with de-jittered timestamp value 514B.

Similarly, if the received timestamp values over time are consistently below line 500, the de-jitter circuit 484 adjusts line 500 downward. The new adjusted lower timestamp line is then used for replacing timestamp values.

The timestamp rewrite circuit 494 replaces the received timestamp values with the timestamp values identified by de-jitter circuit 484. The new timestamp values are then added to the DOCSIS data stream 488 or the MPEG data stream from video processing circuit 486 as previously done in conventional CMTS systems. The de-jittered timestamp along with the DOCSIS or video data is then sent to QAM 496, up-converter 498 and then sent over the downstream path of HFC 34.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An upstream cable Physical Interface (PHY), comprising:
   one or more cable PHYs containing Quadrature Amplitude Modulation (QAM) demodulators for demodulating Data Over Cable Service Interface Specification (DOCSIS) frames received over an upstream path of a cable plant into DOCSIS Media Access Control (MAC) PHY Interface (DMPI) blocks; and
   a DOCSIS Remote PHY Interface (DRPI) framer configured to convert the DMPI blocks into DOCSIS packets and send the DOCSIS packets over a packet switched network.

2. The upstream PHY according to claim 1 wherein the DRPI framer encapsulates multiple DMPI blocks together in a same DOCSIS packet and sends the DOCSIS packet over a tunnel in the packet switched network.

3. The upstream PHY according to claim 2 wherein the DRPI framer encapsulates the DMPI blocks received from different upstream channels into the same DOCSIS packet and sends the DOCSIS packet over the tunnel to a DOCSIS MAC operating in a packet shelf.

4. The upstream PHY according to claim 3 wherein the DRPI framer inserts a domain header in the DMPI blocks that identifies an upstream domain and upstream logical channel associated with the DMPI blocks.

5. The upstream PHY according to claim 4 wherein the DRPI framer sends a DMPI timestamp snapshot block in the DOCSIS packet, the DMPI timestamp snapshot block identifying a timestamp value, a mini-slot number, and a mini-slot frame number.

6. The upstream PHY according to claim 1 wherein the DRPI framer forms the DOCSIS packets by:
   encapsulating the DMPI blocks into a payload of a UDP packet, said encapsulation retaining DOCSIS formatting in the DMPI blocks;
   attaching an IP header to the UDP packet; and
   attaching an Ethernet header to an Internet Protocol (IP) header.

7. The upstream PHY according to claim 1 including multiple Quality of Service (QoS) queues used by the DRPI framer to format the DMPI blocks into different QoS tunnels.

8. The upstream PHY according to claim 7 including a Service Identifier (SID) to Quality of Service (QoS) table used by the DRPI framer to map SID values associated with the DMPI blocks to associated QoS values in the table and then transport the DMPI blocks over the QoS tunnels in the packet switched network corresponding with the associated QoS values.

9. The upstream PHY according to claim 8 wherein SID to QoS values in the table are dynamically varied according to SID to QoS values in MAP packets received over the packet switched network from a DOCSIS MAC in a remote packet shelf.

10. The upstream PHY according to claim 1 wherein the PHYs identify bandwidth request messages in the DOCSIS frames received over the cable plant, and wherein the DRPI framer is configured to expedite transmission of those ones of the DMPI blocks that correspond to the identified bandwidth request messages by including the corresponding DMPI blocks in exclusive ones of the DOCSIS packets that contain only the corresponding DMPI blocks.

11. An upstream cable Physical Interface (PHY), comprising:
   one or more cable Physical Interfaces (PHYs) containing Quadrature Amplitude Modulation (QAM) demodulators for demodulating Data Over Cable Service Interface Specifications (DOCSIS) frames received over an upstream path of a cable plant into DOCSIS Media Access Control (MAC) PHY Interface (DMPI) blocks; and
   a DOCSIS Remote PHY Interface (DRPI) framer configured to convert the DMPI blocks into DOCSIS packets and send the DOCSIS packets over a packet switched network;
   wherein the PHYs identify request messages in the DOCSIS frames received over the cable plant and the DRPI framer generates separate request packets for the identified request messages; and
   wherein the DRPI framer sends the same request message in a first request packet and in a second request packet that encapsulates multiple other DMPI blocks, the DRPI framer inserting a notification in one or both of the first or second request packets notifying a receiving DOCSIS MAC that the same request message has been sent in two different request packets.

12. The upstream PHY according to claim 11 wherein the DRPI framer attaches a high Quality of Service (QoS) to the first request packet.

13. The upstream PHY according to claim 11 wherein the DRPI framer combines the DMPI block containing the request message with other DMPI blocks in a same one of the first and second request packets but sends such request packet over the packet switched network as soon as the request message is encapsulated in such request packet.

14. A method, comprising:
   utilizing a Quality Amplitude Modulation (QAM) demodulator located remotely from a Data Over Cable Service Interface Specifications (DOCSIS) Media Access Control (MAC) of a CMTS core, demodulating data from an upstream path of a cable plant into blocks; and
   utilizing a DOCSIS Remote PHY Interface (DRPI) framer, formatting the blocks into packets and sending the packets over a packet switched network to the CMTS core, wherein the packets retain DOCSIS framing that is to be further processed by the DOCSIS MAC.

15. The method according to claim 14 including encapsulating multiple blocks together in the same packets and sending the packets over a tunnel in the packet switched network to the DOCSIS MAC.

16. The method according to claim 15 including encapsulating the blocks received from different upstream channels into the same packets and sending the packets over the tunnel.

17. The method according to claim 16 including inserting a domain header in the blocks to identify an upstream domain and upstream local channel associated with the blocks.

18. The method according to claim 15 including inserting a timestamp snapshot block in some of the packets, or in a separate control message, that identifies a timestamp value, a mini-slot number, and a mini-slot frame number to the DOCSIS MAC.

19. The method according to claim 14 including sending the blocks in the packets over the packet switched network over different Quality of Service (QoS) tunnels.

20. The method according to claim 19 including selecting the QoS tunnels for sending the blocks according to Service Identifiers (SIDs) associated with DOCSIS frames received over the cable plant.

21. The method according to claim 20 including receiving a map message over the packet switched network containing SID to QoS mappings and dynamically selecting the QoS tunnels for the blocks according to the SID to QoS mappings in the map message.

22. The method according to claim 14 including identifying bandwidth request messages in the data demodulated from the cable plant and sending those DMPI blocks containing the bandwidth request messages in DOCSJS packets separate from other DOCSIS packets carrying the remaining data blocks.

23. A method for operating a Physical Interface (PHY) for a cable plant, comprising:
  utilizing a radio frequency demodulator to demodulate data from an upstream path of the cable plant into blocks;
  formatting the blocks into packets and sending the packets over a packet switched network;
  identifying request messages in the demodulated data from the cable plant and sending the blocks containing the identified request messages in request packets separate from other packets carrying the data blocks; and
  sending a same request message in a first request packet and in a second request packet that encapsulates multiple other blocks and inserting a notification in one or both of the first or second request packets notifying a receiving packet shelf that the same request message has been sent in two different request packets.

24. The method according to claim 23 assigning a high Quality of Service (QoS) value to the request packet.

25. The method according to claim 23 including encapsulating the blocks containing the request message with other blocks in a same one of the first and second request packets and sending such request packet over the packet switched network as soon as the block containing the request message is encapsulated in such request packet.

26. A modular Cable Modem Termination System (CMTS), comprising:
  a packet shelf operating a Data Over Cable Service Interface Specification (DOCSIS) Media Access Control (MAC) framer;
  one or more upstream cable Physical Interface (PHY) shelves receiving DOCSIS data from a cable plant, formatting the DOCSIS data into packets, and sending the packets over a packet switched network to the packet shelf; and
  one or more downstream PHY shelves receiving the DOCSIS data from the packet shelf over the packet switched network and modulating the DOCSIS data for sending on a downstream path of the cable plant.

27. The modular CMTS according to claim 26 wherein the upstream PHY shelves include one or more Quadrature Amplitude Modulation (QAM) demodulators for demodulating the DOCSIS data received over the cable plant and the packet shelf does not contain any QAM demodulators.

28. The modular CMTS according to claim 26 wherein the packet shelf is configured to format Internet Protocol (IP) packets into DOCSIS frames and encapsulate multiple DOCSIS frames into a common payload in a tunneling packet for sending to the downstream or upstream PHY shelves.

29. The modular CMTS according to claim 28 wherein the upstream PHY shelves are configured to encapsulate the multiple DOCSIS frames demodulated from the cable plant into the common payload in the tunneling packet and send the tunneling packet to the packet shelf.

\* \* \* \* \*

UNITED STATES PATENT AND TRADEMARK OFFICE
CERTIFICATE OF CORRECTION

PATENT NO. : 7,639,617 B2  Page 1 of 1
APPLICATION NO. : 11/131766
DATED : December 29, 2009
INVENTOR(S) : Chapman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Twenty-first Day of December, 2010

David J. Kappos
*Director of the United States Patent and Trademark Office*